US012594835B2

(12) United States Patent
Kim et al.

(10) Patent No.: US 12,594,835 B2
(45) Date of Patent: Apr. 7, 2026

(54) SYSTEM FOR CONTROLLING VEHICLE DISPLAY BASED ON OCCUPANT'S GAZE

(71) Applicant: HYUNDAI MOBIS Co., Ltd., Seoul (KR)

(72) Inventors: Kyung Hoon Kim, Yongin-si (KR); Sung Joon Ahn, Gwangmyeong-si (KR); Tae Hun Kim, Seongnam-si (KR); Myung Bin Choi, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 488 days.

(21) Appl. No.: 17/955,016

(22) Filed: Sep. 28, 2022

(65) Prior Publication Data

US 2023/0121260 A1     Apr. 20, 2023

(30) Foreign Application Priority Data

Oct. 15, 2021    (KR) ........................ 10-2021-0137536
Oct. 15, 2021    (KR) ........................ 10-2021-0137537
Oct. 15, 2021    (KR) ........................ 10-2021-0137543

(51) Int. Cl.
| | |
|---|---|
| *B60K 35/81* | (2024.01) |
| *B60K 35/235* | (2024.01) |
| *B60K 35/28* | (2024.01) |
| *B60K 35/29* | (2024.01) |
| *B60K 35/60* | (2024.01) |
| *B60K 35/65* | (2024.01) |
| *B60K 35/10* | (2024.01) |
| *B60K 35/21* | (2024.01) |

(52) U.S. Cl.
CPC ............ *B60K 35/60* (2024.01); *B60K 35/235* (2024.01); *B60K 35/285* (2024.01); *B60K 35/29* (2024.01); *B60K 35/654* (2024.01); *B60K 35/656* (2024.01); *B60K 35/81* (2024.01); *B60K 35/10* (2024.01); *B60K 35/211* (2024.01); *B60K 35/65* (2024.01); *B60K 2360/785* (2024.01)

(58) Field of Classification Search
CPC ........ B60K 35/00; B60K 35/65; B60K 35/81; B60K 2360/149; B60K 2360/785; B60K 35/10; B60K 35/60
See application file for complete search history.

(56) References Cited

U.S. PATENT DOCUMENTS

| | | | |
|---|---|---|---|
| 2015/0178990 A1 | 6/2015 | Ng-Thow-Hing et al. | |
| 2016/0176372 A1* | 6/2016 | Kim ...................... B60K 35/10 | 701/49 |
| 2021/0055547 A1* | 2/2021 | Rao ........................ G06F 3/011 | |
| 2021/0118411 A1 | 4/2021 | Ahn et al. | |

* cited by examiner

*Primary Examiner* — Vivek D Koppikar
*Assistant Examiner* — Jeffrey R Chalhoub
(74) *Attorney, Agent, or Firm* — NSIP Law

(57)                ABSTRACT

A system for controlling a vehicle display based on an occupant's gaze includes: a first occupant gaze recognition unit to recognize a gaze of a first occupant in a vehicle; a second occupant gaze recognition unit to recognize a gaze of a second occupant in the vehicle; an interest information display area crossover confirmation and priority determination unit to determine interest information from the gaze of the first occupant and the gaze of the second occupant, to confirm whether areas for displaying interest information on a windshield are mutually crossover with each other, and to determine a priority for display; and a display control unit to control a display in accordance with the priority for display.

17 Claims, 61 Drawing Sheets

FIG. 4

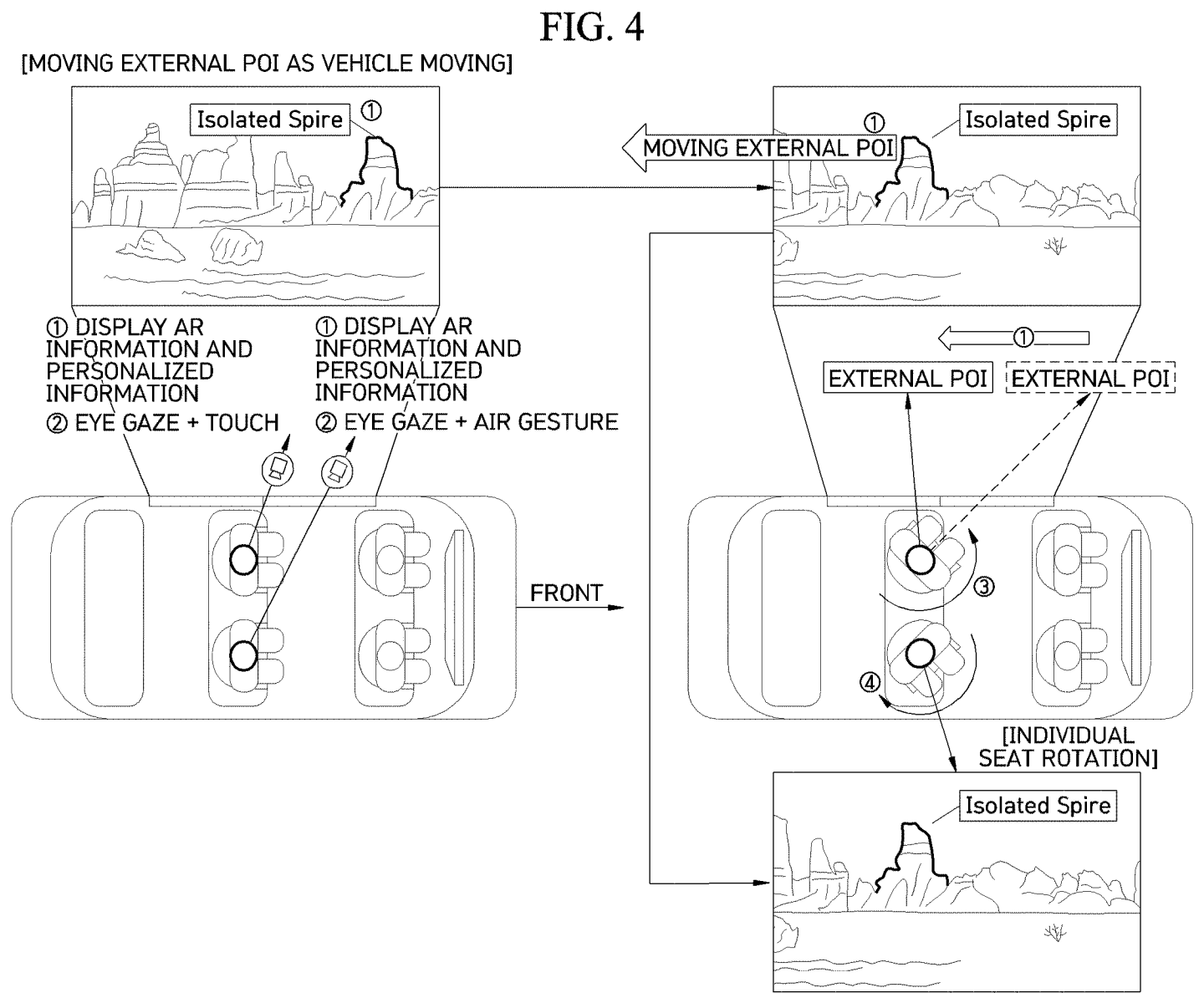

[MOVING EXTERNAL POI AS VEHICLE MOVING]

Isolated Spire

① DISPLAY AR INFORMATION AND PERSONALIZED INFORMATION
② EYE GAZE + TOUCH

① DISPLAY AR INFORMATION AND PERSONALIZED INFORMATION
② EYE GAZE + AIR GESTURE

FRONT

MOVING EXTERNAL POI

Isolated Spire

EXTERNAL POI

EXTERNAL POI

[INDIVIDUAL SEAT ROTATION]

Isolated Spire

S501

OBTAIN OCCUPANT GAZE INFORMATION

S502

DETERMINE POI

S503

CONTROL SEAT POSITION

S504

CONTROL DISPLAY

RECOGNIZE PLURALITY OCCUPANT
GAZE INFORMATION

S902

CONFIRM INTEREST INFORMATION

S903

CONFIRM INTEREST
INFORMATION CROSSOVER

S904

CONTROL DISPLAY

FIG. 10

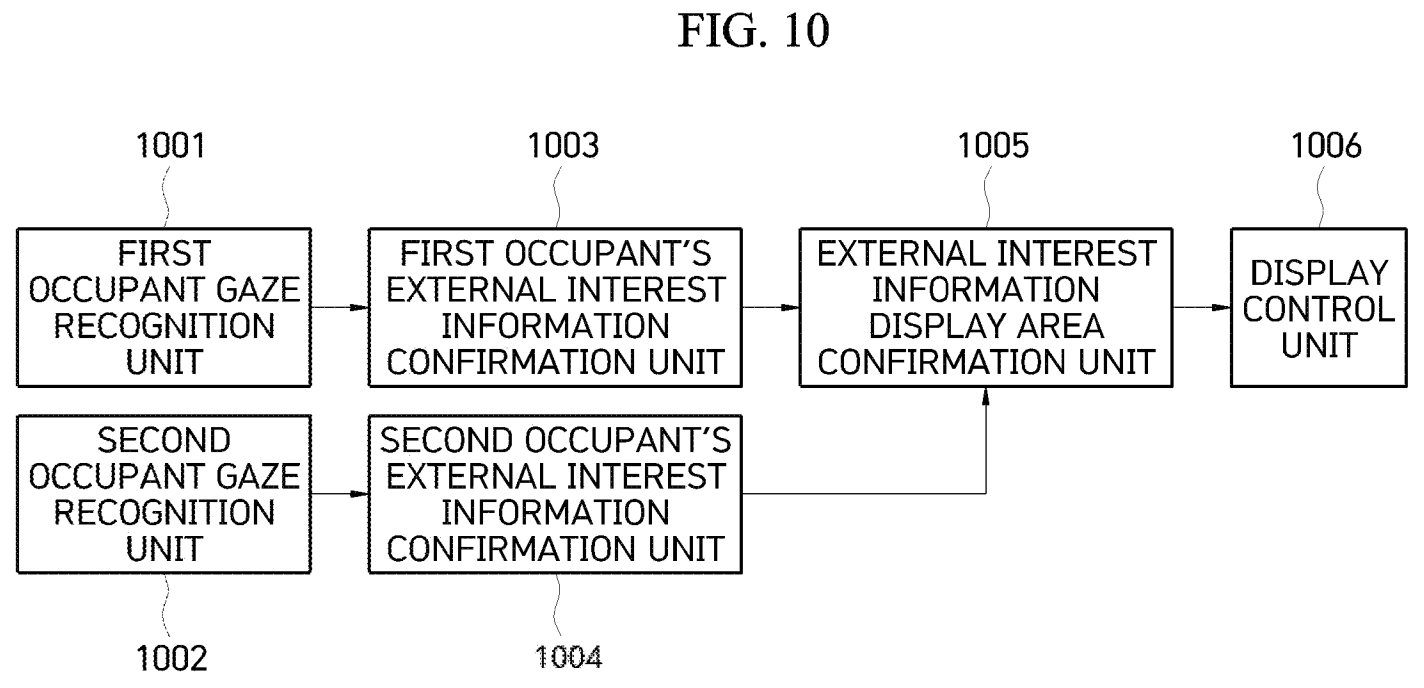

1006 DISPLAY CONTROL UNIT

1005 EXTERNAL INTEREST INFORMATION DISPLAY AREA CONFIRMATION UNIT

1003 FIRST OCCUPANT'S EXTERNAL INTEREST INFORMATION CONFIRMATION UNIT

1004 SECOND OCCUPANT'S EXTERNAL INTEREST INFORMATION CONFIRMATION UNIT

1001 FIRST OCCUPANT GAZE RECOGNITION UNIT

1002 SECOND OCCUPANT GAZE RECOGNITION UNIT

S1201    RECOGNIZE PLURALITY OCCUPANT GAZE INFORMATION

S1202    CONFIRM EXTERNAL INTEREST INFORMATION DISPLAY AREA

S1203    CONTROL DISPLAY

FIG. 14

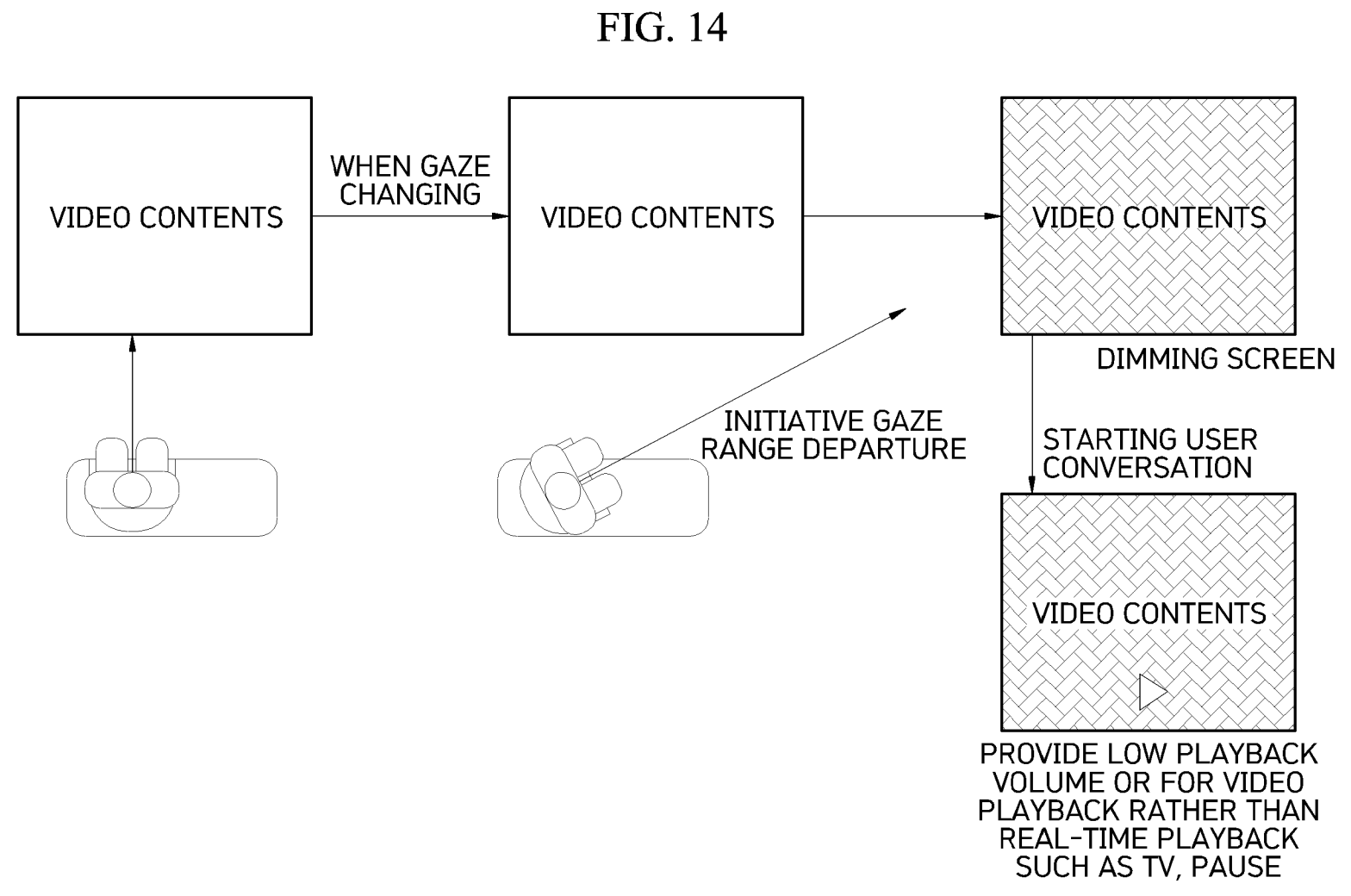

VIDEO CONTENTS

WHEN GAZE CHANGING

VIDEO CONTENTS

INITIATIVE GAZE RANGE DEPARTURE

VIDEO CONTENTS

DIMMING SCREEN

STARTING USER CONVERSATION

VIDEO CONTENTS

PROVIDE LOW PLAYBACK VOLUME OR FOR VIDEO PLAYBACK RATHER THAN REAL-TIME PLAYBACK SUCH AS TV, PAUSE

FIG. 15

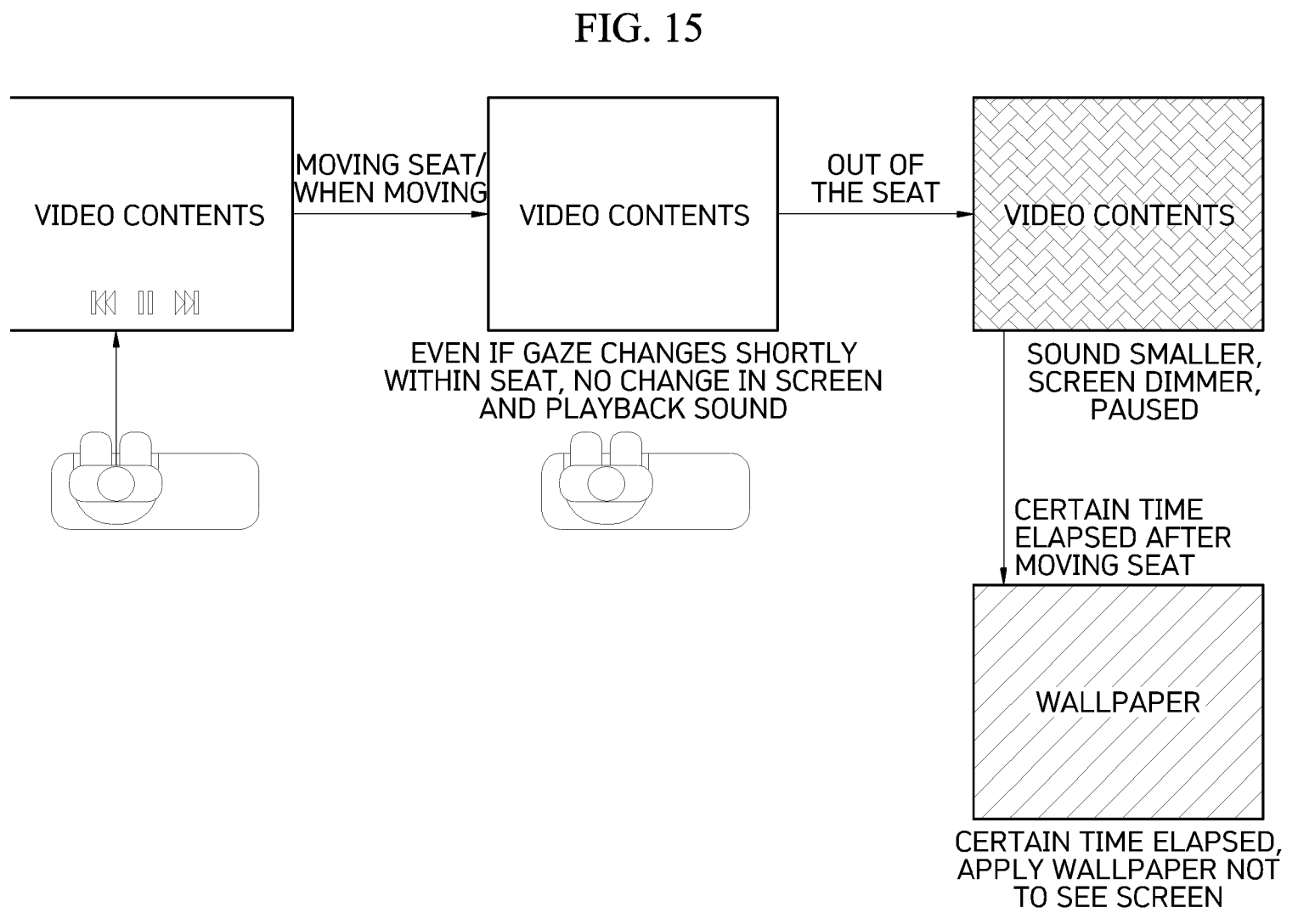

VIDEO CONTENTS

MOVING SEAT/
WHEN MOVING

VIDEO CONTENTS

EVEN IF GAZE CHANGES SHORTLY
WITHIN SEAT, NO CHANGE IN SCREEN
AND PLAYBACK SOUND

OUT OF
THE SEAT

VIDEO CONTENTS

SOUND SMALLER,
SCREEN DIMMER,
PAUSED

CERTAIN TIME
ELAPSED AFTER
MOVING SEAT

WALLPAPER

CERTAIN TIME ELAPSED,
APPLY WALLPAPER NOT
TO SEE SCREEN

Figure 17:
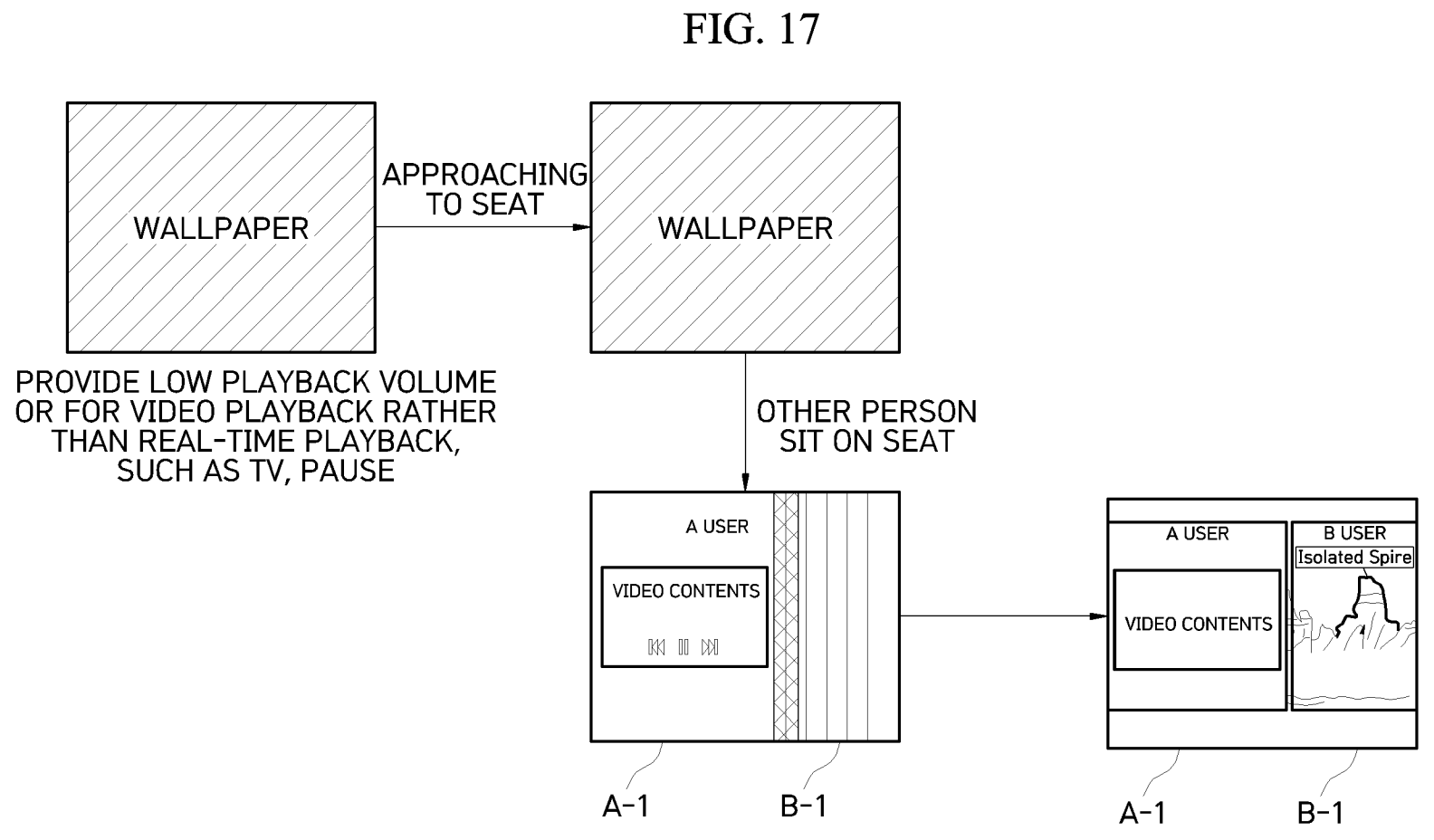

WALLPAPER

APPROACHING
TO SEAT

WALLPAPER

PROVIDE LOW PLAYBACK VOLUME
OR FOR VIDEO PLAYBACK RATHER
THAN REAL-TIME PLAYBACK,
SUCH AS TV, PAUSE

OTHER PERSON
SIT ON SEAT

A USER

VIDEO CONTENTS

A-1　　B-1

A USER

VIDEO CONTENTS

B USER
[Isolated Spire]

A-1　　B-1

VIDEO CONTENTS

THE INITIATIVE PERSON
OFF VEHICLE

WALLPAPER

OTHERS ACCESS

Broken
Clounds
52°F     Sat 11:24 am
Campground

Temperature   Precipitation   Wind 12   7   4   2   1   2   9   12

| 6PM | 9PM | 12PM | 3AM | 6AM | 9AM | 12PM | 13PM |
|---|---|---|---|---|---|---|---|
| Mon | Tue | Tue | Thu | Fri | Sat | Sun | Sun |
| 14° 0° | 13° -1° | 18° 1° | 15° 5° | 17° 3° | 17° 4° | 17° 4° | 18° 7° |

DISPLAY FUNCTION THAT USER USED BEFORE

FIG. 21

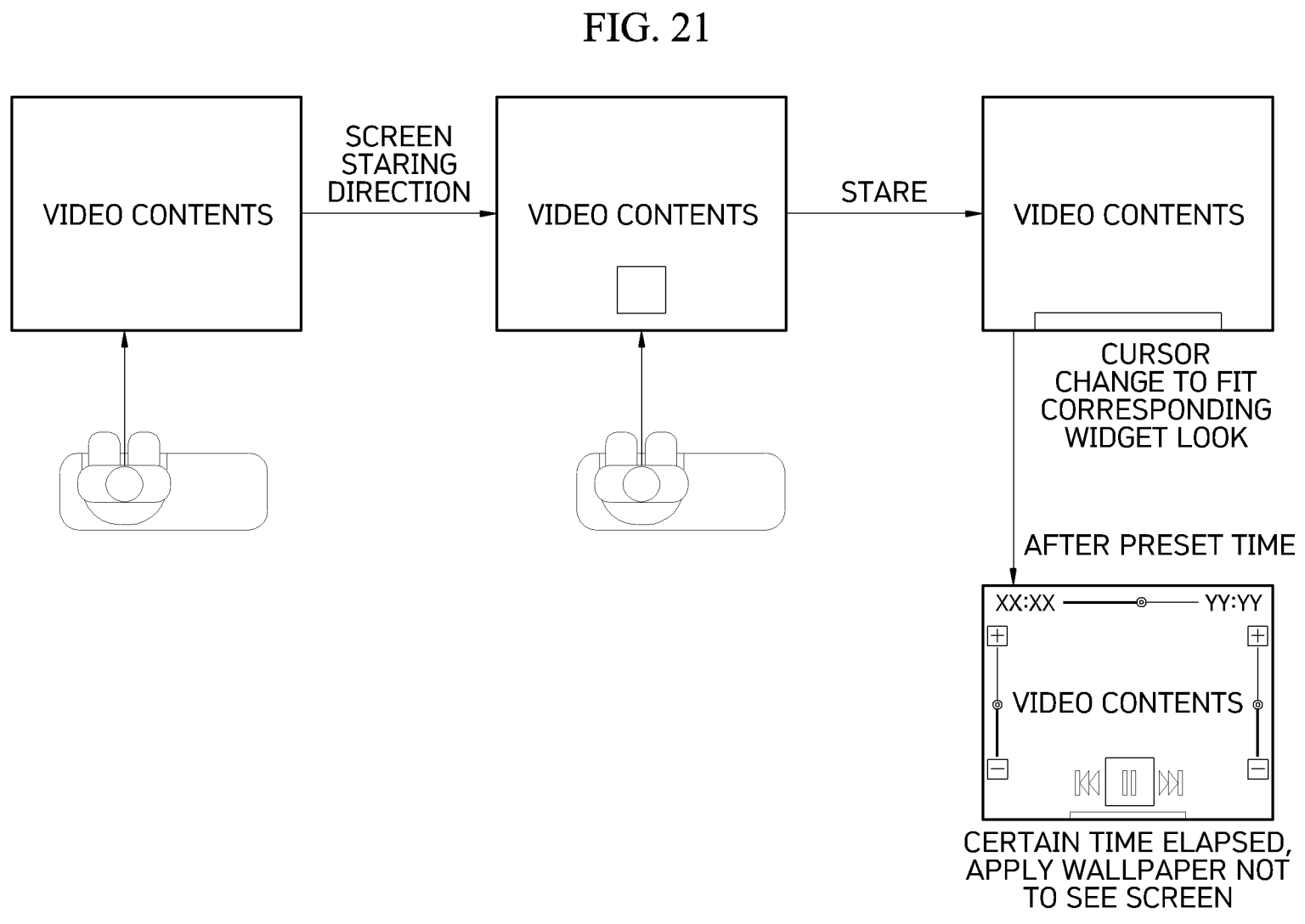

VIDEO CONTENTS

SCREEN STARING DIRECTION

VIDEO CONTENTS

STARE

VIDEO CONTENTS

CURSOR CHANGE TO FIT CORRESPONDING WIDGET LOOK

AFTER PRESET TIME

XX:XX ⎯⊙⎯⎯⎯⎯ YY:YY

VIDEO CONTENTS

CERTAIN TIME ELAPSED, APPLY WALLPAPER NOT TO SEE SCREEN

FIG. 22

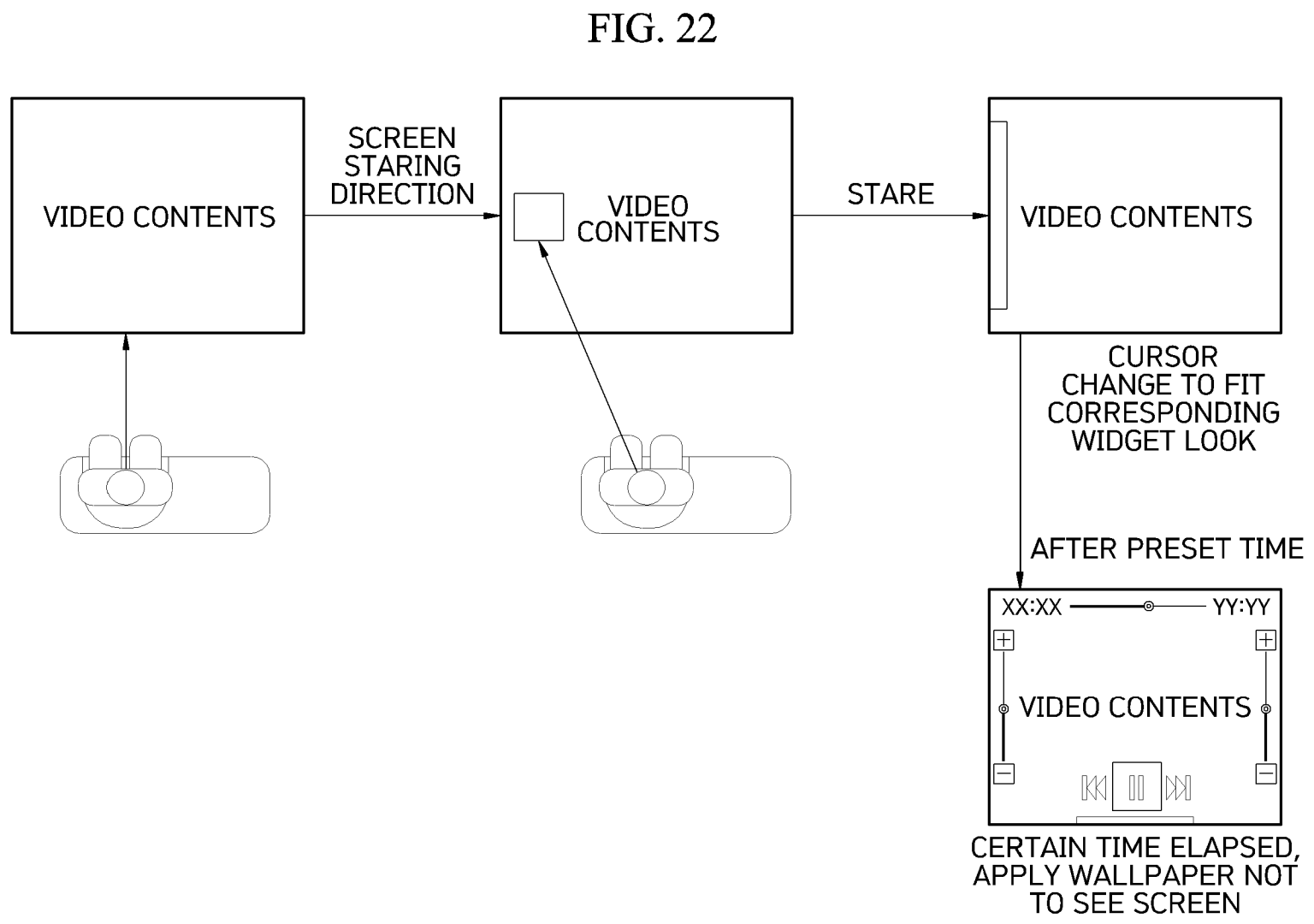

VIDEO CONTENTS

SCREEN STARING DIRECTION

VIDEO CONTENTS

STARE

VIDEO CONTENTS

CURSOR CHANGE TO FIT CORRESPONDING WIDGET LOOK

AFTER PRESET TIME

XX:XX — YY:YY

VIDEO CONTENTS

CERTAIN TIME ELAPSED, APPLY WALLPAPER NOT TO SEE SCREEN

FIG. 25

S2601  RECOGNIZE OCCUPANT GAZE

S2602  CONTROL BUTTON DISPLAY

S2603  CONTROL THE INITIATIVE SWITCH

S2604  DIVIDE SCREEN AREA AND CONTROL GAZE INFORMATION BASED DISPLAY

S2901
CONFIRM EXTERNAL INTEREST INFORMATION

S2902
CONFIRM POSITION OF OCCUPANT ONBOARD

S2903
CONTROL DISPLAY

- WHEN DETECTING EXTERNAL
INTEREST INFORMATION, 3D FORM
SYNTHESIZED AND DISPLAYED

- WHEN 3D OBJECT DRAGGED
TO RIGHT, ROTATE TO RIGHT SIDE
BY OPERATED VALUE

Ⓐ

AFTER PRESET TIME

- WHEN NO INPUT FOR N SECS, RESTORED
TO ACTUAL EXTERNAL INTEREST OBJECT POSITION

S3901  CONFIRM OCCUPANT
OPERATION INFORMATION

S3902  CONTROL DISPLAY RELATED TO
EXTERNAL INTEREST INFORMATION

S3903  TRANSMIT EXTERNAL
INTEREST INFORMATION

S4201

S4202

S4501 — CONFIRM EXTERNAL INTEREST OBJECT

S4502 — DISPLAY EXTERNAL INTEREST INFORMATION

S4503 — SET ROUTE ACCORDING TO DESTINATION SETTING REQUEST

SYSTEM FOR CONTROLLING VEHICLE DISPLAY BASED ON OCCUPANT'S GAZE

CROSS-REFERENCE TO RELATED APPLICATIONS

This application claims priority to and the benefit of Korean Patent Application No. 10-2021-0137536, filed on Oct. 15, 2021, Korean Patent Application No. 10-2021-0137537, filed on Oct. 15, 2021, and Korean Patent Application No. 10-2021-0137543, filed on Oct. 15, 2021, the disclosures of which are incorporated herein by reference in their entirety.

BACKGROUND

1. Technical Field

The present disclosure relates to a system for recognizing gaze information of a plurality of occupants in a vehicle, and more particularly, to a system for controlling a vehicle display when a vehicle windshield display area regarding external interest information is crossover.

2. Related Art

An occupant in a vehicle may want to stare at an interesting object (e.g., tree, building, another vehicle, bicycle, motorcycle, etc.) among various objects viewed through a window of the vehicle while driving, and to check information about the interest object.

The related art describes a configuration for synthesizing augmented reality content with a forward object that a driver is highly likely to be watching and outputting the synthesized reality content.

According to the related art, a configuration for minimizing the gaze movement of the driver has been disclosed, but there has been a problem that it is difficult to meet various needs related to the external object identification of the occupant.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

The present disclosure is proposed to solve the aforementioned problem, and the present disclosure is directed to a system for controlling a vehicle display according to a preset standard by recognizing gaze information of an occupant in a vehicle and displaying information about external interest objects of a plurality of occupants on a vehicle windshield display when the external interest objects different from each other.

In addition, the present disclosure is directed to a system for determining a display area for external interest information using gaze information of a plurality of occupants in a vehicle, and controlling a vehicle display according to the characteristics of the external interest information.

In addition, the present disclosure is directed to a system for controlling a vehicle display area position for external interest information of a plurality of occupants in a vehicle and controlling a display time for the external interest information.

In one general aspect, a system for controlling a vehicle display based on an occupant's gaze includes: a first occupant gaze recognition unit configured to recognize a gaze of a first occupant in a vehicle; a second occupant gaze recognition unit configured to recognize a gaze of a second occupant in the vehicle; an interest information display area crossover confirmation and priority determination unit configured to determine interest information from the gaze of the first occupant and the gaze of the second occupant, to determine whether areas for displaying the interest information in a windshield are mutually crossover with each other, and to determine a priority of a display; and a display control unit configured to control a display in accordance with the priority of the display.

The display control unit may be configured to control the display in consideration of preset initiative information when a display area for the interest information of the first occupant and a display area for the interest information of the second occupant overlap with each other.

The display control unit may be configured to control the display so that the display area for the interest information of the first occupant is displayed on a top position while covering the display area for the interest information of the second occupant, when the first occupant is set to have an initiative over the second occupant.

The display control unit may be configured to control the display by moving the display area for the interest information of the second occupant so that the display area for the interest information of the second occupant does not overlap with the display area for the interest information of the first occupant, when the first occupant is set to have an initiative control over the second occupant.

The display control unit may be configured to control the display in consideration of an importance of the interest information, when the display area for the interest information of the first occupant and the display area for the interest information of the second occupant overlap with each other.

The display control unit may be configured to control the display to display the interest information of the first occupant, without displaying the interest information of the second occupant, when it is determined that the interest information of the first occupant has higher importance than the interest information of the second occupant.

The display control unit may be configured to determine whether to display the interest information of the second occupant in the display area assigned to the first occupant, in consideration of at least one of types of content displayed in the display area assigned to the first occupant and an operation situation in relation to the display area assigned to the first occupant.

The system may include a first occupant's external interest information confirmation unit configured to confirm external interest information of the first occupant from the gaze of the first occupant; a second occupant's external interest information confirmation unit configured to confirm external interest information of the second occupant from the gaze of the second occupant; and an external interest information display area confirmation unit configured to confirm a display area for the external interest information of the first occupant and a display area for the external interest information of the second occupant. The interest information display area crossover confirmation and priority determination unit may be configured to determine the priority for display, in consideration of recognition influence on the display area for the external interest information of the first occupant by the display area for the external interest information of the second occupant with relatively low importance of information display.

The display control unit may be configured to perform display control to display only the external interest information of the first occupant without displaying the external interest information of the second occupant when it is determined that the recognition influence exceeds a preset value.

The display control unit may be configured to perform control to display outline information in respect to an original position of an external interest object of the second occupant.

The display control unit may be configured to restore the display area for the external interest information of the second occupant to an area before moving in consideration of the gaze of the first occupant.

In another general aspect, a method for controlling a vehicle display based on an occupant's gaze includes: (a) recognizing gaze information of a plurality of occupants in a vehicle; (b) confirming interest information using the gaze information; (c) confirming whether display areas for the interest information displayed on a windshield that is a transparent display crossover with each other; and (d) performing display control when the display areas of the interest information crossover with each other.

In (d), the display control may be performed in consideration of preset initiative control information according to a result of confirming that a display area for interest information of a first occupant and a display area for interest information of a second occupant overlap with each other.

In (d), when the first occupant is set to have an initiative control than the second occupant, the display control may be performed so that the display area for the interest information of the first occupant is displayed at a top level while covering the display area for the interest information of the second occupant.

In (d), when the first occupant is set to have an initiative control than the second occupant, the display control may be performed so that the display area for the interest information of the second occupant is moved so as to not overlap with the display area for the interest information of the first occupant.

In (d), when the display area for the interest information of the first occupant and the display area for the interest information of the second occupant overlap with each other, the display control may be performed in consideration of importance of the interest information.

In (d), when it is determined that the interest information of the first occupant has higher importance than the interest information of the second occupant, the display control may be performed so that the interest information of the second occupant is not displayed and the interest information of the first occupant is displayed.

In (d), it may be determined whether the interest information of the second occupant is displayed in a display area assigned to the first occupant, in consideration of at least any one of types of content displayed in the display area assigned to the first occupant and an operation situation associated with the display area assigned to the first occupant.

According to the present disclosure, it is possible to obtain an effect of controlling a vehicle windshield display for each area according to a preset priority, in consideration of the needs of a plurality of occupants who want to check information related to different external interest objects through the vehicle windshield display.

In addition, according to the present disclosure, it is possible to obtain an effect of controlling a vehicle display according to a preset priority, in consideration of a display area within the vehicle windshield display for external interest information in which a plurality of occupants are interested.

In addition, according to the present disclosure, it is possible to obtain an effect of controlling a display duration time and a display area of the external interest information according to a preset priority, in consideration of the needs of a plurality of occupants who wish to check information related to different external interest objects through the vehicle windshield display.

However, the effects of the present disclosure are not limited to those described above, and other effects which are not mentioned will be clearly understood by those skilled in the art from the following description.

Other features and aspects will be apparent from the following detailed description, the drawings, and the claims.

BRIEF DESCRIPTION OF THE DRAWINGS

FIGS. 2, 3, and 4 are views showing an indoor layout change based on an occupant's intent according to the embodiment of the present disclosure.

FIG. 8A and FIG. 8B are views showing the vehicle windshield display control for each area, in consideration of priority during a relative movement of an external interest object, according to another embodiment of the present disclosure.

FIG. 10 is a view showing an external interest information display area determination and vehicle display control system based on an occupant's gaze according to another embodiment of the present disclosure.

FIGS. 14, 15, 16, and 17 are views showing an example of vehicle display control in an occupant gaze departure situation according to another embodiment of the present disclosure.

FIGS. 21, 22, and 23 are views showing button display control according to another embodiment of the present disclosure.

FIG. 25 is a view showing display control based on screen area division and gaze information upon another occupant's participation according to another embodiment of the present disclosure.

FIG. 36A and FIG. 36B are views showing a process of sharing the external interest information with a smartphone according to another embodiment of the present disclosure.

FIG. 38A, FIG. 38B, and FIG. 38C are views showing the sharing of the external interest information between displays according to another embodiment of the present disclosure.

DETAILED DESCRIPTION

The aforementioned purposes of the present disclosure and other purposes, advantages and features, and how to achieve them, will become clear with reference to embodiments described below in detail with the accompanying drawings.

However, the present disclosure is not limited to the embodiments described below but may be implemented in various forms different from one another. The following described embodiments are only provided to facilitate the purpose, configuration and effectiveness of the invention to a person of ordinary skill in the art to which the present invention belongs. Thus, the scope of the present disclosure is defined by the description of the claims.

On the other hand, the terms used herein are intended to describe embodiments and are not intended to limit the present disclosure. As used herein, the singular form also includes a plural form unless otherwise noted in the phrase. The terms "comprises" and/or "comprising" as used in the specification do not preclude the presence or addition of one or more other constituent elements, steps, operations and/or elements to the mentioned constituent elements, steps, operations and/or elements.

Figure 1:
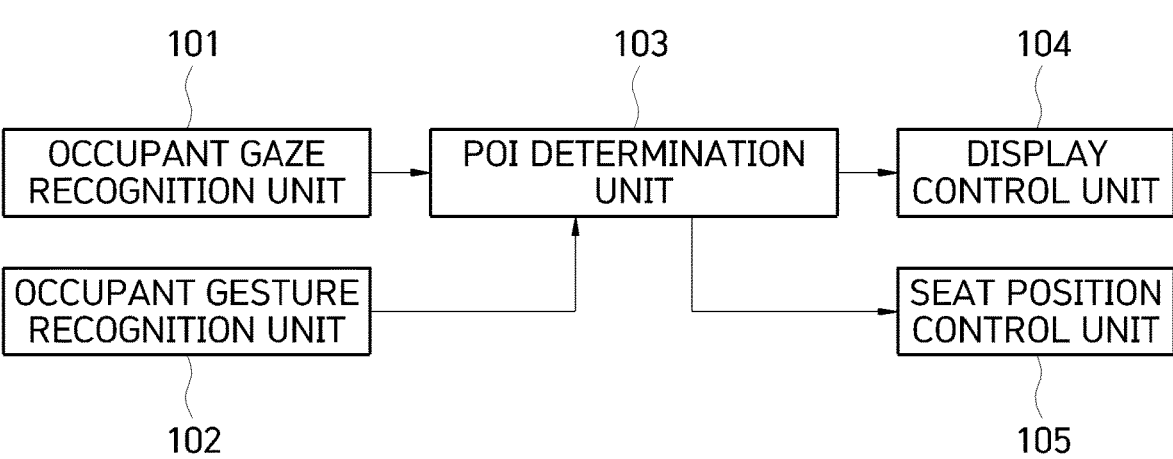
FIG. 1 is a view showing a system for controlling a vehicle based on an occupant's intent according to an embodiment of the present disclosure.

FIG. 1 is a view showing a system for controlling a vehicle based on an occupant's intent according to an embodiment of the present disclosure.

The system for controlling a vehicle based on an occupant's intent according to the embodiment of the present disclosure includes: an occupant gaze recognition unit 101 configured to recognize a gaze of an occupant in a vehicle; a point of interest determination unit 103 configured to determine a point of interest, among external objects viewed through a side window of the vehicle in consideration of the gaze of the occupant; and a seat position control unit 105 configured to change a seat position of the occupant to enable a continuous stare at the point of interest as the vehicle moves.

The system for controlling a vehicle based on an occupant's intent according to the present disclosure further includes: an occupant gesture recognition unit 102 configured to recognize at least any one of a touch input signal of the occupant and an air gesture of the occupant that is applied to the side window of the vehicle configured as a transparent display; and the point of interest determination unit 103 determines the point of interest as at least any one of the touch input signal and the air gesture is recognized.

The seat position control unit 105 transmits a control signal to rotate a seat in which the occupant is seated, in consideration of a traveling direction and travel speed of the vehicle.

The seat position control unit 105 transmits a control signal to rotate a seat of a first occupant, in consideration of gazes of a plurality of vehicle occupants that stare the same point of interest, and transmits a control signal to rotate a seat of a second occupant with forward or backward sliding for the seat of the second occupant.

The system for controlling a vehicle based on an occupant's intent according to the present disclosure further includes a display control unit 104 configured to control, when it is confirmed that the gazes of the plurality of vehicle occupants stare at the same point of interest and then it is determined that a field of view of the second occupant is blocked by the first occupant, an outer area, viewed through a first side window close to a seating position of the first occupant, to be displayed through a second side window close to a seating position of the second occupant. At this time, the seat position control unit 105 transmits the control signal to rotate the seat of the first occupant in a first direction, and transmits the control signal to rotate the seat of the second occupant in an opposite direction to the first direction.

Figure 2:
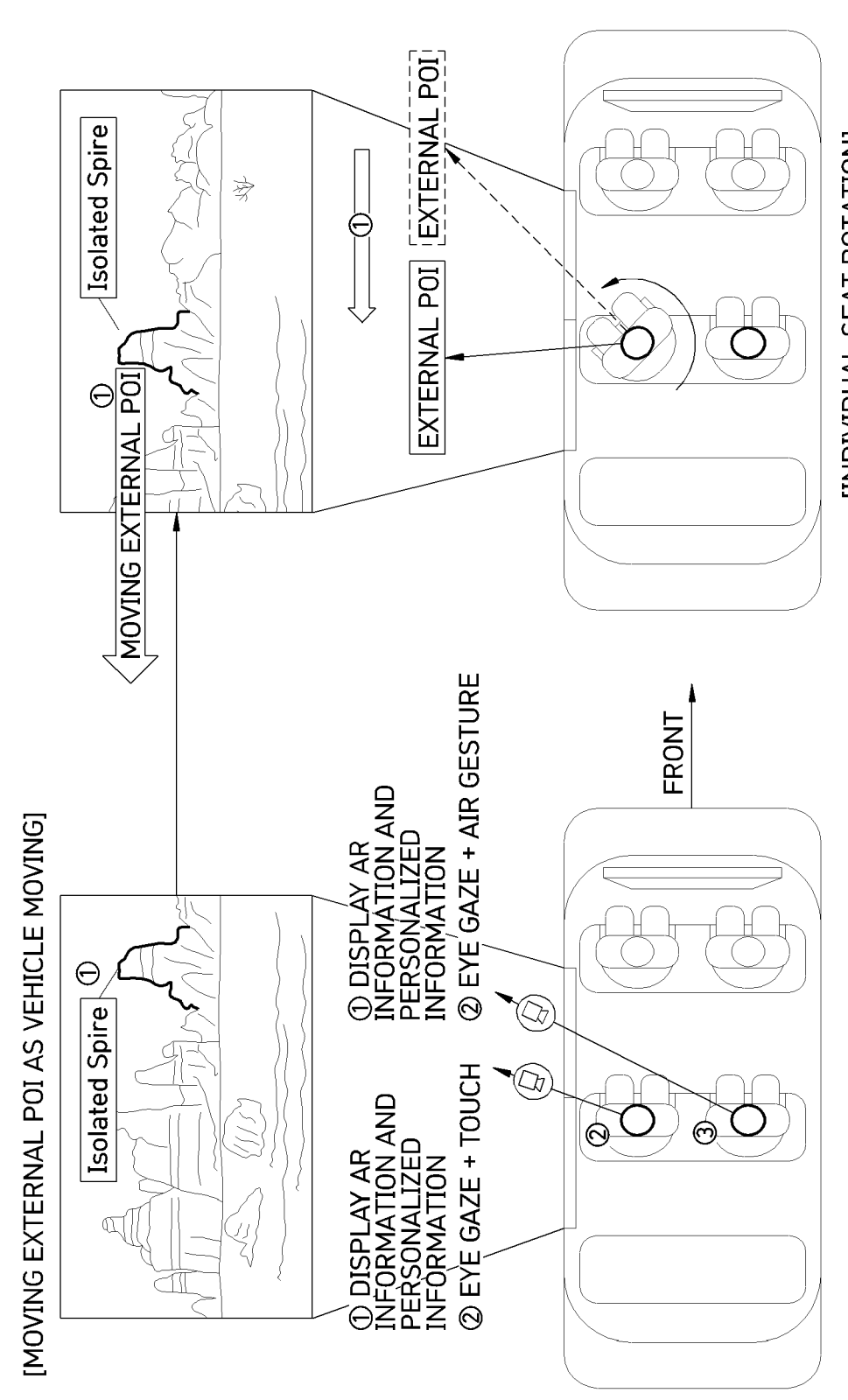
Figure 3:
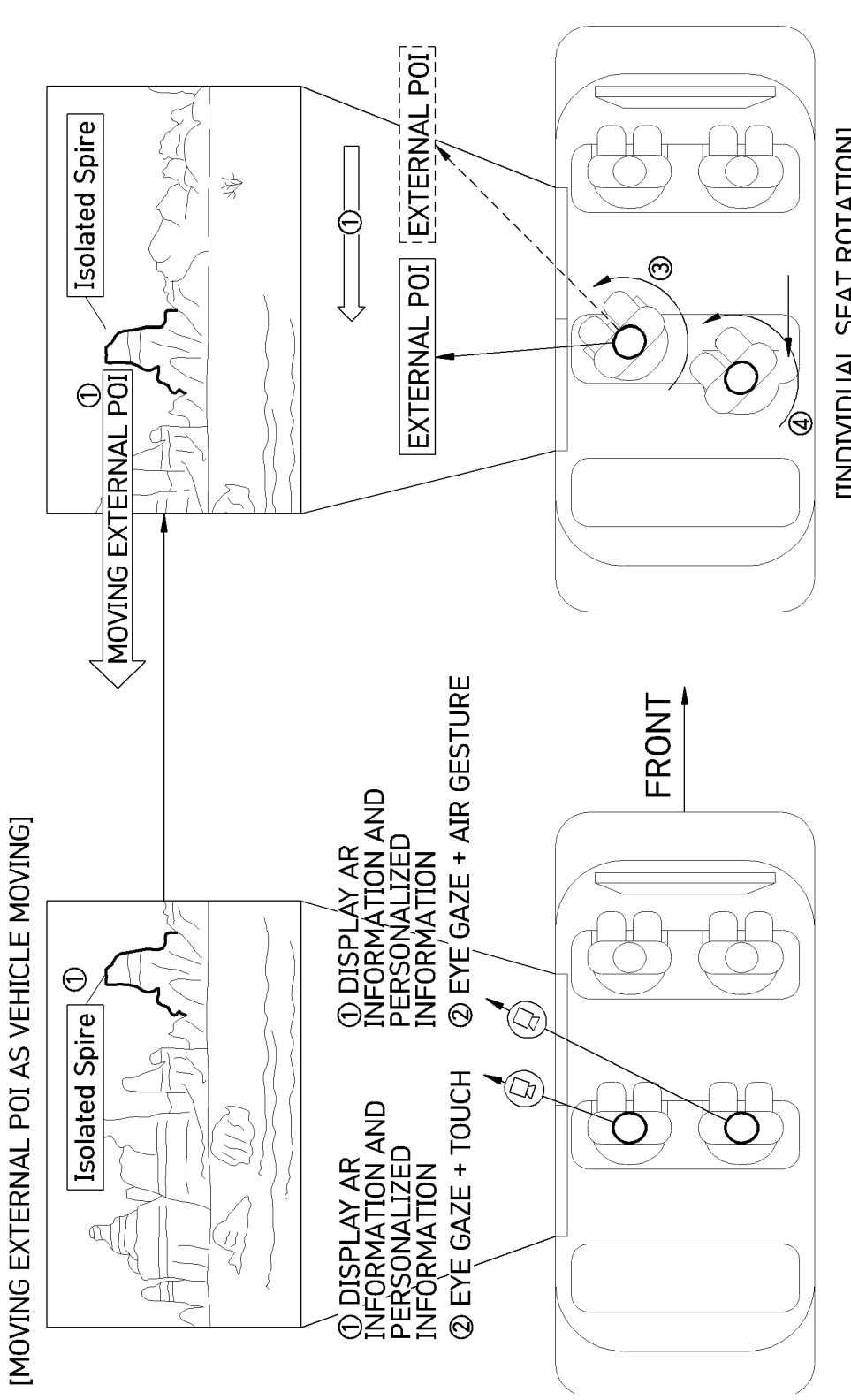

FIGS. 2 to 4 are a view showing an indoor layout change based on an occupant's intent according to the embodiment of the present disclosure.

Referring to FIGS. 2 to 4, it is assumed that among persons in the vehicle traveling forward, there is a first occupant in a left rear seat and a second occupant in a right rear seat.

The first occupant is a person close to a transparent display of a left side window, and performs touch operations on the transparent display, and the second occupant is a person far from the transparent display of the left side window, and performs an operation through an air gesture.

According to the embodiment of the present disclosure, the gaze of the occupant is recognized and AR information personalized for each occupant based on a gaze information is displayed through the transparent display of the left side window.

Referring to FIG. 2, when the first occupant inputs a touch signal into the area of an external object (isolated spire) viewed through the transparent display of the left side window, the point of interest determination unit 103 determines that an external particular object is the interest object, in consideration of the gaze of the first occupant and the touch signal application area of the first occupant.

The display control unit 104 displays specific information about the interest object through the transparent display of the left side window, in the form of text, images, icons, etc.

In addition, the display control unit 104 may provide the information about the interest object as a sound source through a speaker and may also independently provide the sound source to the first occupant through a directional speaker or a headrest speaker disposed at the left rear seat.

As the vehicle travels forward, the external interest object viewed through the left side window is moved in a left backward direction relative to a vehicle body.

When it is checked that the gaze of the first occupant stays on the interest object and the first occupant turns his/her head in the left backward direction and intends to continuously stare at the interest object, the seat position control unit 105 rotates the left rear seat, on which the first occupant is seated, in a counterclockwise direction, allowing the first occupant to continuously stare at the interest object in a more comfortable position.

At this time, the seat position control unit 105 determines that the first occupant wants to continuously stare at the interest object when a staring duration time of the first occupant for the interest object obtained through the occupant gaze recognition unit 101 is equal to or longer than a preset time, and the seat position control unit 105 controls a rotational speed of the left rear seat on which the first occupant is seated in accordance with the driving speed of the driving vehicle and the relative movement speed of the external interest object.

When the seat position control unit 105 predicts that a sharp seat rotation will be required and will cause discomfort to the first occupant in a case in which the seat is rotated in accordance with the relative movement of the external interest object during high-speed driving equal to or higher than a predetermine speed (e.g., 50 Km/h), the seat position control unit 105 does not perform the rotation operation on the seat.

The occurrence of discomfort is predicted based on a predetermined reference seat rotation speed.

At this time, the seat position control unit 105 determines whether to perform a seat rotation operation based not only on the driving speed of the driving vehicle, but also on a distance information between the external interest object and the vehicle.

For example, in a situation where an external interest object is 50 meters away from the driving vehicle, when the seat is rotated so that the first occupant can continuously stare at the external interest object at the driving speed, a sharp seat rotation is required, whereas when an external interest object is 500 meters away from the driving vehicle, even if the seat is rotated so that the first occupant can continuously stare at the external interest object at the driving speed, a sharp seat rotation is not required.

Thus, the seat position control unit 105 comprehensively considers the driving speed of the driving vehicle and the distance between the external interest object at which the first occupant wants to continuously stare and the driving vehicle, to determine whether to rotate the seat of the first occupant so that the first occupant can continuously and comfortably stare at the external interest object without turning his/her head.

As the vehicle travels further forward, when it is determined that the interest object is out of the range of vision of the first occupant, the seat position control unit 105 rotates the left rear seat, on which the first occupant is seated, in a clockwise direction to return the left rear seat to its original position.

In addition, the seat position control unit 105 rotates the left rear seat, on which the first occupant is seated, in the clockwise direction to return the left rear seat to its original position when the gaze information obtained through the occupant gaze recognition unit 101 no longer stays on the interest object for a certain period of time or longer.

Referring to FIG. 3, it is assumed that the first occupant inputs a touch signal into a corresponding area while staring at an external object (isolated spire) viewed through the transparent display of the left side window, and the second occupant performs a predetermined air gesture while staring at the same external object (isolated spire) viewed through the transparent display of the left side window.

That is, the first occupant and the second occupant designate the same external object as an external point of interest (POI).

The point of interest determination unit 103 and determines that an external particular object is the interest object, in consideration of the gaze of the first occupant, the touch signal application area of the first occupant, the gaze of the second occupant, and the air gesture of the second occupant.

The display control unit 104 displays a specific information of the interest object through the transparent display of the left side window, in the form of text, images, icons, etc.

In addition, the display control unit 104 may provide the information about the interest object as a sound source through a speaker, and in this case, the display control unit 104 may also provide the sound source to the first and second occupants, through a directional speaker facing the occupants seated on the rear seats, a headrest speaker disposed at the left rear seat, and a headrest speaker disposed at the right rear seat.

As the vehicle travels forward, the external interest object viewed through the left side window is moved in the left backward direction relative to the vehicle body.

When it is confirmed that the gazes of the first occupant and the second occupant stay on the interest object and the first occupant and the second occupant are then continuously staring at the interest object by turning their heads in the left backward direction, the seat position control unit 105 rotates the left rear seat, on which the first occupant is seated, in the counterclockwise direction, allowing the first occupant to continuously stare at the interest object in a more comfortable position.

In addition, in consideration of the field of view of the second occupant obscured by the first occupant as the external interest object is relatively moved, the seat position control unit 105 slides the right rear seat, on which the second occupant is seated, backward of the vehicle body and rotates the right rear seat in the counterclockwise direction, so that the second occupant can more easily and continuously stare at the interest object.

As the vehicle travels further forward, when it is determined that the interest object is out of the ranges of visions of the first occupant and the second occupant, the seat position control unit 105 rotates the left rear seat, on which the first occupant is seated, in the clockwise direction, and slides forward the right rear seat on which the second occupant is seated and rotates the right rear seat in the clockwise direction, to return the left and right rear seats to their original seat positions.

Referring to FIG. 4, it is assumed that the first occupant inputs a touch signal into the area while staring at the external object (isolated spire) viewed through the transparent display of the left side window, and the second occupant performs a predetermined air gesture while staring at the same external object (isolated spire) viewed through the transparent display of the left side window.

That is, the first occupant and the second occupant designate the same external object as the external POI.

The point of interest determination unit 103 determines that an external particular object is the interest object, in consideration of the gaze of the first occupant, the touch signal application area of the first occupant, the gaze of the second occupant, and the air gesture of the second occupant.

The display control unit 104 displays the specific information of the interest object through the transparent display of the left side window, in the form of text, images, icons, etc.

In addition, the display control unit 104 may provide the information about the interest object as a sound source through a speaker, and in this case, the display control unit 104 may also provide the sound source to the first and second occupants, through a directional speaker facing the occupants seated on the rear seats, a headrest speaker disposed at the left rear seat, and a headrest speaker disposed at the right rear seat.

As the vehicle travels forward, the external interest object shown through the left side window is moved in a left backward direction relative to the vehicle body.

When it is confirmed that the gaze of the first occupant stays on the interest object and the first occupant is then continuously staring at the interest object by turning his/her head in the left backward direction, the seat position control unit 105 rotates the left rear seat, on which the first occupant is seated, in the counterclockwise direction, allowing the first occupant to continuously stare at the interest object in a more comfortable position.

In addition, in consideration of the field of view of the second occupant blocked by the first occupant as the external interest object is relatively moved, the display control unit 104 duplicates and displays the screen of an outer landscape viewed through the transparent display of the left side window through the display of the right side window, and the seat position control unit 105 rotates the right rear seat, on which the second occupant is seated, in the clockwise direction so that the second occupant can more easily and continuously stare at the interest object through the display of the right side window.

When it is determined that the interest object is out of the ranges of views of the first occupant and the second occupant as the vehicle travels further forward, the seat position control unit 105 rotates the left rear seat, on which the first occupant is seated, in the clockwise direction, and rotates the right rear seat, on which the second occupant is seated, in the counterclockwise direction, to return the left and right rear seats to their original seat positions.

Figure 5:
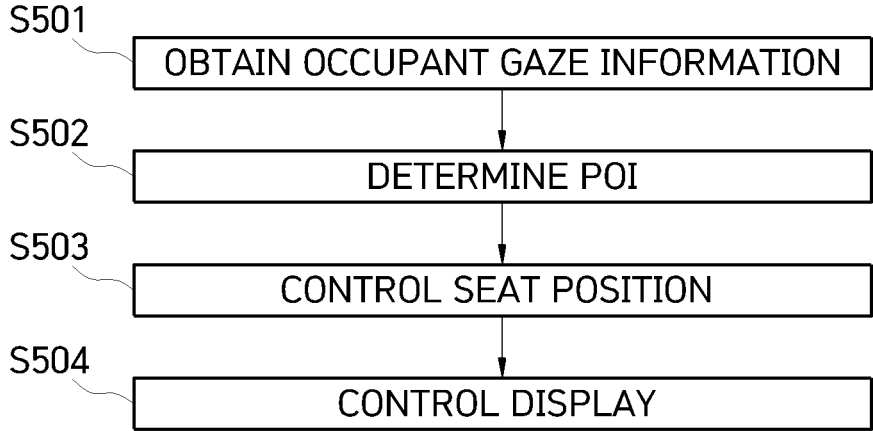
FIG. 5 is a view showing a method for controlling a vehicle based on an occupant's intent according to an embodiment of the present disclosure.

FIG. 5 is a view showing a method of controlling a vehicle based on an occupant's intent according to another embodiment of the present disclosure.

The method of controlling a vehicle based on an occupant's intent according to the embodiment of the present disclosure includes: a step S501 for obtaining gaze information of an occupant in a vehicle; a step S502 for determining a point of interest located outside the vehicle using the gaze information; and a step S503 for changing a seat position of the occupant to enable a continuous stare at the point of interest as the vehicle moves.

In the step S503, a seat on which the occupant is seated is rotated in consideration of the driving direction and driving speed of the vehicle.

When the gaze information of a plurality of occupants is obtained in the step S501, and the points of interest of the plurality of occupants are determined to be the same in the step S502, a seat of a first occupant is rotated, and a seat of a second occupant is slid forward or backward and rotated, in the step S503.

The method of controlling a vehicle based on an occupant's intent according to the present disclosure further includes a step S504 for controlling an outer area, including the points of interest, which are viewed through a first side window close to the seating position of the first occupant, to be displayed through a second side window close to the seating position of the second occupant, when the gaze information of the plurality of occupants is obtained in the step S501 and the points of interest of the plurality of occupants are determined to be the same in the step S502.

Figure 6:
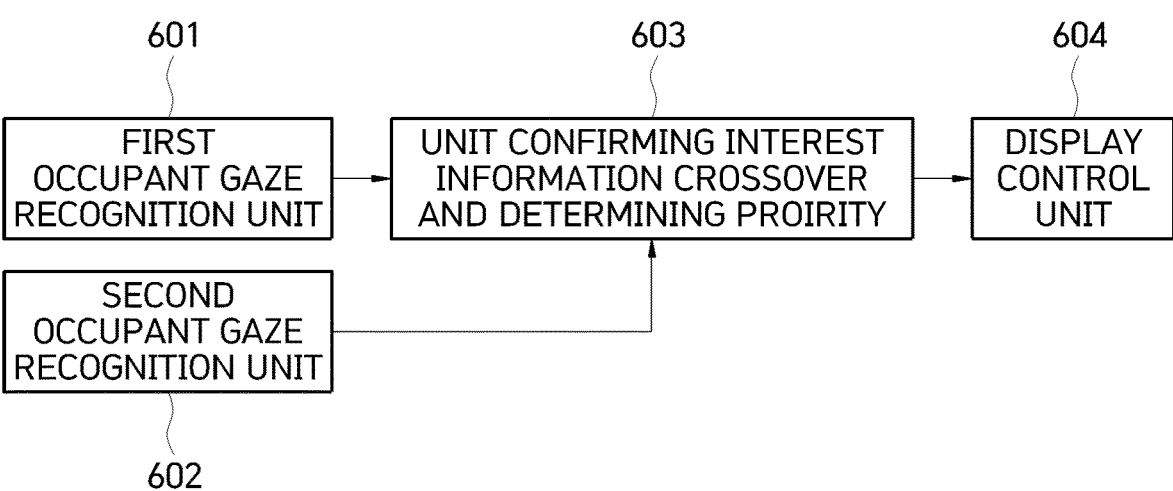
FIG. 6 is a view showing a vehicle display control system based on an occupant's gaze according to another embodiment of the present disclosure.

FIG. 6 is a view showing a vehicle display control system based on an occupant's intent according to another embodiment of the present disclosure.

The vehicle display control system based on an occupant's intent according to the embodiment of the present disclosure includes: a first occupant gaze recognition unit 601 configured to recognize a gaze of a first occupant in a vehicle; a second occupant gaze recognition unit 602 configured to recognize a gaze of a second occupant in the vehicle; a unit for confirming an interest information display area crossover and determining priority 603 configured to determine interest information from the gazes of the first occupant and the second occupant, to confirm whether areas for displaying the interest information crossover with each other on a windshield, and to determine a priority for display; and a display control unit 604 configured to control the display according to the priority for display.

The display control unit 604 performs display control in consideration of a predetermined initiative information when an interest information display area of the first occupant and an interest information display area of the second occupant overlaps with each other.

When the first occupant, not the second occupant, is set to have the initiative, The display control unit 604 performs control to display the interest information display area of the first occupant at a top position while covering the interest information display area of the second occupant with the interest information display area of the first occupant.

When the first occupant, not the second occupant, is set to have the initiative, the display control unit 604 performs control to move the interest information display area of the second occupant and to allow the interest information display area of the second occupant not to overlap with the interest information display area of the first occupant.

The display control unit 604 performs control in consideration of the importance of the interest information when the interest information display area of the first occupant and the interest information display area of the second occupant overlap with each other.

When the display control unit 604 determines that the interest information of the first occupant has the importance higher than that of the interest information of the second occupant, the display control unit 604 performs control not to display the interest information of the second occupant, but to display the interest information of the first occupant.

In consideration of at least any one of the types of content displayed in a display area assigned to the first occupant and an operation situation associated with the display area assigned to the first occupant, the display control unit 604 determines whether to display the interest information of the second occupant in the display area assigned to the first occupant.

Figure 7A:
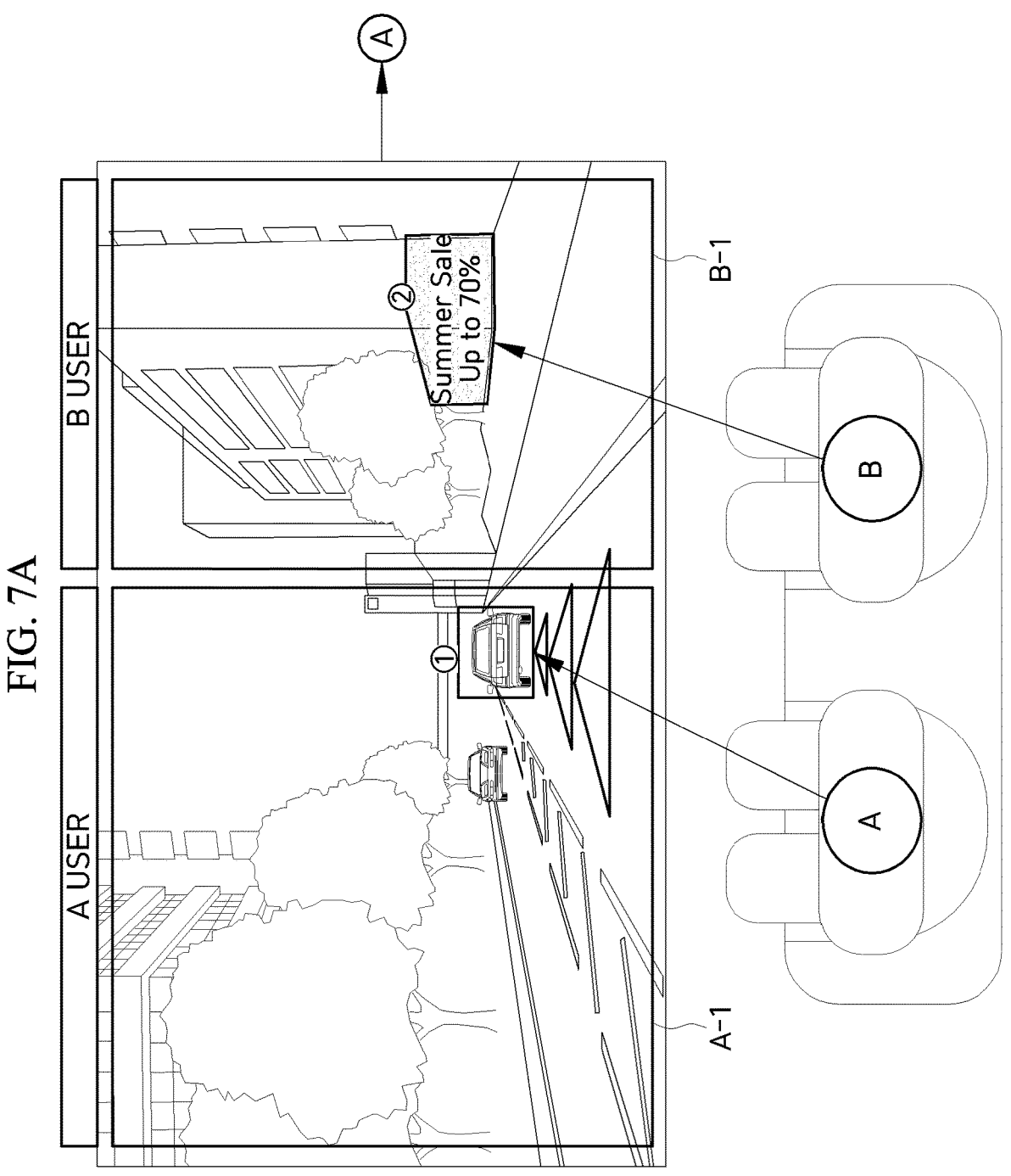
FIG. 7A and FIG. 7B are views showing vehicle windshield display control for each area, in consideration of priority, according to another embodiment of the present disclosure.
Figure 7B:
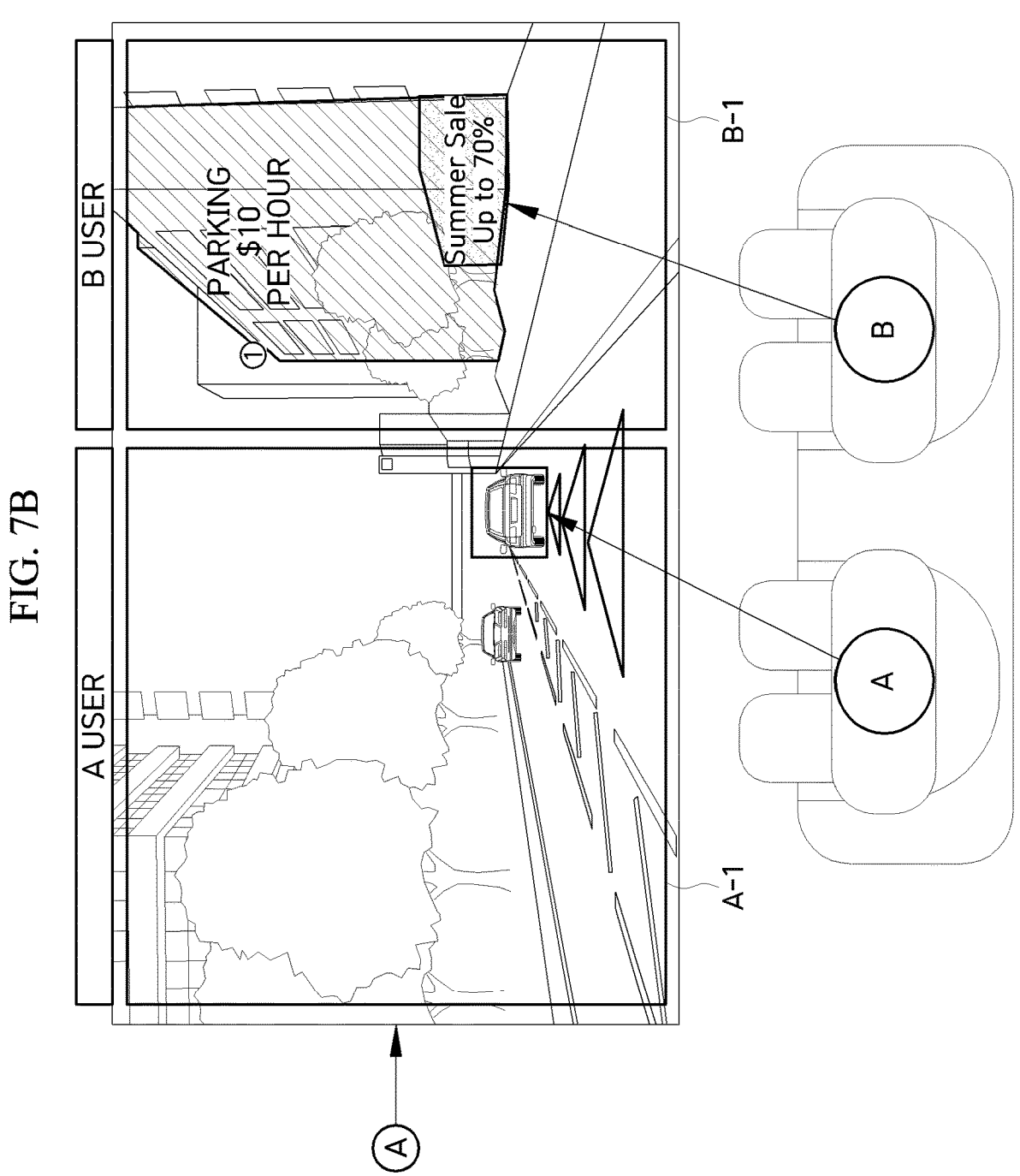

FIG. 7A and FIG. 7B are views showing vehicle windshield display control for each area, in consideration of priority, according to another embodiment of the present disclosure.

Referring to FIG. 7A, a driver A and a passenger B look at external objects through a front windshield of a vehicle.

At this time, when the driver A stares at a forward vehicle located in an area of W for a preset time or longer, driving-related information is displayed according to a result of tracking a gaze of the driver A, for example, a distance from the forward vehicle, navigation information-based AR route guidance information, etc. are displayed in a first area A-1 of the front windshield which is a transparent display.

The passenger B stares at a store located in an area of ② for the preset time or longer, and accordingly, the information of the store (e.g., summer sale, up to 70%) is displayed in a second area B-1 of the front windshield, which is the transparent display.

Referring to FIG. 7B, the driver A looks at a parking tower (e.g., the parking tower is a destination set on a navigation route) located in the area of ①, and accordingly, the information of the parking tower (e.g., parking cost per hour) is displayed in the second area B-1 of the front windshield, which is the transparent display.

At this time, as described above, a display area (that is, some of the second area B-1 of the front windshield, which is the transparent display) for the information (e.g., summer sale, up to 70%) of the store located in the area of ② (e.g., summer sale, up to 70%) according to the gaze of the passenger B and a display area for the information of the parking tower located in the area of ① according to the gaze of the driver A overlap with each other.

For example, the display control unit 604 performs control to display the external interest information area of the driver A and the external interest information area of the passenger B while overlapping the areas with each other. At this time, on the contrary, as the gaze of the passenger B stares at the store located in the first area A-1, when displaying the information about the store located in the first area A-1 on the front windshield, which is the transparent display, if it is determined that the display area for the information will overlap with the display area for the object at which driver A stares, the display control unit 604 performs control to display only the information about the object, at which the driver A stares, but not to display the external interest information according to the gaze of the passenger B.

As another example, the display control unit 604 confirms that the display priority of the information displayed on the transparent display according to the gaze of driver A is higher than the display level of the information displayed on the transparent display according to the gaze of the passenger B, and displays the external interest information area of the driver A in front of the external interest information area of the passenger B (i.e., some of the external interest information area of the passenger B may be covered).

As still another example, the display control unit 604 confirms that the display priority of the information displayed on the transparent display according to the gaze of the driver A is higher than the display level of the information displayed on the transparent display according to the gaze of the passenger B, and moves the display area for the external interest information of the passenger B so that the display area does not overlap with the display area for the external interest information of the driver A.

For example, in the case of FIG. 7B, the display control unit 604 performs control to move the display area for the information of the store (e.g., summer sale, up to 70%) to the bottom right, so that the display area does not overlap with the display area for the information of the parking tower.

That is, when the driver A, not the passenger B, has the initiative, the display control unit 604 performs control to display the display area for the external interest information, at which the driver A stares, in preference to the display area for the external interest information at which the passenger B stares.

In addition, when the information provided according to the gaze recognition of the occupant is driving, safety-related information (e.g., a lane, a speed limit, a traffic light, information about a distance from a forward vehicle, etc.), the display control unit 604 performs control to display a display area for the external interest information in preference to other information (e.g., store information, etc.) display area.

Figure 8A:
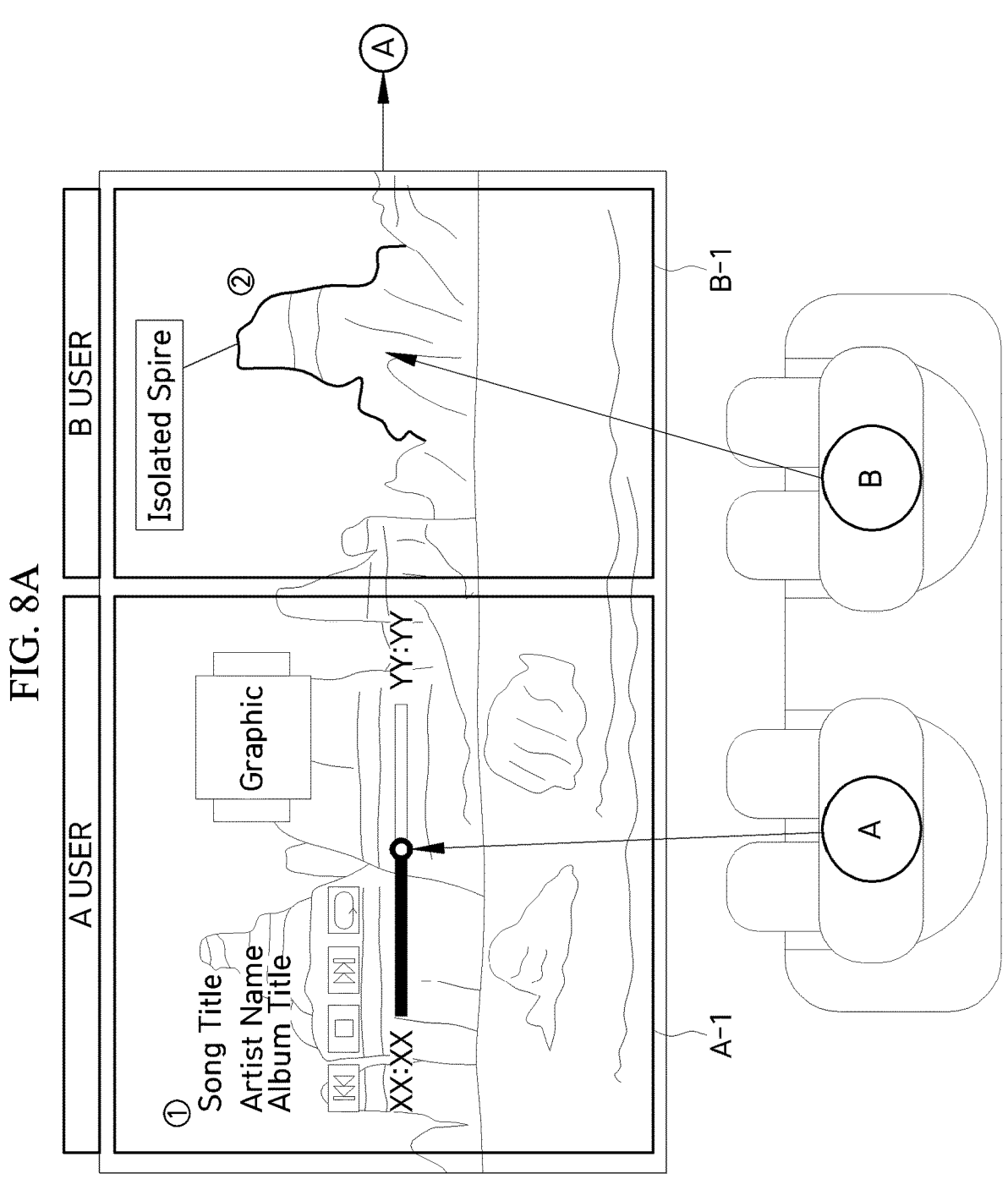
Figure 8B:
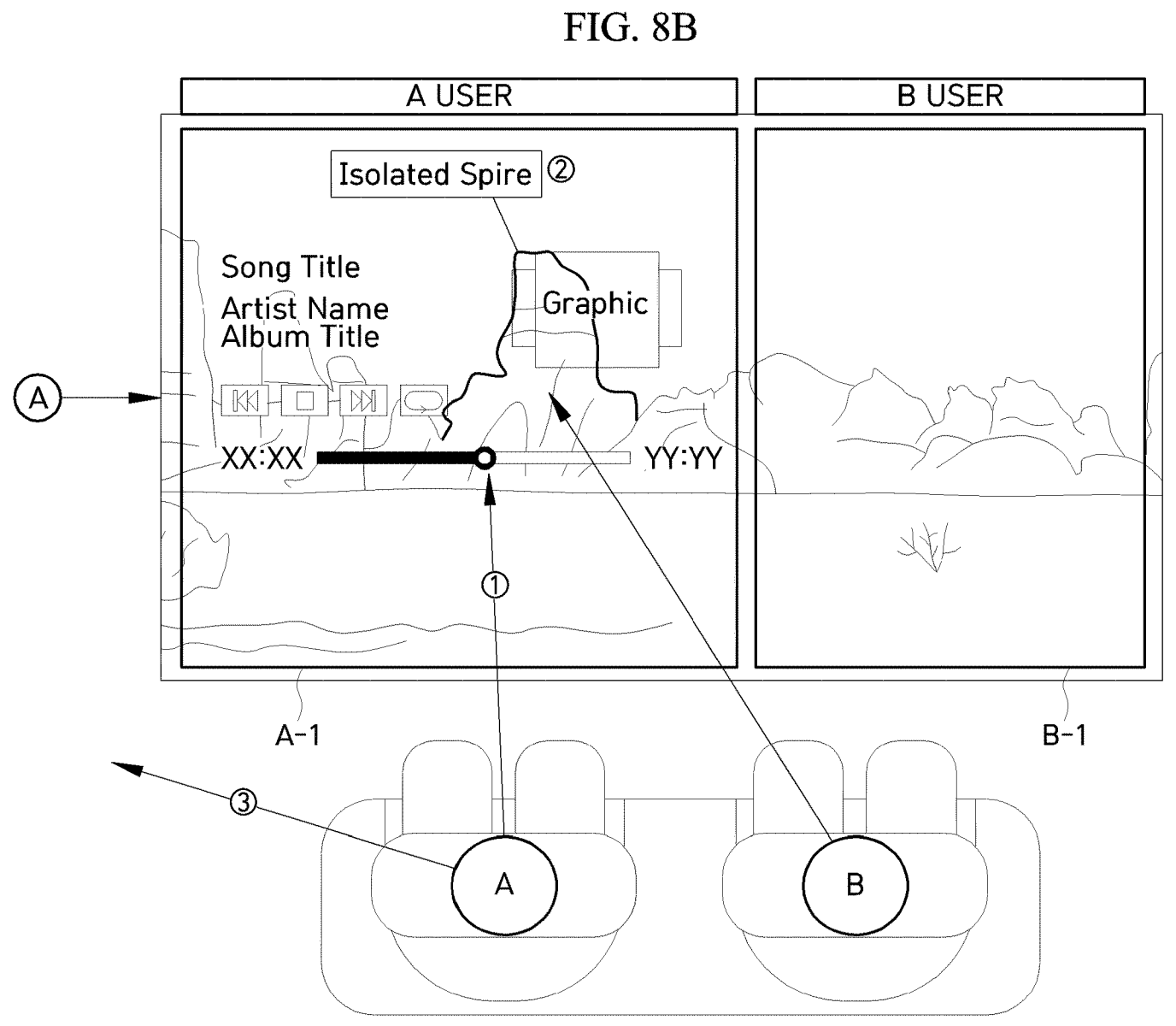

FIG. 8A and FIG. 8B are views showing the vehicle windshield display control for each area, in consideration of priority during a relative movement of an external interest object, according to the embodiment of the present disclosure.

Referring to FIG. 8A, a first occupant A and a second occupant B look an external object through a windshield of a left side window of a vehicle.

At this time, a music player is displayed in a first area A-1 according to the needs of the first occupant A, and an outline of the external interest object (Isolated Spire) is displayed in a second area B-1 according to the needs of the second occupant B.

Referring to FIG. 8B, as the vehicle travels forward, when the interest information of the second occupant B invades a display area A-1 of the first occupant A, the display control unit 604 performs display control for the first area A-1 and the second area B-1 in consideration of the attributes of the content and the gaze monitoring results of the first occupant A.

Referring to FIG. 8B, when the content displayed in the display area A-1 of the first occupant A is a content (e.g., music, weather, movies, etc.) that is not the external interest information based on the gaze information of the first occupant A, depending on the type of content or the screen operation state of the first occupant A, the display control unit 604 determines whether to display the information of the external interest object of the second occupant B on the first area A-1 while the information invades the first area A-1.

When the first occupant A selects music in the first area A-1, the display control unit 604 performs control not to display the information of the external interest object of the second occupant B in the first area A-1 so that the information does not interfere with the screen operation of the first occupant A.

In addition, if the first occupant A is watching a movie in the first area A-1, the display control unit 604 performs control not to display the information of the external interest object of the second occupant B in the first area A-1 so that the information does not interfere with the first occupant A that watches a movie.

As another example, when the first occupant A is not performing an operation on the content execution in the first area A-1, the display control unit 604 performs control to display the information of the external interest object of the second occupant B in the first area A-1.

In addition, if it is confirmed that the first occupant A is staring at another place for a certain period of time or longer, as in ③, the display control unit 604 performs control to display the information of the external interest object of the second occupant B in the first area A-1.

Figure 9:
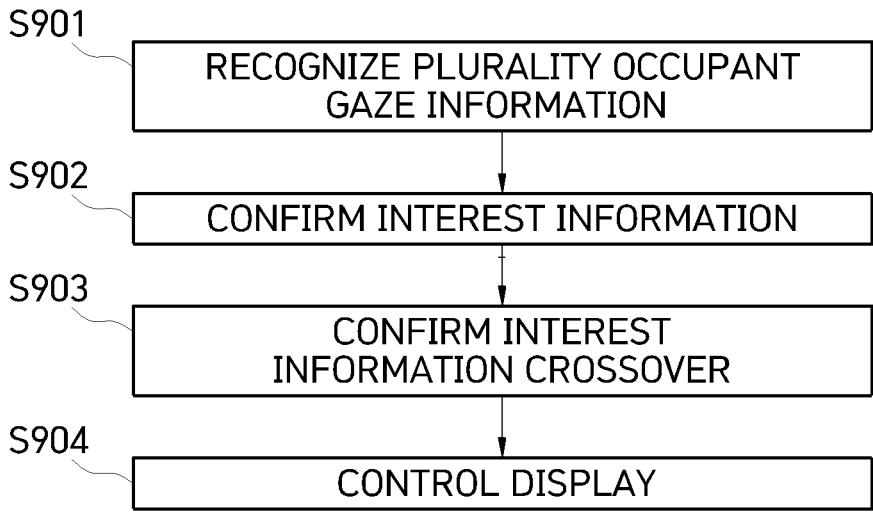
FIG. 9 is a view showing a vehicle display control method based on an occupant's gaze according to another embodiment of the present disclosure.

FIG. 9 is a view showing a vehicle display control method based on an occupant's gaze according to another embodiment of the present disclosure.

The vehicle display control method based on an occupant's gaze according to the embodiment of the present disclosure includes: a step S901 for recognizing gaze information of a plurality of occupants in a vehicle; a step S902 for confirming interest information using the gaze information; a step S903 for confirming whether display areas of the interest information displayed on a windshield being a transparent display crossover with each other; and a step S904 for performing display control when the display areas of the interest information crossover.

In the step S904, the display control is performed in consideration of predetermined initiative information according to the result that it is confirmed that an interest information display area of the first occupant and an interest information display area of the second occupant overlap with each other.

In the step S904, when the first occupant, not the second occupant, is set to have an initiative, the display control is performed such that the interest information display area of the first occupant is displayed at a top position while covering the interest information display area of the second occupant.

In step S904, when the first occupant, not the second occupant, is set to have the initiative, the display control is performed such that the interest information display area of the second occupant is moved so that the interest information display area of the second occupant does not overlap with the interest information display area of the first occupant.

In the step S904, when the interest information display area of the first occupant and the interest information display area of the second occupant overlap with each other, the display control is performed in consideration of the importance of the interest information.

In the step S904, when it is determined that the interest information of the first occupant the importance higher than that of the interest information of the second occupant, the display control is performed such that the interest information of the second occupant is not displayed, but the interest information of the first occupant is displayed.

In the step S904, in consideration of at least any one of the types of content displayed in the display area assigned to the first occupant and the operation situation associated with the display area assigned to the first occupant, it is determined whether to display the interest information of the second occupant in the display area assigned to the first occupant.

FIG. 10 is a view showing an external interest information display area determination and vehicle display control system based on an occupant's gaze according to another embodiment of the present disclosure.

The external interest information display area determination and vehicle display control system based on an occupant's gaze according to the embodiment of the present disclosure includes: a first occupant gaze recognition unit 1001 configured to recognize a gaze of a first occupant in a vehicle; an external interest information confirmation unit 1003 of the first occupant configured to confirm an external interest information of the first occupant from the gaze of the first occupant; a second occupant gaze recognition unit 1002 configured to recognize a gaze of a second occupant in the vehicle; an external interest information confirmation unit 1004 of the second occupant configured to confirm the external interest information of the second occupant from the gaze of the second occupant; an external interest information display area confirmation unit 1005 configured to confirm a display area for external interest information of the first occupant and a display area for external interest information of the second occupant; and a display control unit 1006 configured to determine a priority for display, in consideration of a recognition influence on the display area for the external interest information of the first occupant by the display area for the external interest information of the second occupant with relatively low information display importance.

When it is determined that the recognition influence is equal to or lower a predetermined value, the display control unit 1006 performs display control to display the external interest information of the second occupant together with the external interest information of the first occupant.

When it is determined that the recognition influence exceeds the predetermined value, the display control unit 1006 performs display control not to display the external interest information of the second occupant, but to display only the external interest information of the first occupant.

When it is determined that the recognition influence exceeds the predetermined value, the display control unit 1006 performs display control to move the display area for the external interest information of the second occupant so that the moved display area for the external interest information of the second occupant does not invade the display area for the external interest information of the first occupant.

The display control unit 1006 performs display control to display an outline information about an original position of an external interest object of the second occupant.

Figure 11A:
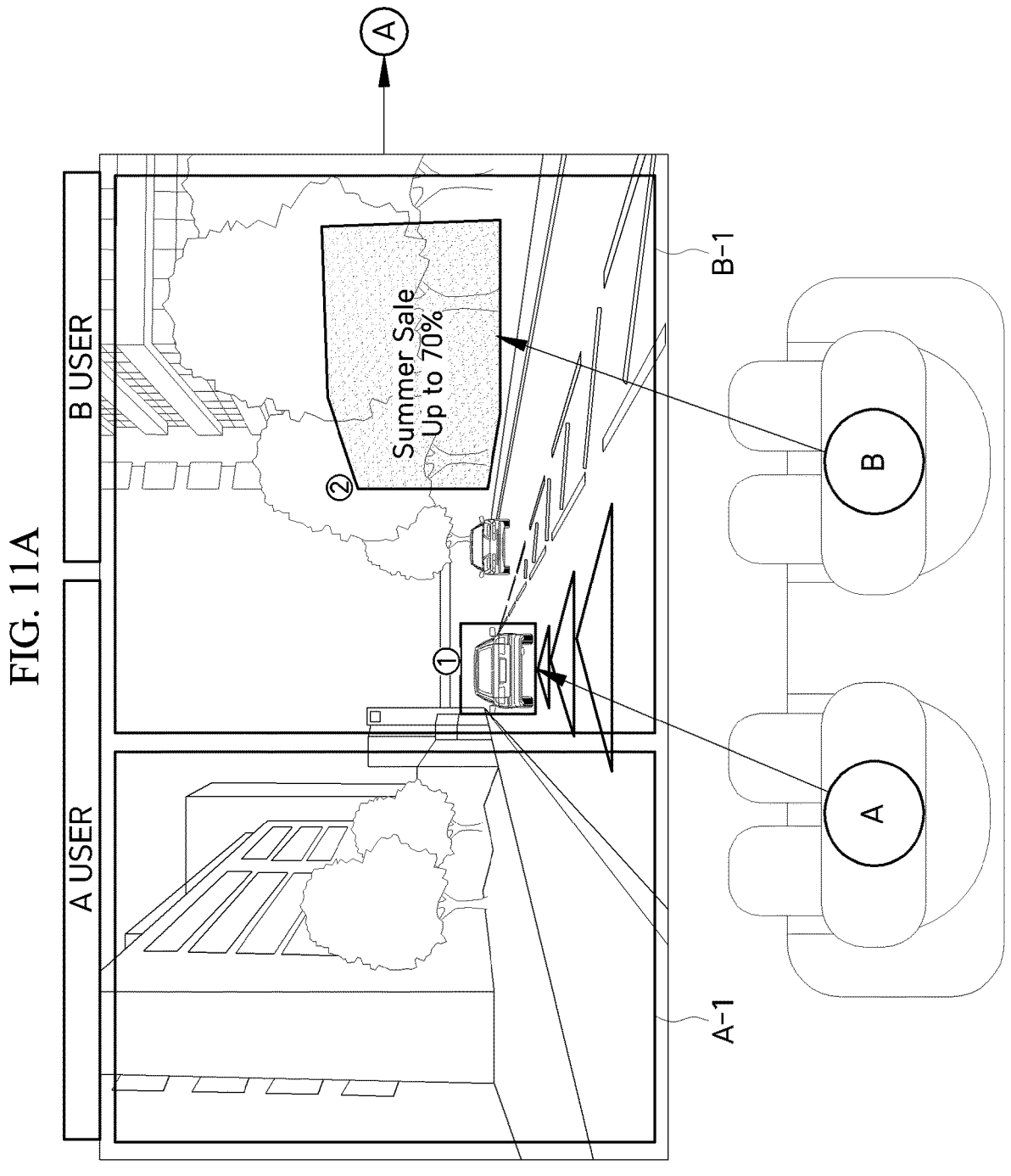
FIG. 11A, FIG. 11B, and FIG. 11C are views showing external interest information display area determination and display control according to another embodiment of the present disclosure.
Figure 11B:
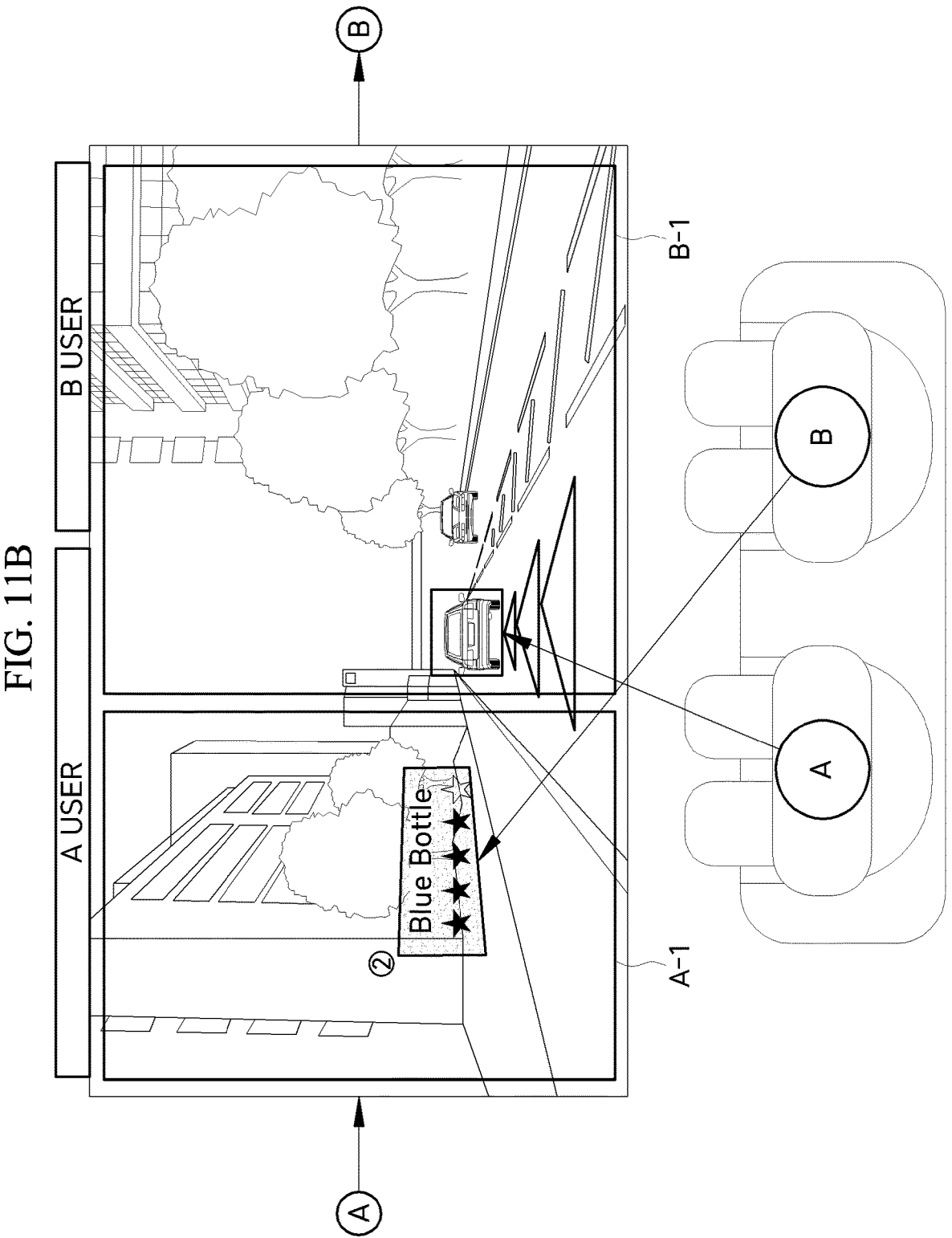
Figure 11C:
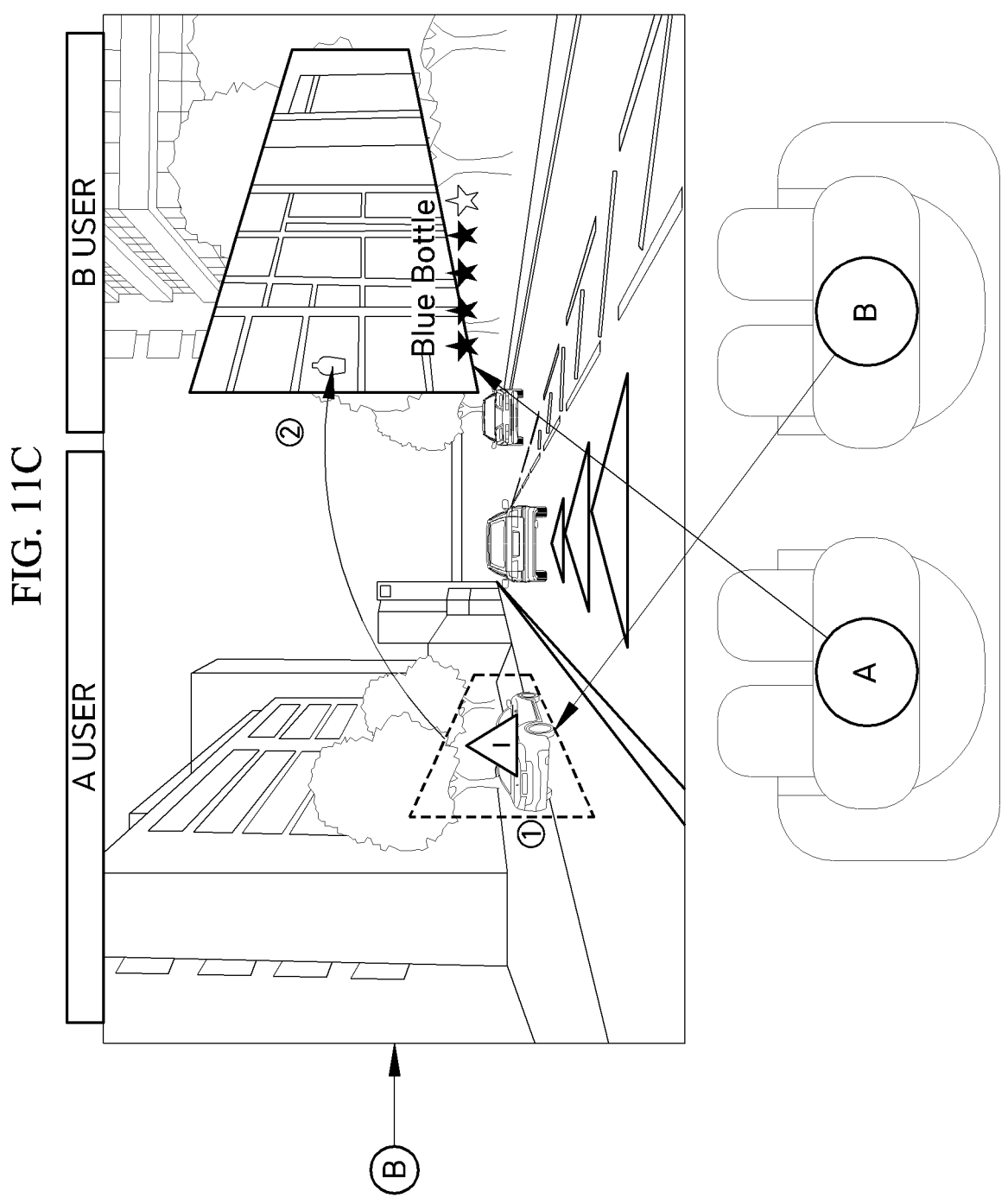

FIG. 11A to FIG. 11C are views showing external interest information display area determination and display control according to another embodiment of the present disclosure.

Referring to FIG. 11A to FIG. 11C, a driver A and a passenger B in a vehicle look at external objects through a front windshield of the vehicle.

Referring to FIG. 11A, when the driver A stares at a forward vehicle located in the area of ① for a preset time or longer, driving-related information is displayed according to a result of tracking a gaze of the driver A, for example, a distance from the forward vehicle, navigation information-based AR route guidance information, etc. are displayed in a first area A-1 of the front windshield configured as a transparent display. The passenger B stares at a store located in the area of ② for the preset time or longer, and accordingly, the information of the store (e.g., summer sale, up to 70%) is displayed in a second area B-1 of the front windshield, which is a transparent display.

Referring to FIG. 11B, according to the gaze movement of the passenger B, a display area for the external interest information corresponding to ② is moved to the first area A-1.

At this time, the display control unit 1006 performs control to display the external interest information of the passenger B in the first area A-1 when it is confirmed that the display area for the external interest information of the passenger B does not overlap with the display area for the external interest information of the driver A.

Referring to FIG. 11C, according to the gaze movement of the driver A, a rear side warning notification corresponding to ① is displayed as the external interest information of the driver A.

In this case, it is determined that the display area for the external interest information of the passenger B described in FIG. 11B overlaps with the display area for the external interest information of the driver A, and the display control unit 1006 determines whether to display the external interest information of the passenger B.

At this time, the display control unit 1006 monitors the gaze information of the driver A and does not display the external interest information of the passenger B until the display area for the external interest information of the driver A does not overlap with the display area for the external interest information of the passenger B.

As another example, as shown in FIG. 11C, the display control unit 1006 moves the display area for the external interest information of passenger B so that the display area for the external interest information of the passenger B does not overlap with the display area for the external interest information of the driver A.

As shown in FIG. 11C, the display control unit 1006 moves the display area for the external interest information of the passenger B to the second area B-1 so that no obstacle interferes with the driver A to confirm the external interest information.

The display control unit 1006 performs control to display the external interest information of the passenger B as AR or displayed as a camera video.

The display control unit 1006 continuously displays the position of the external interest object of the passenger B in the form of a dotted line so that the position is recognized, and thus the display control unit 1006 performs control for the position display not to interfere with the gaze of the driver A.

Figure 12:
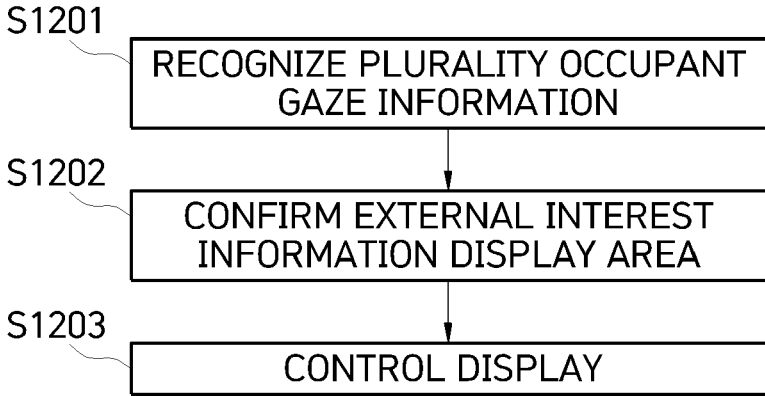
FIG. 12 is a view showing an external interest information display area determination and vehicle display control method based on an occupant's gaze according to another embodiment of the present disclosure.

FIG. 12 is a view showing an external interest information display area determination and vehicle display control method based on an occupant's gaze according to another embodiment of the present disclosure.

The external interest information display area determination and vehicle display control method based on an occupant's gaze according to the embodiment of the present disclosure includes: a step S1201 for recognizing gaze information of a first occupant and a second occupant in a vehicle; a step S1202 for confirming a display area for external interest information of the first occupant and a display area for external interest information of the second occupant using the gaze information of the first occupant and the second occupant; and a step S1203 for determining a priority for display and controlling the display in consideration of an recognition influence on the display area for the external interest information of the first occupant by the display area for the external interest information of the second occupant with relatively low information display importance.

In the step S1203, when it is determined that the recognition influence is equal to or lower than a predetermined value, the display control is performed such that the external interest information of the second occupant is displayed together with the external interest information of the first occupant.

In step S1203, when it is determined that the recognition influence exceeds the predetermined value, the display control is performed such that the external interest information of the second occupant is not displayed, but only the external interest information of the first occupant is displayed.

In step S1203, when it is determined that the recognition influence exceeds the predetermined value, the display control is performed such that the display area for the external interest information of the second occupant is moved, and the moved display area for the external interest information of the second occupant does not invade the display area for the external interest information of the first occupant.

In step S1203, the display control is performed such that an outline information about an original position of the external interest object of the second occupant is displayed.

Figure 13:
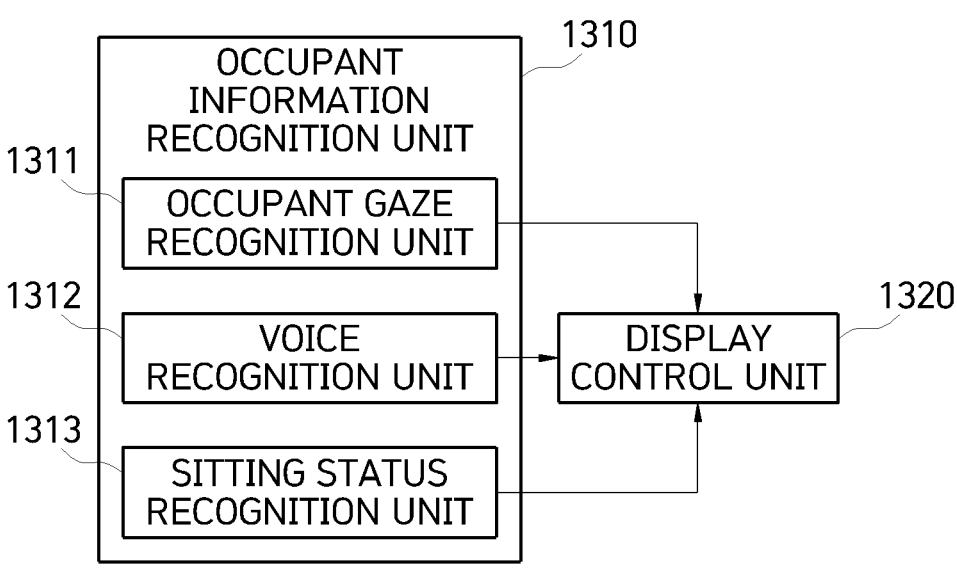
FIG. 13 is a view showing an occupant gaze departure determination and vehicle display control system according to another embodiment of the present disclosure.

FIG. 13 is a view showing an occupant gaze departure determination and vehicle display control system according to another embodiment of the present disclosure.

The occupant gaze departure determination and vehicle display control system according to the embodiment of the present disclosure includes: an occupant information recognition unit 1310 configured to recognize behavioral information related to viewing a display screen of an occupant in a vehicle; and a display control unit 1320 configured to perform control over the vehicle display using the behavior information related to viewing the display screen, and the display control unit 1320 analyzes the behavioral information related to viewing the display screen to determine that a gaze of the occupant departs from a display screen area, and accordingly, performs display control.

The occupant information recognition unit 1310 includes an occupant gaze recognition unit 1311 configured to obtain the gaze information of the occupant in the vehicle and recognize whether the gaze of the occupant in the vehicle departs from the display screen area, and a departure duration time.

The display control unit 1320 performs control to blur the screen of a video content when the duration time that the gaze of the occupant departs from the display screen area exceeds a preset time.

The occupant information recognition unit 1310 further includes a voice recognition unit 1312 configured to obtain in-vehicle voice information, and the display control unit 1320 confirms that a call or in-vehicle conversation is in progress, using the in-vehicle voice information, and performs control to pause for playback of video content corresponding to video playback.

The display control unit 1320 confirms that the call or in-vehicle conversation is in progress, using the in-vehicle voice information, and performs control to lower a playback volume of the video content.

The display control unit 1320 performs control to display a wallpaper rather than the video content when the departure duration time lasts for the preset time or longer.

The occupant information recognition unit 1310 further includes a sitting status recognition unit 1313 configured to recognize the occupant's sitting status for a seat in the vehicle, and the display control unit 1320 performs control to confirm the occupant approaching the seat to auto-play the video content when a first occupant who has the initiative is seated on the seat.

When it is confirmed that a second occupant who has no initiative is seated on the seat, the display control unit 1320 assigns a portion of the display screen area to the second occupant.

The display control unit 1320 performs control to display the external interest information of the second occupant beyond the area assigned to the second occupant, in consideration of at least any one of authorization setting information of the first occupant and boarding status information of the first occupant.

When the first occupant leaves the vehicle, the display control unit 1320 performs control to display a function previously used by the second occupant on the screen in consideration of usage history information of the second occupant.

FIGS. 14 to 17 are views showing an example of vehicle display control in an occupant gaze departure situation according to another embodiment of the present disclosure.

Referring to FIG. 14, when a gaze of an occupant (who has the initiative) who is watching a video content being played on a vehicle display deviates from a screen, the display control unit 1320 performs control to blur the screen of the vehicle display so that the video content displayed on the screen does not interfere with the occupant.

At this time, when it is determined that the occupant makes a call, or talks to another occupant in the vehicle, or is leaning on the seat with his eyes closed, etc., that is, when it is determined that the occupant has no intent to watch the video content, the display control unit 1320 performs control to lower the playback volume of the video content.

At this time, when the video content corresponds to video playback rather than real-time playback, such as TV content, the display control unit 1320 performs control to pause the video content.

Referring to FIG. 15, when the occupant that is watching the video content being played on the vehicle display moves to another seat or moves, if the gaze movement of the occupant is within a reference value (e.g., if the gaze returns back into the screen area within 3 seconds) even if the gaze of the occupant is out of a preset range (e.g.: screen area), the display control unit 1320 performs control to play back the video content as it is without changing the video content screen and playback sound.

When the occupant leaves the seat, the display control unit 1320 performs control to lower the playback volume of the video content, to blur the vehicle display screen (at this time, control to lower the playback volume decreases sequentially over time from the moment that the occupant leaves the seat, and to gradually blur the screen), and to pauses the video content if the video content corresponds to video playback rather than real-time playback.

If the occupant does not return to the seat even after the preset time from the moment that the occupant leaves the seat, the display control unit 1320 performs control to convert the screen on which the video content is played into a wallpaper to display the wallpaper so that no other occupant cannot see the screen.

Figure 16:
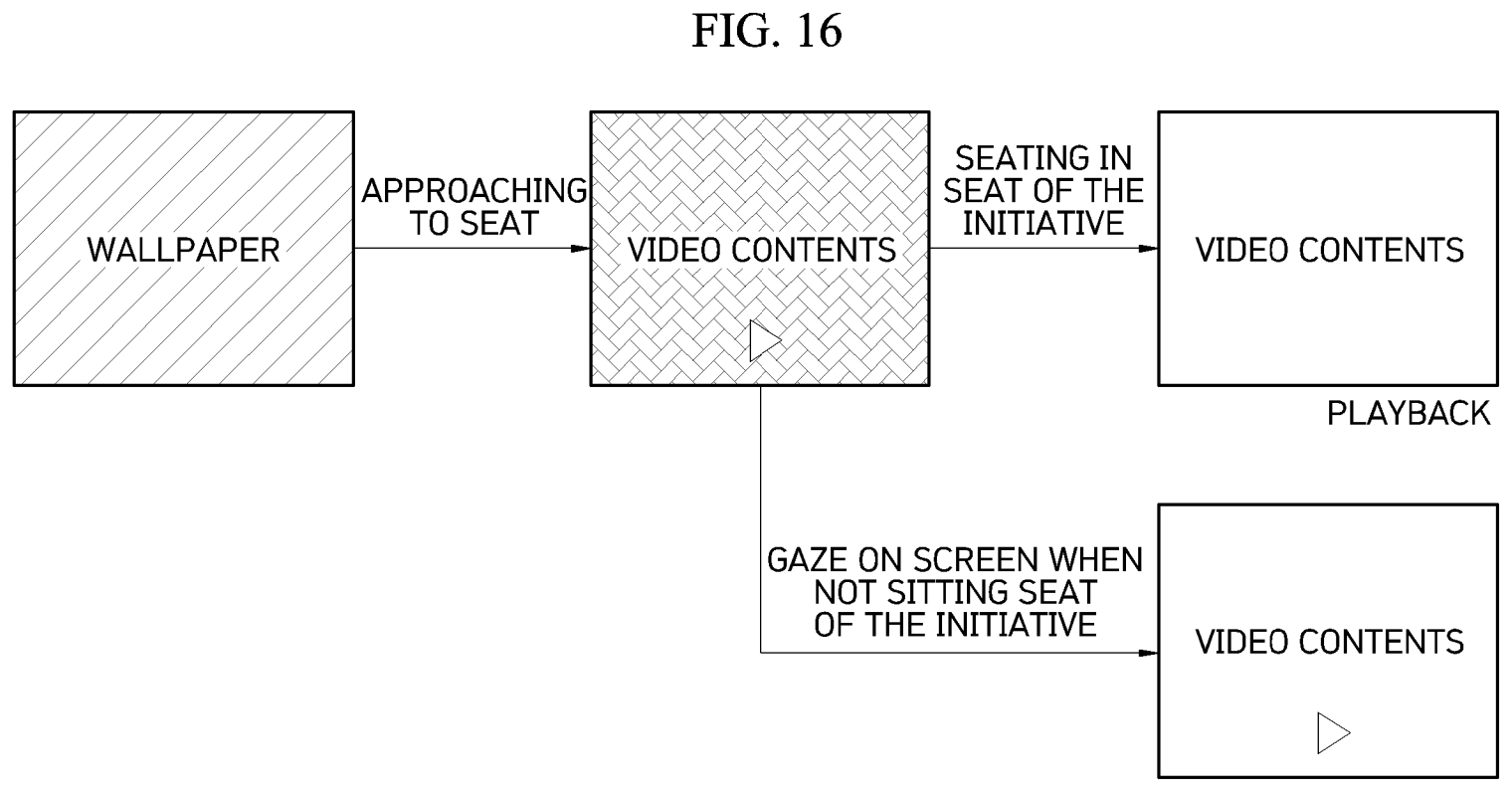

Referring to FIG. 16, when detecting that the occupant who has left the seat is approaching the seat, while the wallpaper is being displayed on the vehicle display, the display control unit 1320 performs control to stop the wallpaper display and to display the previously paused video content.

At this time, when it is confirmed that the occupant seated on the seat has the initiative, the display control unit 1320 performs control to auto-play the video content.

When the occupant who has approached the seat has the initiative, but is not seated on the seat with only the occupant's gaze located on the screen, the occupant clicks a play button to play the video content.

Referring to FIG. 17, as the gaze of the occupant deviates from the vehicle display screen for a certain time or longer, the wallpaper is displayed.

At this time, when another occupant that has no initiative approaches the seat, the display control unit 1320 assigns a portion of the corresponding vehicle display screen area to another occupant.

At this time, when a screen lock is set, the display control unit 1320 performs control not to display the video content that was previously played in the area assigned to the occupant having the initiative.

The area provided to another occupant (occupant B) who has no initiative is shown as a second area B-1, and the area provided to the occupant (occupant A) who has the initiative is shown as a first area A-1.

When the external interest information of the occupant B is to be displayed in the first area A-1 beyond the second area B-1, the display control unit 1320 performs control to display even the external interest information of the occupant B in the first area A-1 according to the boarding status of the occupant A or whether the authority of the occupant A having the initiative is set.

Figure 18:
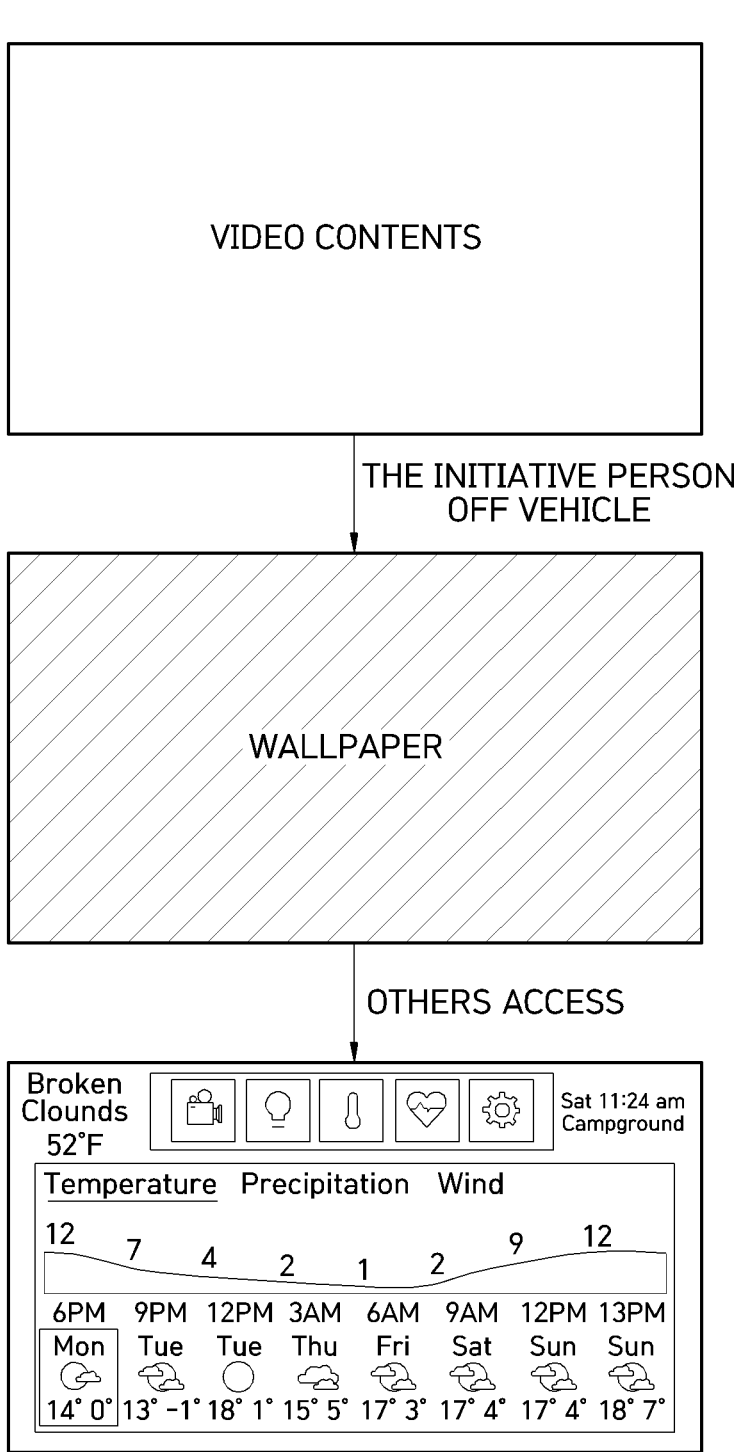
FIG. 18 is a view showing an example of vehicle display control upon departure from control authority according to another embodiment of the present disclosure.

FIG. 18 is a view showing an example of vehicle display control upon departure from control according to another embodiment of the present disclosure.

In a situation where the video content is played on the vehicle display, when the occupant having the initiative leaves the vehicle, the display control unit 1320 performs display control to display the wallpaper.

When the occupant having the initiative leaves the vehicle, the display control unit 1320 performs display control to display the functions previously used by another occupant as another occupant having no initiative approaches the display.

Figure 19:
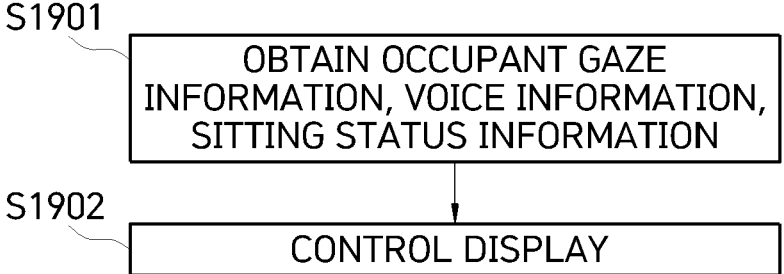
FIG. 19 is a view showing an occupant gaze departure determination and vehicle display control method according to another embodiment of the present disclosure.

FIG. 19 is a view showing an occupant gaze departure determination and vehicle display control method according to another embodiment of the present disclosure.

The occupant gaze departure determination and vehicle display control method according to the embodiment of the present disclosure includes: a step S1901 for obtaining at least any one of gaze information, voice information, and sitting status information of an occupant in a vehicle; and a step S1902 for confirming that the occupant's intent is to stop viewing a display screen, by using the information obtained in the step S1901, and controlling a vehicle display.

In the step S1901, when the gaze information of the occupant in the vehicle is obtained, the gaze information including whether the gaze of the occupant in the vehicle departs from the display screen area and the departure duration time is obtained.

In the step S1902, when the departure duration time exceeds the preset time, control is performed such that the screen of the video content is blurred.

When the voice information is obtained in the step S1901, in the step S1902, it is determined that a call or an in-vehicle conversation is in progress, using the voice information, and control is performed such that the video content corresponding to the video playback is paused.

When the voice information is obtained in the step S1901, in the step S1902, it is determined that the call or in-vehicle conversation is in progress, using the voice information, and control is performed such that the playback volume of the video content is lowered.

In the step S1902, it is confirmed that the occupant's intent is to stop viewing the display screen, and control is performed such that the wallpaper, not the video content, is displayed.

When the sitting status information is recognized in the step S1901, the video content is automatically displayed depending on whether the occupant seated in the seat in the step S1902 has been granted the initiative.

When it is confirmed in the step S1901 that an occupant who has been granted no initiative is seated, in the step S1902, a portion of the display screen area is assigned to the occupant who has been granted no initiative.

In the step S1902, in consideration of at least any one of the authorization setting information of the occupant who has been granted the initiative and the boarding status information of the occupant who has been granted the initiative, control is performed such that external interest information is displayed beyond the area assigned to the occupant who has been granted no initiative.

In the step S1901, when it is confirmed that the occupant who has been granted the initiative leaves the vehicle, and the occupant who has been granted no initiative is seated, in the step S1902, control is performed such that the previously used functions are displayed on the screen using the usage history information of the occupant who has been granted no initiative.

Figure 20:
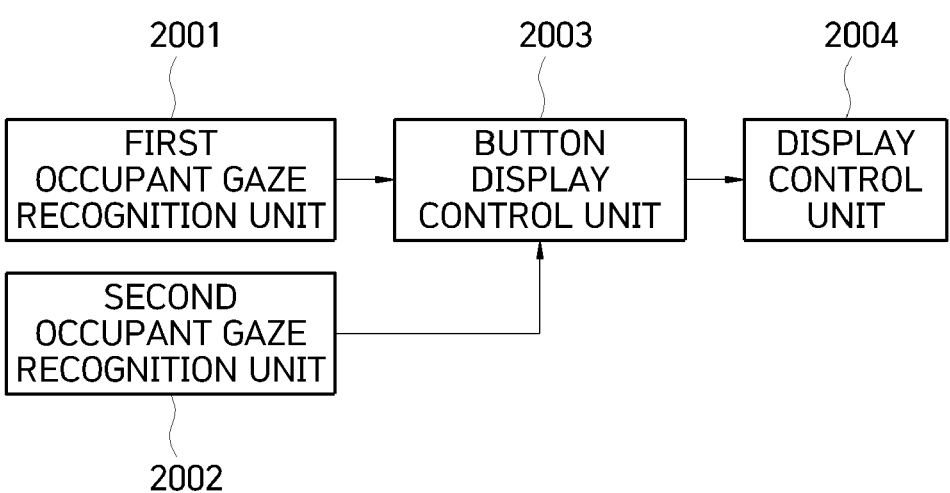
FIG. 20 is a view showing a button display control in an occupant gaze-based vehicle display and initiative control system according to another embodiment of the present disclosure.

FIG. 20 is a view showing a button display control in an occupant gaze-based vehicle display and the initiative control system according to another embodiment of the present disclosure.

The occupant gaze-based button display control and initiative control system in a vehicle display according to the embodiment of the present disclosure includes: a first occupant gaze recognition unit 2001 configured to recognize a gaze of a first occupant in a vehicle display screen area; and a button display control unit 2003 that performs control to display a button on an video content according to the gaze of the first occupant.

When the first occupant gaze recognition unit 2001 confirms that the gaze of the first occupant stays on a predetermined screen area for a certain period of time or longer, the button display control unit 2003 generates and displays a cursor, and controls the movement and size change of the cursor according to the gaze movement of the first occupant and the gaze distance of the first occupant.

When the first occupant gaze recognition unit 2001 confirms that the gaze of the first occupant stays on the predetermined screen area for a certain period of time or longer, the button display control unit 2003 performs control to display at least any one of a player button and a progress button of the video content.

The occupant gaze-based button display control in the vehicle display and initiative control system according to the embodiment of the present disclosure further includes a second occupant gaze recognition unit 2002 configured to recognize a gaze of a second occupant participating in the use of the vehicle display, and the button display control unit 2003 performs control to display a button for the initiative switch.

The occupant gaze-based button display control and initiative control system in the vehicle display according to the embodiment of the present disclosure further includes a display control unit 2004 configured to assign the vehicle display screen area to the first occupant and the second occupant when the initiative switch is approved.

The display control unit 2004, with the approval of the first occupant, also displays the external interest information of the second occupant even in a first area assigned to the first occupant beyond a second area assigned to the second occupant.

When the second occupant stares at the video content displayed in the first area for a preset time or longer, the display control unit 2004 performs control to display the video content throughout the vehicle display screen area.

Figure 23:
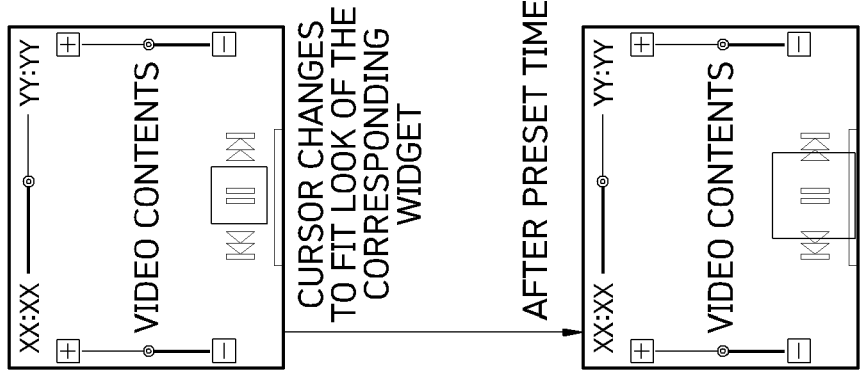

FIGS. 21 to 23 are views showing button display control according to another embodiment of the present disclosure.

Referring to FIG. 21, when it is confirmed that the occupant stares at a certain area on the screen of the video content played on the vehicle display, a necessary button is created.

The button display control unit controls the movement and size of the cursor based on the gaze movement of the occupant and the gaze distance of the occupant.

The occupant selects a function item by staring at a certain area for a preset time or longer, or by inputting a gesture on a mobile phone screen connected to a vehicle AVN.

The button display control unit displays the player button (play, pause, move forward, move backward, volume, screen brightness, etc.) and the progress button, and executes a button display item for a function execution by item selection.

Referring to FIG. 22, when the occupant stares at a left area on the screen where the video content is played, a cursor is created, and the button display control unit changes the cursor to match the appearance of the widget, confirms that the occupant stares at the left area for the preset time or longer, and displays the player button and the progress button.

The button display control unit provides a widget to float the button in an area where the gaze does not stay when the gaze of the occupant moves.

Referring to FIG. 23, the button display control unit determines the size of the cursor differently, depending on the distance between the occupant and the vehicle display.

Figure 24:
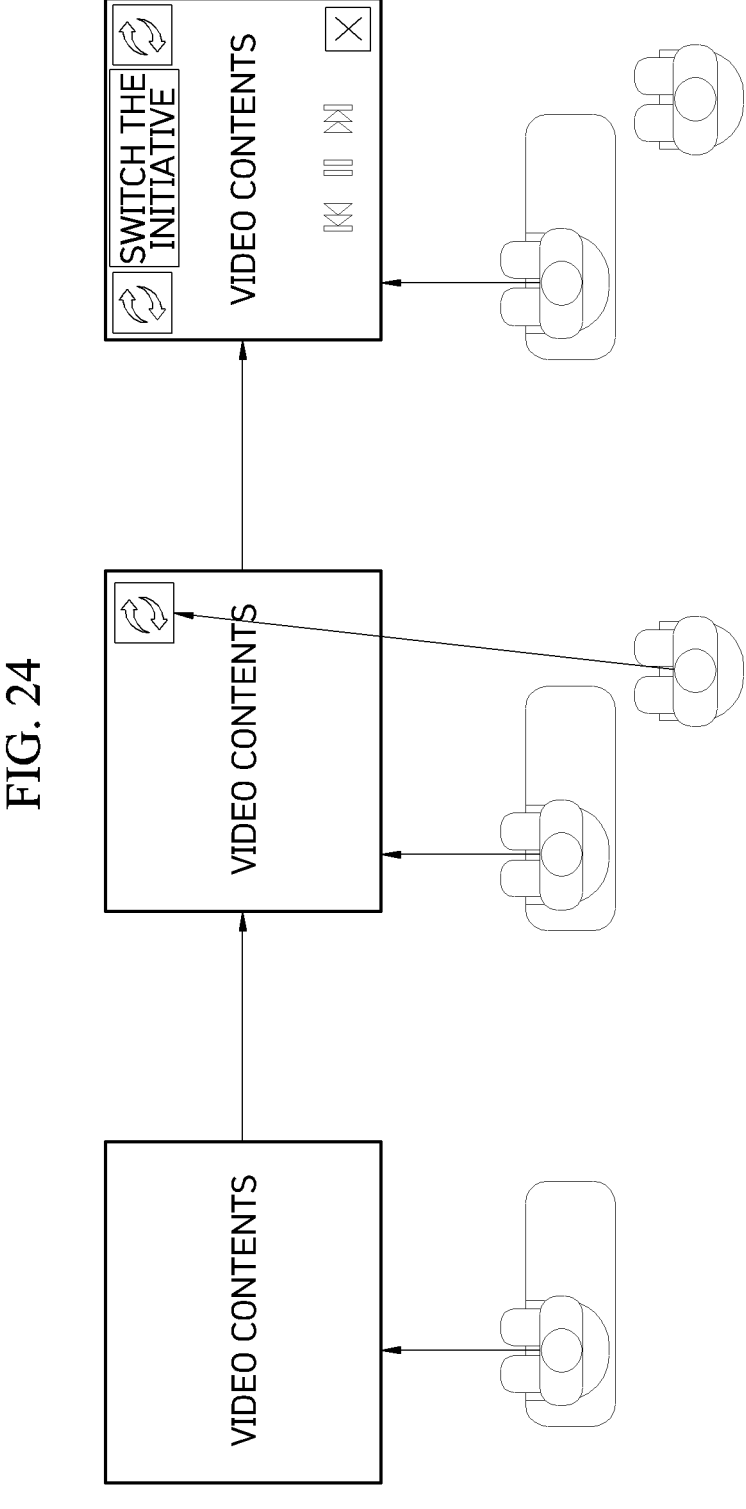
FIG. 24 is a view showing an initiative switch in another occupant's participation according to another embodiment of the present disclosure.

FIG. 24 is a view showing initiative switch in another occupant's participation according to another embodiment of the present disclosure.

In a situation where an occupant A is watching the video content played on the vehicle display screen, when an occupant B participates in the use of the vehicle display by staring at a particular area, a button for initiative switch is displayed.

At this time, as the occupant B selects a button for initiative switch, the initiative is provided to the occupant B, or a button to watch the video together is displayed.

When the initiative switch is requested by the gaze of the occupant B, a button for the occupant A, who currently has the initiative, to agree to the initiative switch is provided on the screen.

When the initiative switch is approved at the request of the occupant B, only the screen of the occupant B may be configured, which will be described with reference to FIG. 25.

Figure 25:
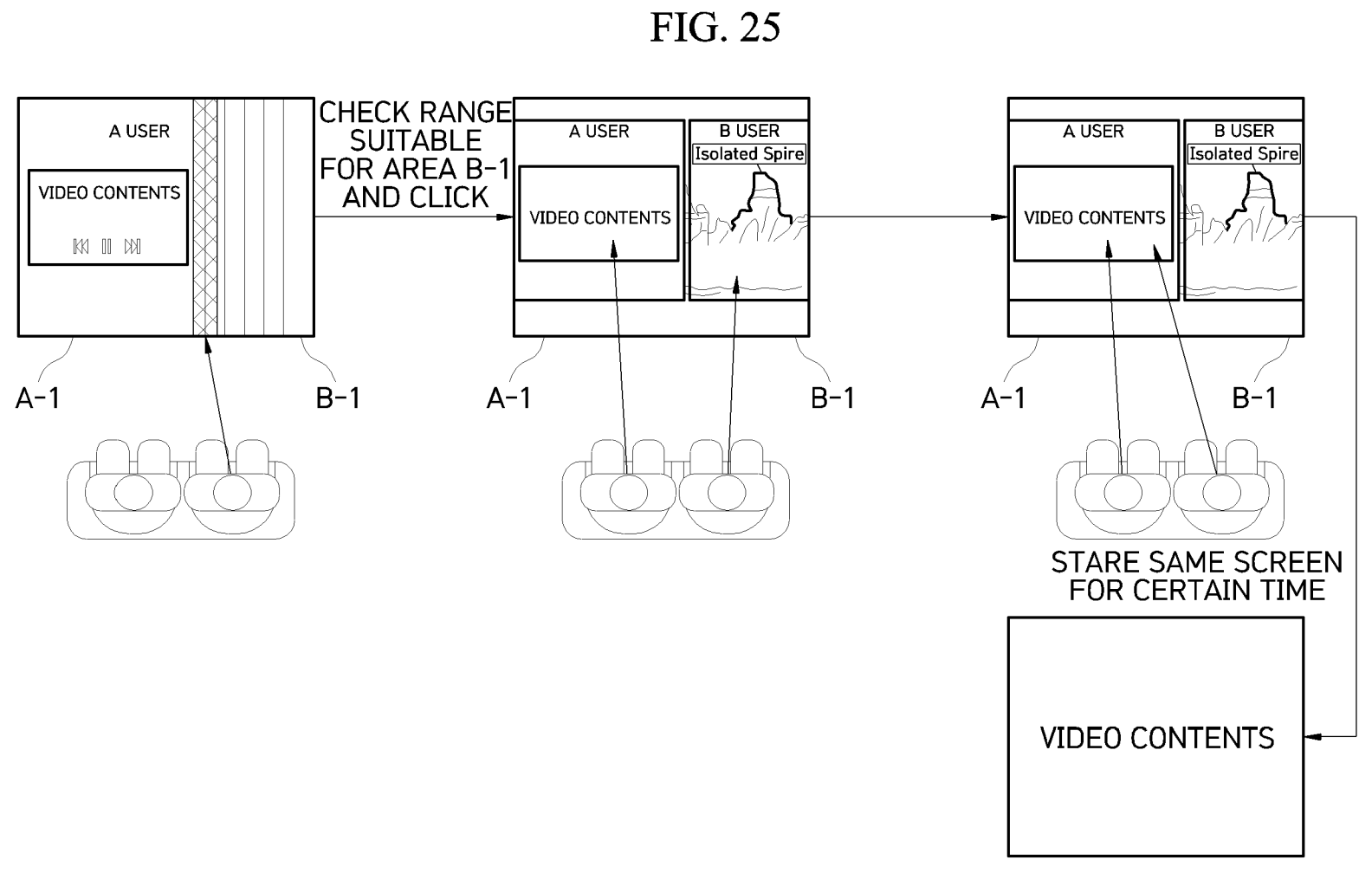

FIG. 25 is a view showing display control based on screen area division and gaze information upon another occupant's participation according to another embodiment of the present disclosure.

The occupant A is watching the video content in a first area A-1 of the vehicle display, and according to the participation of the occupant B, a second area B-1 of the vehicle display area is assigned to the occupant B.

It is assumed that in the first area A-1, the video content selected by the occupant A is played, and in the second area B-1, the external interest information is displayed.

At this time, according to the approval of the occupant A, the external interest information is displayed on the first area A-1 beyond the second area B-1.

At this time, when the occupant B stares at the video content for a certain period of time or longer, it is confirmed that the occupant B has the intent to watch the video content instead of the external interest information, and control is performed such that the video content is displayed in the entire area of the vehicle display.

Figure 26:
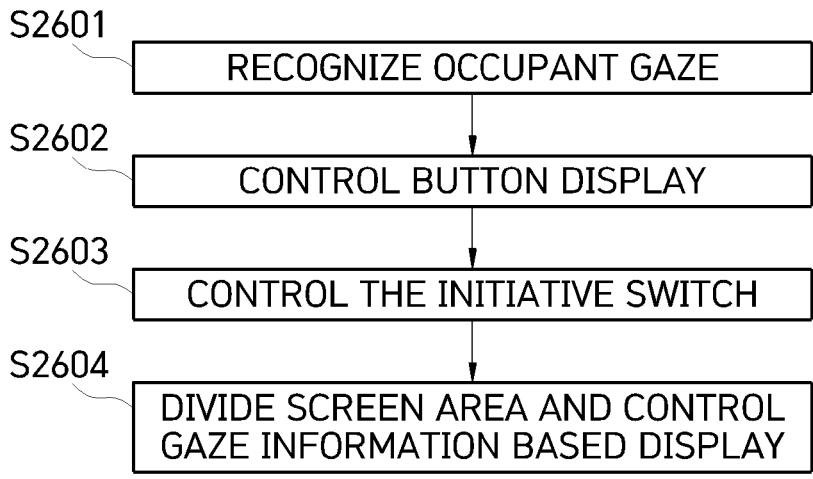
FIG. 26 is a view showing a method for button display control in an occupant gaze-based vehicle display and initiative control according to another embodiment of the present disclosure.

FIG. 26 is a view showing a method of button display control in an occupant gaze-based vehicle display and initiative control according to another embodiment of the present disclosure.

The method of button display control in an occupant gaze-based vehicle display and initiative control method according to the embodiment of the present disclosure includes: a step S2601 for recognizing a gaze of a first occupant in a vehicle display screen area; and a step S2602 for performing control to display a button on a video content according to the gaze of the first occupant.

When it is confirmed in the step S2601 that the gaze of the first occupant stays on a predetermined screen area for a certain period of time or longer, in the step S2602, a cursor is created and displayed, and the movement and size change of the cursor are controlled according to the gaze movement of the first occupant and the gaze distance of the first occupant.

When it is confirmed in the step S2601 that the gaze of the first occupant stays on the predetermined screen area for a certain period of time or longer, in the step S2602, control is performed such that at least any one of a player button and a progress button of the video content is displayed.

In the step S2601, a gaze of a second occupant participating in the use of the vehicle display is additionally recognized, and in the step S2602, control is performed such that a button for initiative switch is displayed.

The occupant gaze-based button display control in the occupant gaze-based vehicle display and initiative control method according to the embodiment of the present disclosure further includes a step S2603 of confirming the approval of the first occupant according to an initiative switching request of the second occupant, and performing initiative switching control.

The occupant gaze-based button display control based on the occupant gaze-based vehicle display and the initiative control method according to the embodiment of the present disclosure further includes a step S2604 of splitting and assigning the vehicle display screen area to the first occupant and the second occupant when the initiative switching request is approved, and performing display control using the gaze information of the first occupant and the second occupant.

In the step S2604, with the approval of the first occupant, the external interest information of the second occupant is also displayed in the first area assigned to the first occupant beyond the second area assigned to the second occupant.

In the step S2604, when the second occupant stares at the video content displayed in the first area for a preset time or longer, control is performed such that the video content is displayed throughout the vehicle display screen area.

Figure 27:
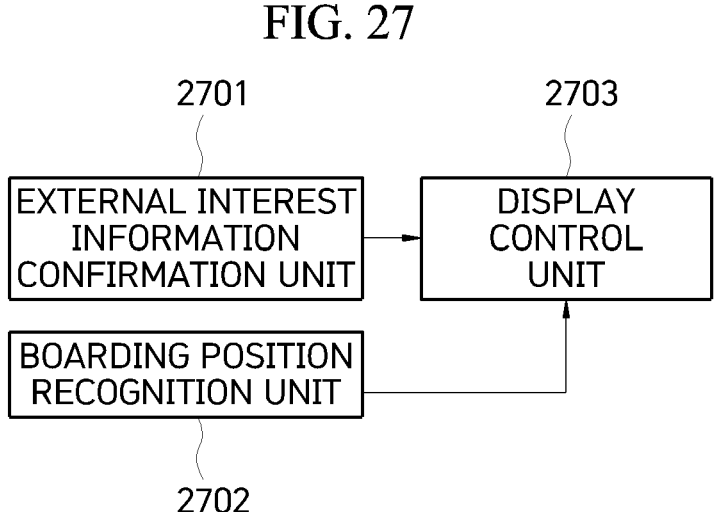
FIG. 27 is a view showing a vehicle display control system for transmitting external interest information according to another embodiment of the present disclosure.

FIG. 27 is a view showing a vehicle display control system for transmitting external interest information according to embodiment of the present disclosure.

The vehicle display control system for transmitting external interest information according to the embodiment of the present disclosure includes: an external interest information confirmation unit 2701 configured to confirm external interest information of a first occupant in a vehicle; and a display control unit 2703 configured to perform control to display the external interest information of the first occupant through a vehicle display.

The external interest information confirmation unit 2701 uses gaze information of the first occupant to confirm an external interest object.

The external interest information confirmation unit 2701 uses voice information and the gaze information of the first occupant to confirm the external interest object.

The external interest information confirmation unit 2701 confirms the external interest object using a gesture information and the gaze information of the first occupant.

The display control unit 2703 performs control to display the external interest information through at least any one of highlight, area display, contour display, and zoom display.

The vehicle display control system for transmitting external interest information according to the embodiment of the present disclosure further includes a boarding position recognition unit 2702 configured to confirm position information of the first occupant and a second occupant in the vehicle, and the display control unit 2703 performs control to display the external interest information through a display area recognizable by the second occupant in consideration of the position information.

Figure 28A:
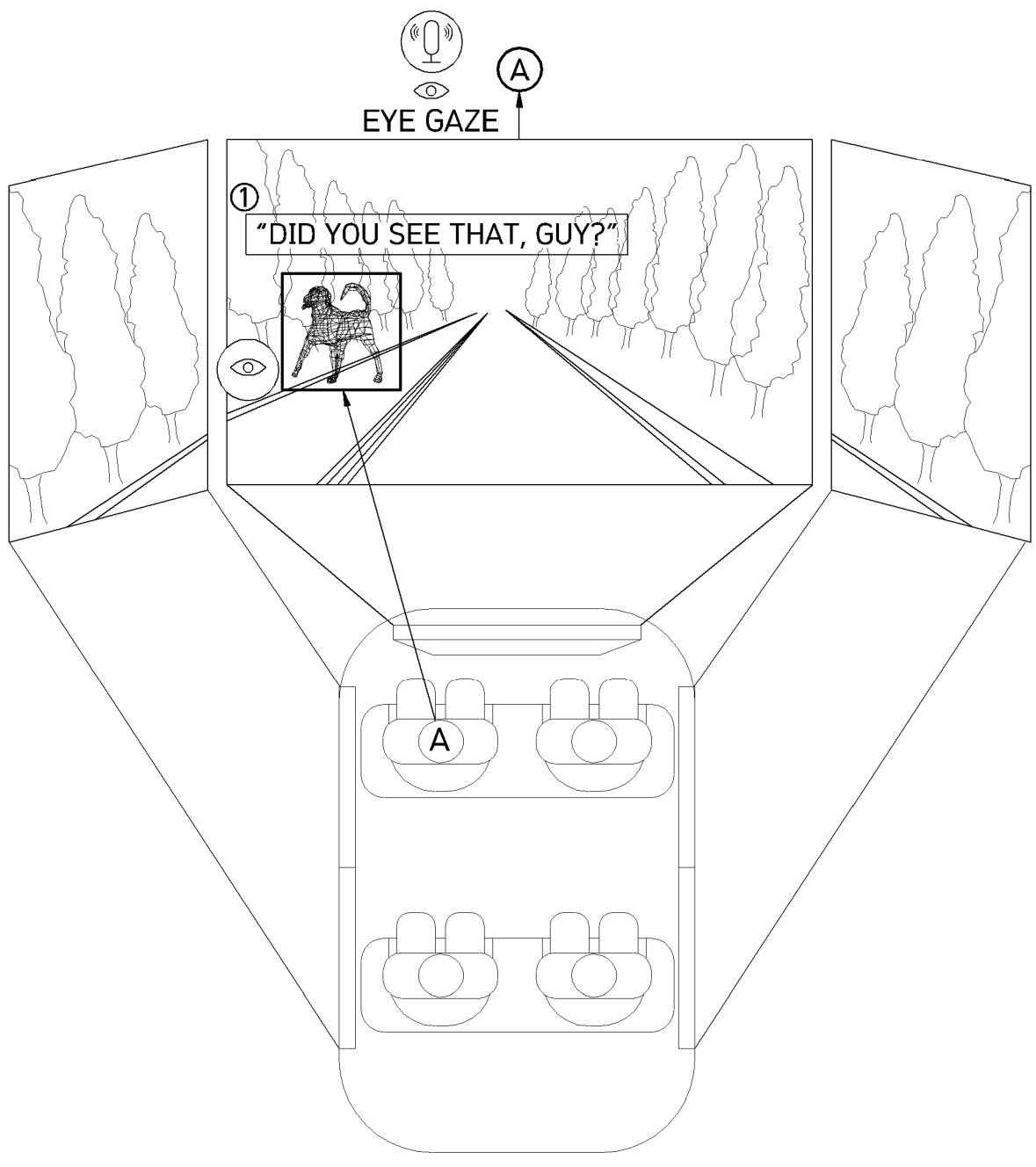
FIG. 28A and FIG. 28B are views showing external interest information display and external interest information display area control according to another embodiment of the present disclosure.
Figure 28B:
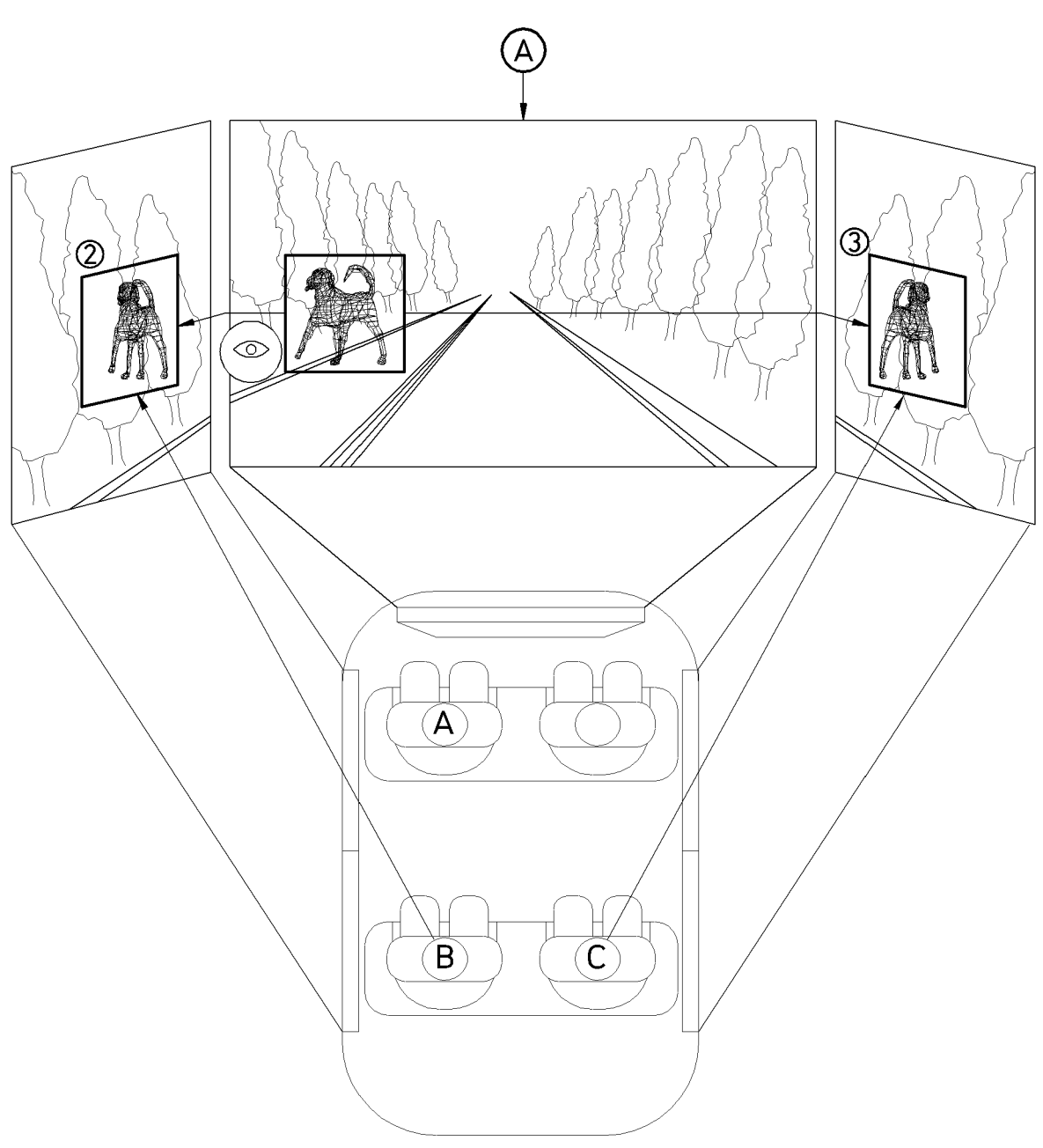

FIG. 28A and FIG. 28B are views showing external interest information display and external interest information display area control according to another embodiment of the present disclosure.

Referring to FIG. 28A, a driver A recognizes an interest object (e.g., bear) viewed through the front windshield of the driving vehicle.

The external interest information confirmation unit confirms the external interest information when the gaze of the driver A stays on a certain area for a certain period of time or longer.

When the driver A says "Did you see that, guys?", the external interest information confirmation unit checks the external interest information based on the utterance information and gaze information of the driver A.

The external interest information confirmation unit confirms the external interest information when the gaze of the driver A stays on a certain area for a certain period of time or longer and performs a predetermined gesture (e.g., finger pointing operation) for indicating the external interest information.

The display control unit performs control to display the external interest information of the driver A through at least any one of highlight, area display, contour display, magnification display.

Referring to FIG. 28A, the display control unit performs control to display the area of the external interest object of the driver A through the area display on the front windshield, which is a transparent display.

Referring to FIG. 28B, as described above, when the external interest information of the driver A is displayed on the front windshield, it is assumed that it is difficult for a passenger B and passenger C, which are blocked by the driver A and located at the rear seat of the driver A, to easily confirm the corresponding external interest information.

At this time, in consideration of the seating position information of the passengers obtained through the boarding position recognition unit, the display control unit performs control to display the external interest information on the transparent display of the left side window located near the sitting position of the passenger B and to display the external interest information on the transparent display of the right side window located near the sitting position of the passenger C, so that the passenger B and the passenger C can easily confirm the external interest information.

The boarding position recognition unit recognizes the position of the occupant in the vehicle using at least any one of a seat sensor and an indoor camera, and the display control unit uses the position to determine a display area (the aforementioned rear seat left side window display area and rear seat right side window display area) that the passengers can comfortably see, and displays the external interest information in the determined area.

Figure 29:
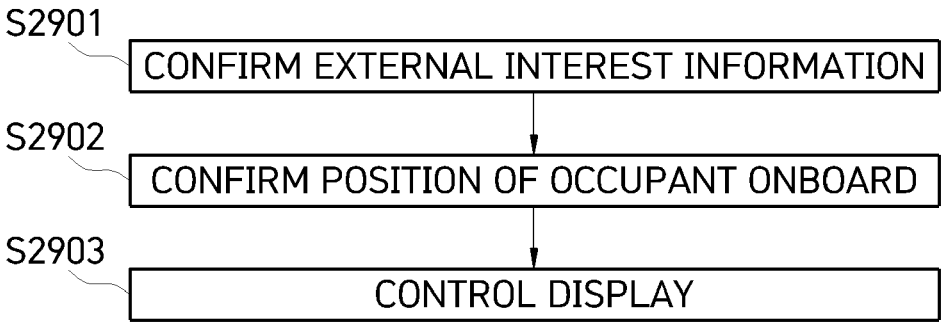
FIG. 29 is a view showing a vehicle display control method for conveying external interest information according to another embodiment of the present disclosure.

FIG. 29 is a view showing a vehicle display control method for transmitting external interest information according to another embodiment of the present disclosure.

The vehicle display control method for transmitting external interest information according to the embodiment of the present disclosure includes: a step S2901 for confirming external interest information of a first occupant in a vehicle; a step S2902 for confirming the boarding positions of the first occupant and the second occupant in the vehicle; and a step S2903 for performing control to display the external interest information through a vehicle display in consideration of the boarding positions.

In the step S2901, the external interest information is confirmed using at least any one of gaze information, voice information, and gesture information of the first occupant.

In the step S2903, control is performed such that the external interest information is displayed through at least any one of highlight, area display, contour display, or zoom display.

In the step S2903, when it is confirmed by using the boarding position that the field of view of the second occupant is not blocked, the external interest information confirmed by the first occupant beyond a first display area is displayed in the first display area.

In the step S2903, when it is confirmed by using the boarding position that the field of view of the second occupant is blocked, the external interest information confirmed by the first occupant beyond the first display area is displayed in a second display area that is different from the first display area.

Figure 30:
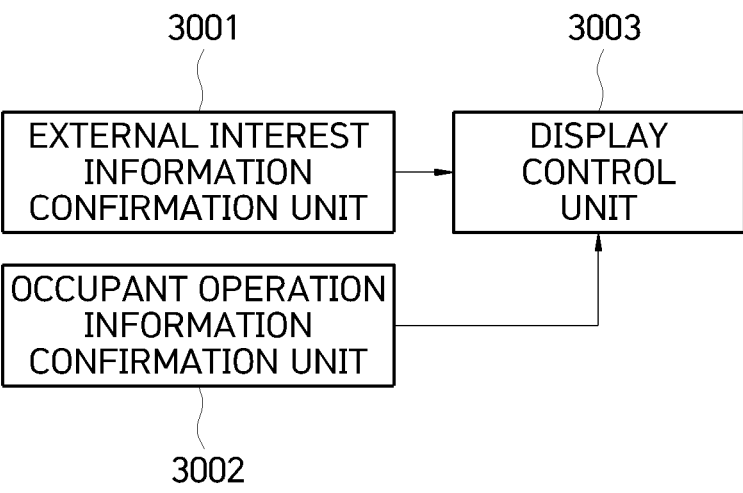
FIG. 30 is a view showing a vehicle display control system for synthesizing and displaying external interest information according to another embodiment of the present disclosure.

FIG. 30 is a view showing a vehicle display control system for synthesizing and displaying external interest information according to another embodiment of the present disclosure.

The vehicle display control system for synthesizing and displaying external interest information according to the embodiment of the present disclosure includes: an external interest information confirmation unit 3001 configured to confirm an interest object outside a vehicle in which an occupant in the vehicle is interested; an occupant operation information recognition unit 3002 configured to recognize operation information of the occupant in the vehicle associated with the rotation of external interest information; and a display control unit 3003 configured to synthesize and display a 3D image for the interest object outside the vehicle, and to rotate and display the 3D image according to the operation information.

The external interest information confirmation unit 3001 confirms an interest object located in an area where the gaze of the occupant in the vehicle stays for a preset time or longer.

The occupant operation information recognition unit 3002 recognizes at least any one of a touch input, gesture input, and voice input as the operation information.

The display control unit 3003 determines the degree of rotation of the 3D image according to the operation information, rotates the 3D image to display the rotated 3D image, and displays the 3D image by restoring the 3D image to the actual position of the interest object when there is no further operation for a preset time or longer.

Figure 31A:
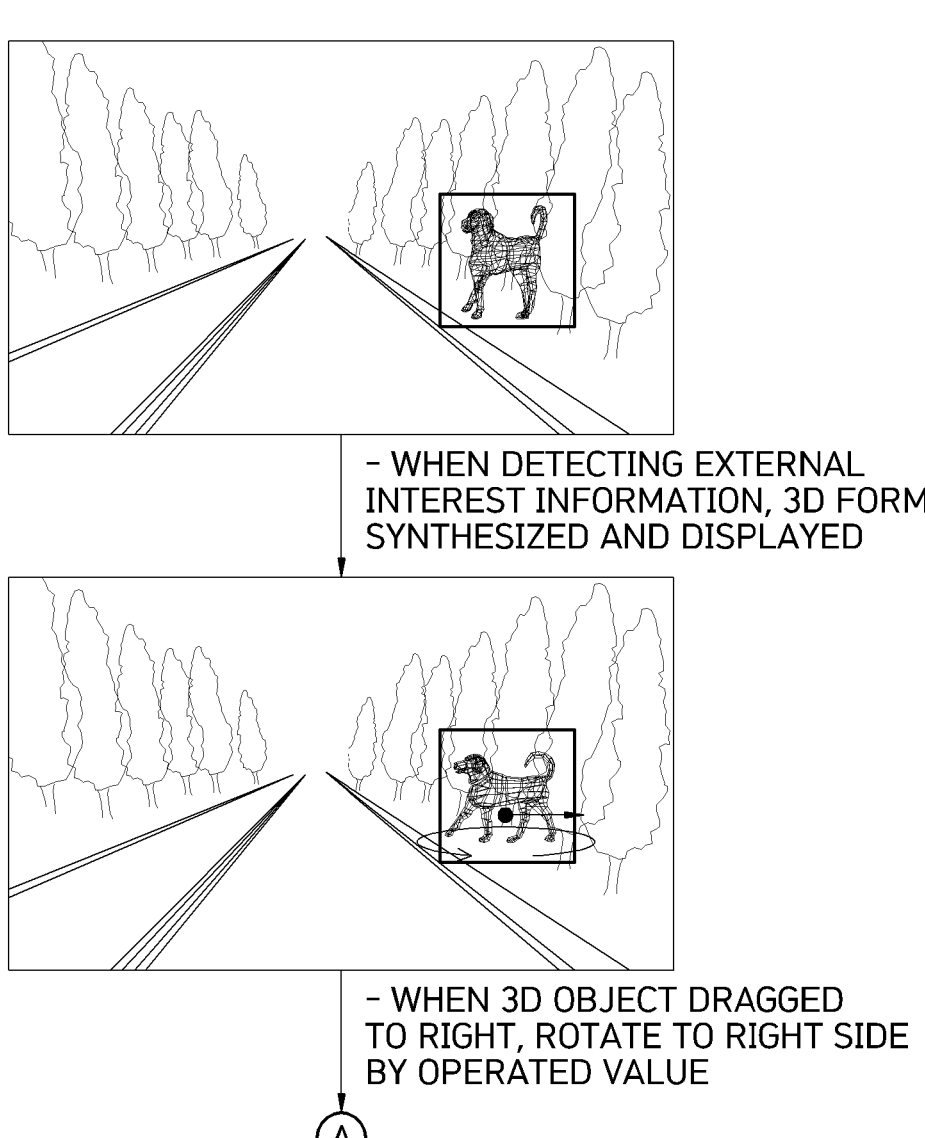
FIG. 31A, FIG. 31B, and FIG. 32 are views are views showing external interest information display and rotation according to still another embodiment of the present disclosure.
Figure 31B:
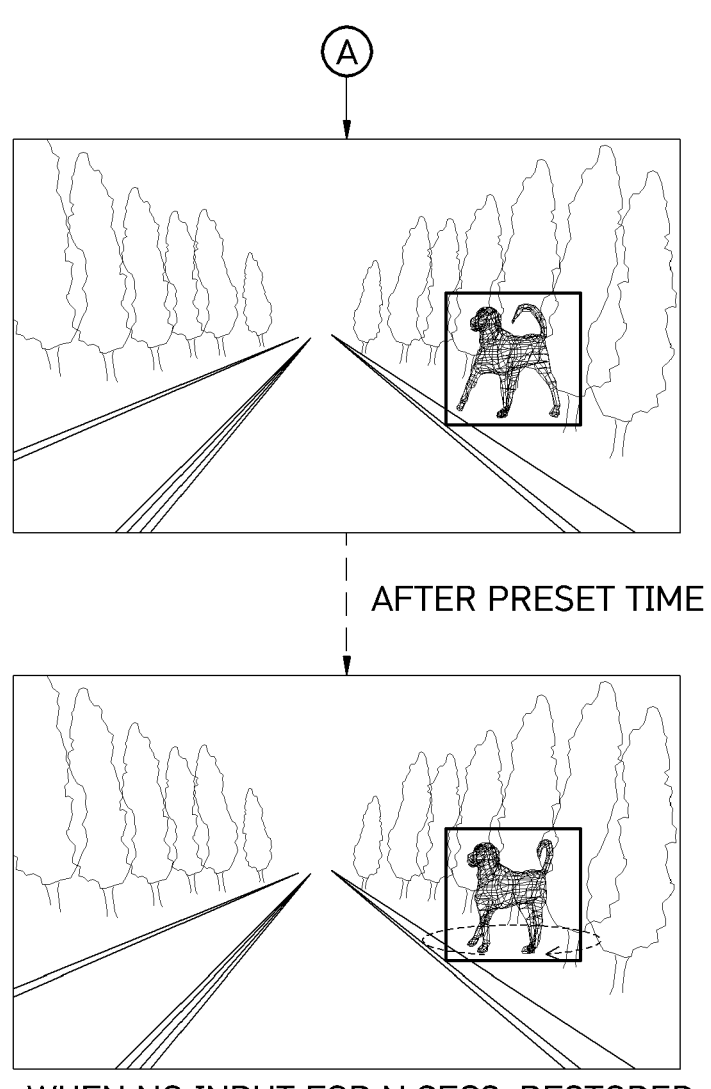
Figure 32:
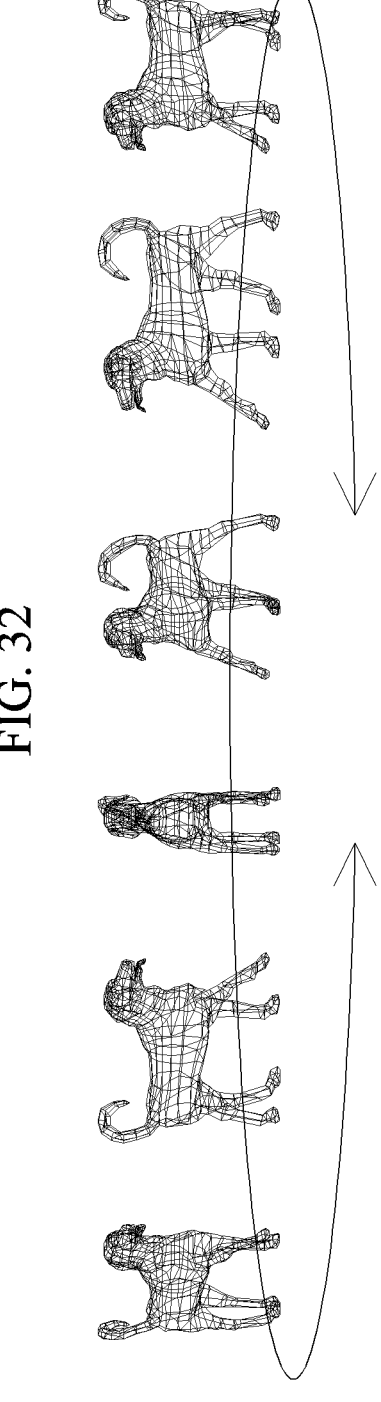

FIGS. 31A, 31B and 32 are views showing external interest information rotation and display according to another embodiment of the present disclosure.

Referring to FIG. 31A and FIG. 31B, the gaze information of the occupant in the vehicle is used to determine the external interest object among the objects viewed through the vehicle windshield, and the corresponding interest object is synthesized into a 3D form and displayed.

At this time, the external interest information synthesized in 3D form is displayed in the front windshield area, which is a transparent display.

When the occupant in the vehicle drags the external interest information synthesized in 3D form to the right using touch or gesture, the external interest information synthesized in 3D form is rotated to the right by the value of the drag.

When a preset time passes after the external interest information synthesized in 3D form is rotated and displayed according to the operation of the occupant in the vehicle, the position of the external interest information synthesized in the 3D form is restored to the position of the actual external interest object.

Referring to FIG. 32, the external interest object is synthesized and displayed in 3D form, and control is performed such that the 3D object is rotated by 360 degrees up and down/left and right through multimodal interactions such as touch, gesture, and voice recognition of the occupant in the vehicle.

Figure 33:
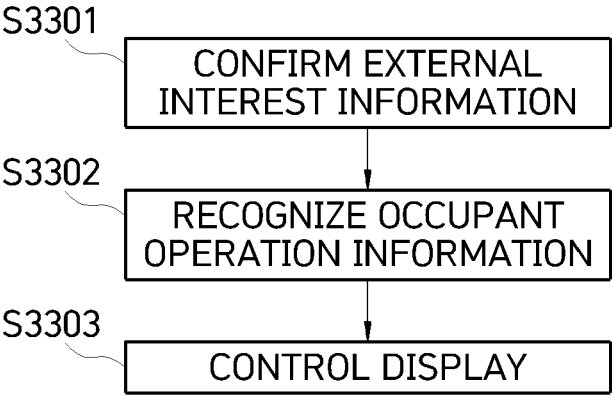
FIG. 33 is a view showing a vehicle display control method for synthesizing and displaying external interest information according to another embodiment of the present disclosure.

FIG. 33 is a view showing a vehicle display control method for synthesizing and displaying external interest information according to another embodiment of the present disclosure.

The vehicle display control method for synthesizing and displaying external interest information according to the embodiment of the present disclosure includes: a step S3301 for confirming external interest information of an occupant in a vehicle; a step S3302 for recognizing operation information of the occupant associated with the rotation of the external interest information; and a step S3303 for performing control to synthesize and display the external interest information as 3D image, and to rotate and display the 3D image according to the operation information.

In the step S3301, the external interest information for an external object located in an area where the gaze of the occupant in the vehicle stays for a preset time or longer is confirmed.

In the step S3302, at least any one operation information of touch input, gesture input, and voice input is recognized.

In the step S3303, the 3D image is rotated and displayed according to the degree of rotation determined based on the operation information, and when there is no further operation for a preset time or longer, the 3D image is displayed by restoring the 3D image to the actual position of the interest object.

Figure 34:
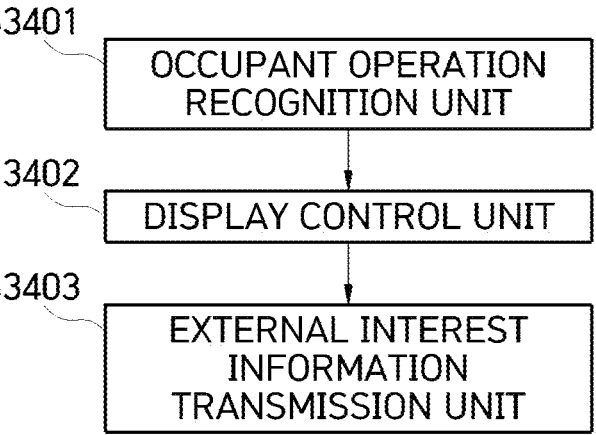
FIG. 34 is a view showing a vehicle display control system for storing and sharing external interest information according to another embodiment of the present disclosure.

FIG. 34 is a view showing a vehicle display control system for storing and sharing external interest information according to another embodiment of the present disclosure.

The vehicle display control system for storing and sharing external interest information according to the embodiment of the present disclosure includes: an occupant operation recognition unit 3401 configured to receive operation information for an video storage request for an external interest object of a vehicle occupant; and a display control unit 3402 configured to perform video storage according to the operation information for the external interest object at which the vehicle occupant stares through a vehicle windshield configured as a transparent display.

The occupant operation recognition unit 3401 receives the operation information that is input using at least any one of gaze information, voice information, gesture information, and touch information.

The display control unit 3402 performs control to display information about the external interest object as AR information.

The display control unit 3402 captures and stores an external foreground and the AR information at the same time.

The display control unit 3402 controls the display for screen capture by white-out during a preset time.

The vehicle display control system for storing and sharing external interest information according to the embodiment of the present disclosure further includes: an external interest information transmission unit 3403 configured to transmit a video stored according to the operation information to at least any one of a divided area in a vehicle display, a mobile terminal of the vehicle occupant, and a mobile terminal of another user.

The display control unit 3402 performs control to divide and assign a display area to a plurality of occupants in the vehicle, store the external interest information video according to the video storage request made within each area, and display the stored video in a predetermined area of an assigned display area.

The display control unit 3402 transmits control information to move the transparent display in consideration of access control priorities of the plurality of occupants.

The display control unit 3402 performs control to move the video information stored in a predetermined area of a first occupant to a predetermined area of a second occupant according to the occupant request and sharinga of setting information.

Hereinafter, in FIGS. 35 to 38, it is assumed that a rear seat left side occupant in a vehicle stares at the outside through a rear seat left side window transparent display.

Figure 35A:
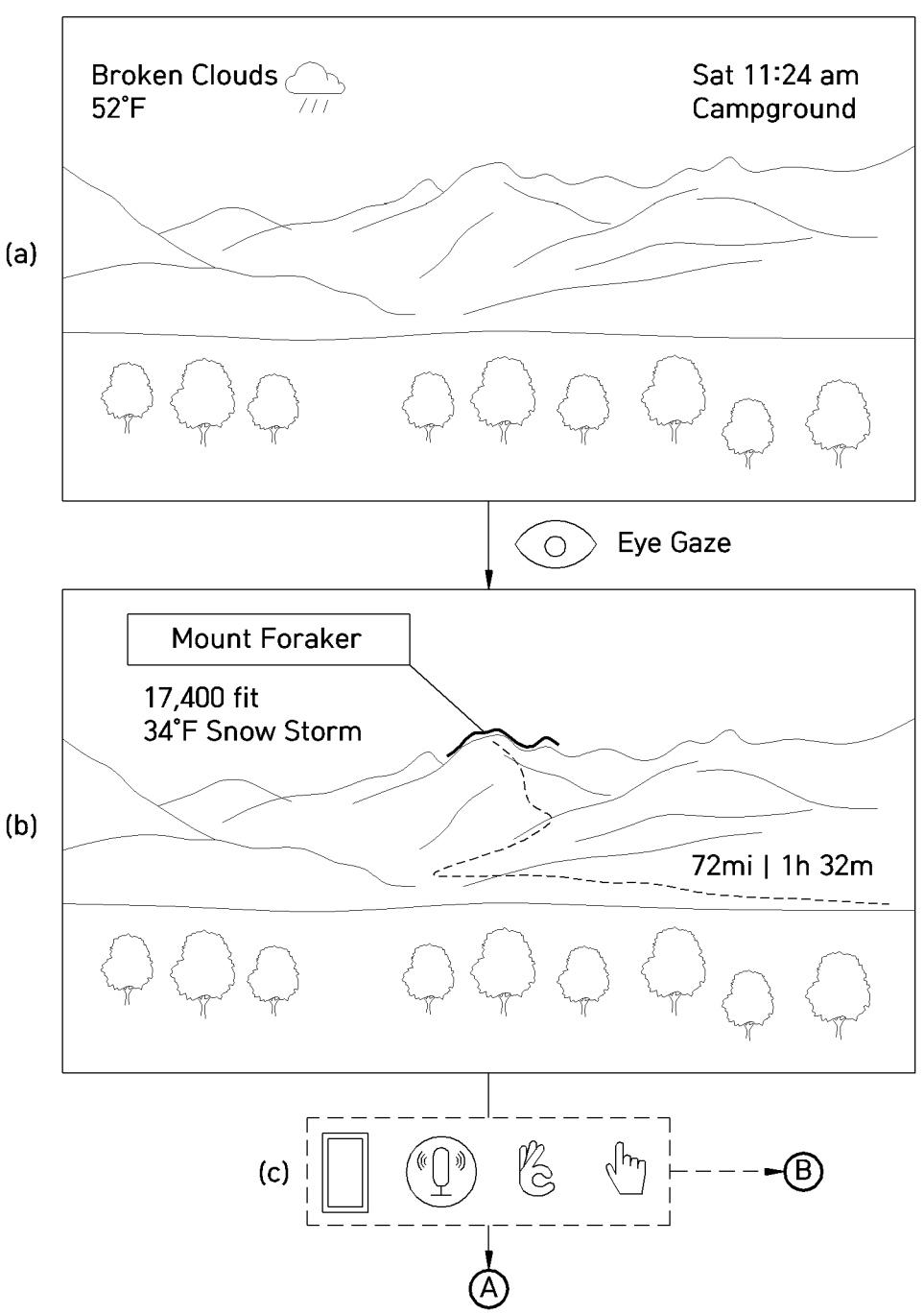
FIG. 35A, FIG. 35B, and FIG. 35C are views showing a process of capturing the external interest information according to another embodiment of the present disclosure.
Figure 35B:
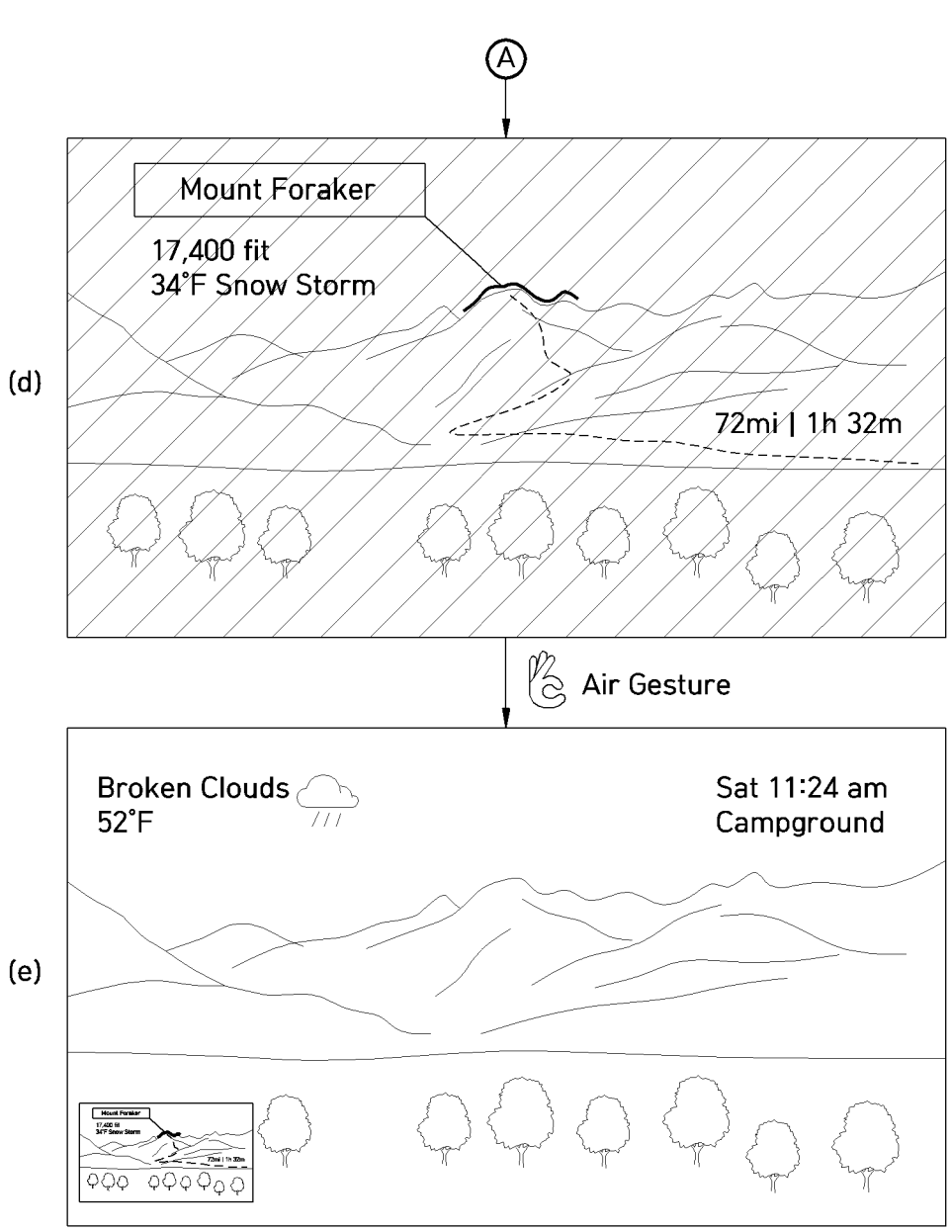
Figure 35C:
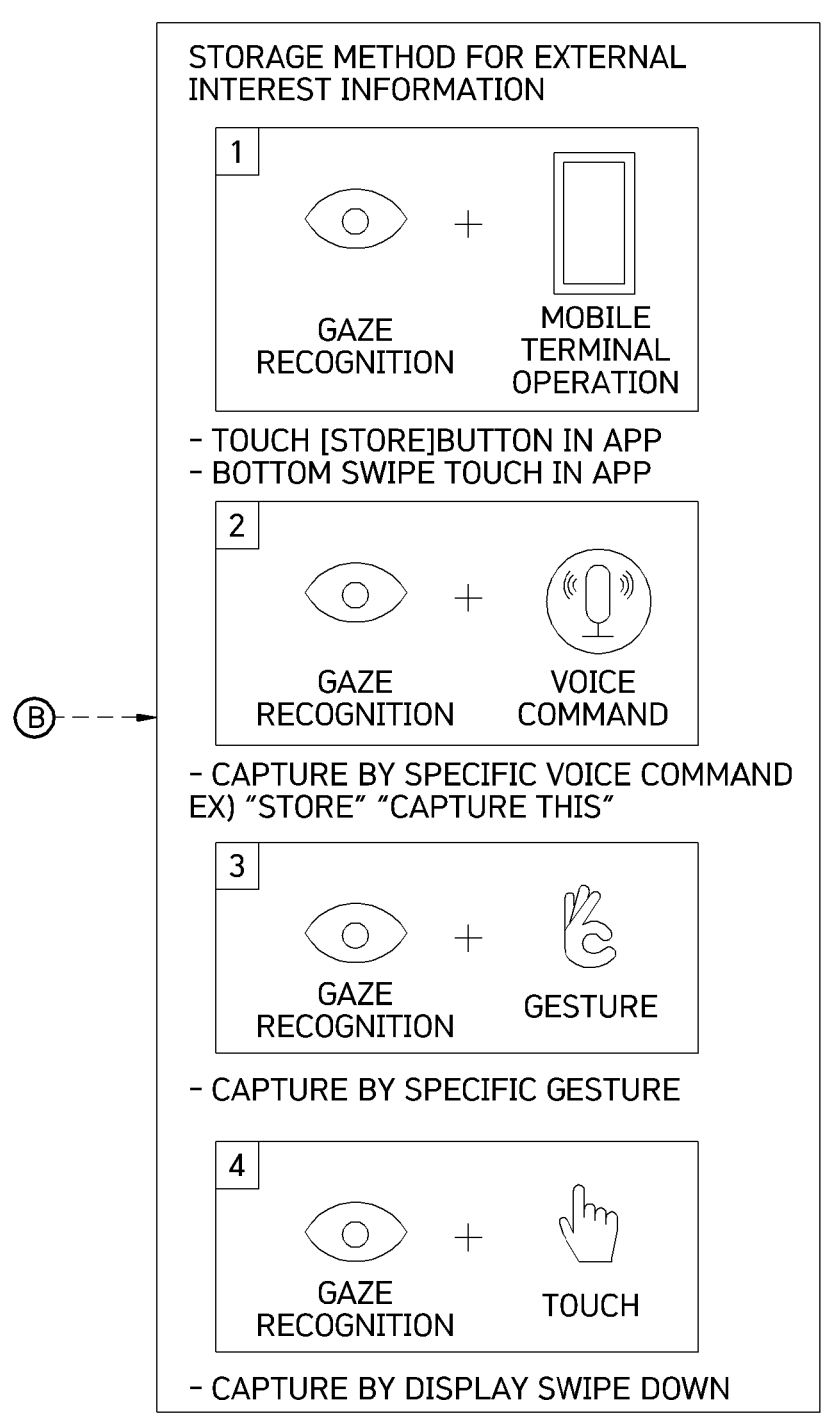

FIG. 35A and FIG. 35C are views showing a process of capturing the external interest information according to another embodiment of the present disclosure.

Referring to FIG. 35A, the display control unit 3402 displays fixed information including at least any one of position information, weather, battery information, and transparency of a transparent display through the transparent display.

Referring to FIG. 35B, the occupant operation recognition unit 3401 confirms the area where the gaze of the occupant stays for a certain period of time or longer through the rear seat left side window, and the display control unit 3402 displays AR information based on the gaze tracking information.

At this time, the display control unit 3402 displays the information of a mountain name and height, weather, distance, and travel time (the time required for the vehicle to travel from the current position to the entrance to the mountain, the time required to climb the mountain from the entrance to the mountain to the top of the mountain, etc.) as AR information.

Referring to FIG. 35C, the occupant operation recognition unit 3401 recognizes various pieces of operation information of the occupant to determine the intent of storing the external interest information.

That is, the occupants request the storage of the corresponding external interest information in a variety of ways, including gaze recognition and a touch of a save button within a mobile device app, gaze recognition and a bottom swipe touch within the mobile device app, gaze recognition and a specific voice command (e.g., save it or capture this), gaze recognition and a specific gesture, and gaze recognition and a display swipe down touch.

Referring to FIG. 35B, the display control unit 3402 simultaneously captures the external foreground and AR information (as another example, it is also possible to cut and store only the area of the corresponding external interest information) according to the storage request received from the occupant operation recognition unit, and in this case, the capture information may include a photograph, video, AR information, GPS position information.

The display control unit 3402 whites the screen out for a preset time (e.g., 1 second) when capturing the screen.

The display control unit 3402 performs control to display the screenshot screen in a specific area of the display (e.g., bottom left) with a certain size (e.g., 15 cm×15 cm) for a certain period of time (e.g., 3 seconds).

Figure 36A:
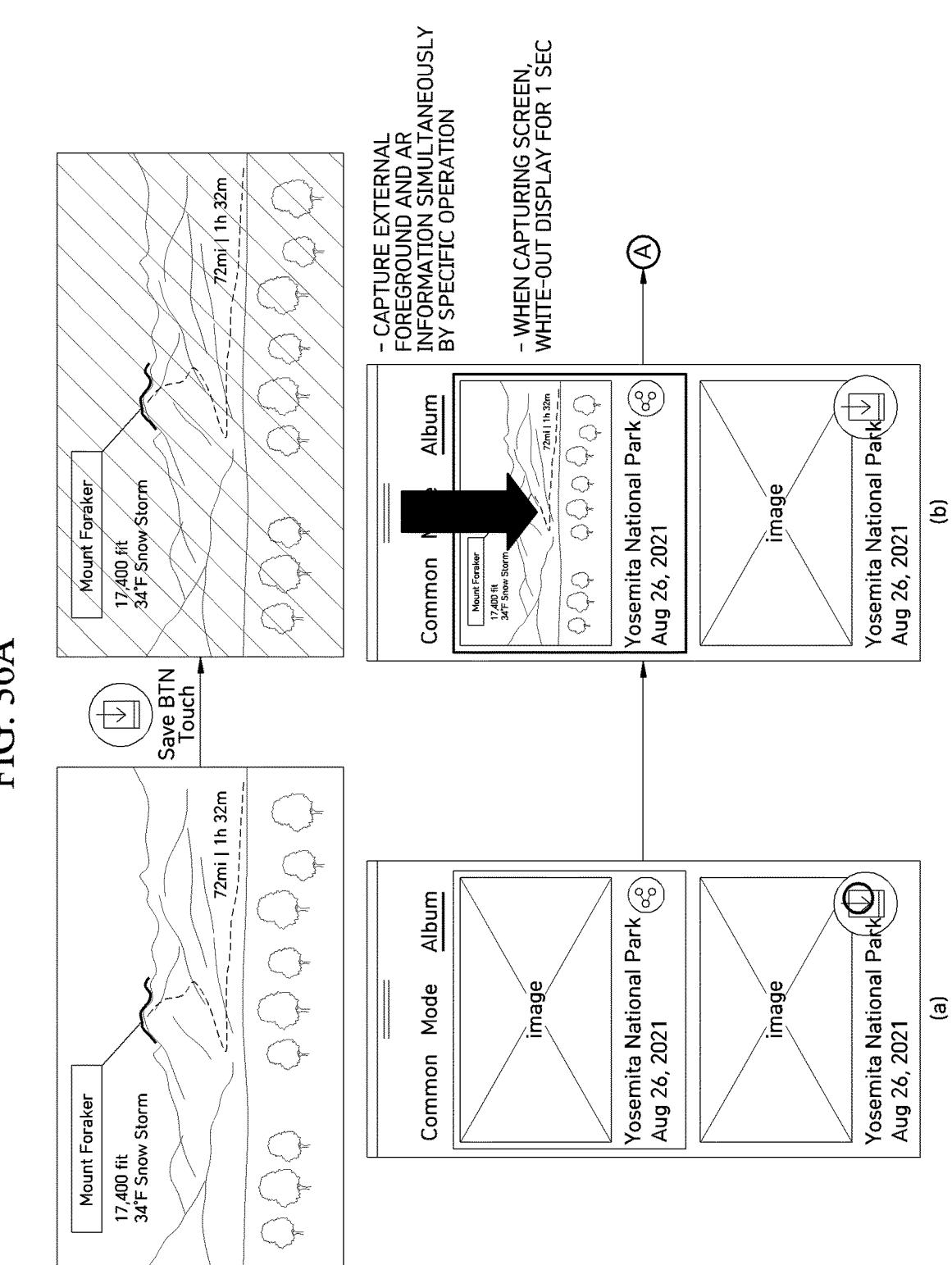
Figure 36B:
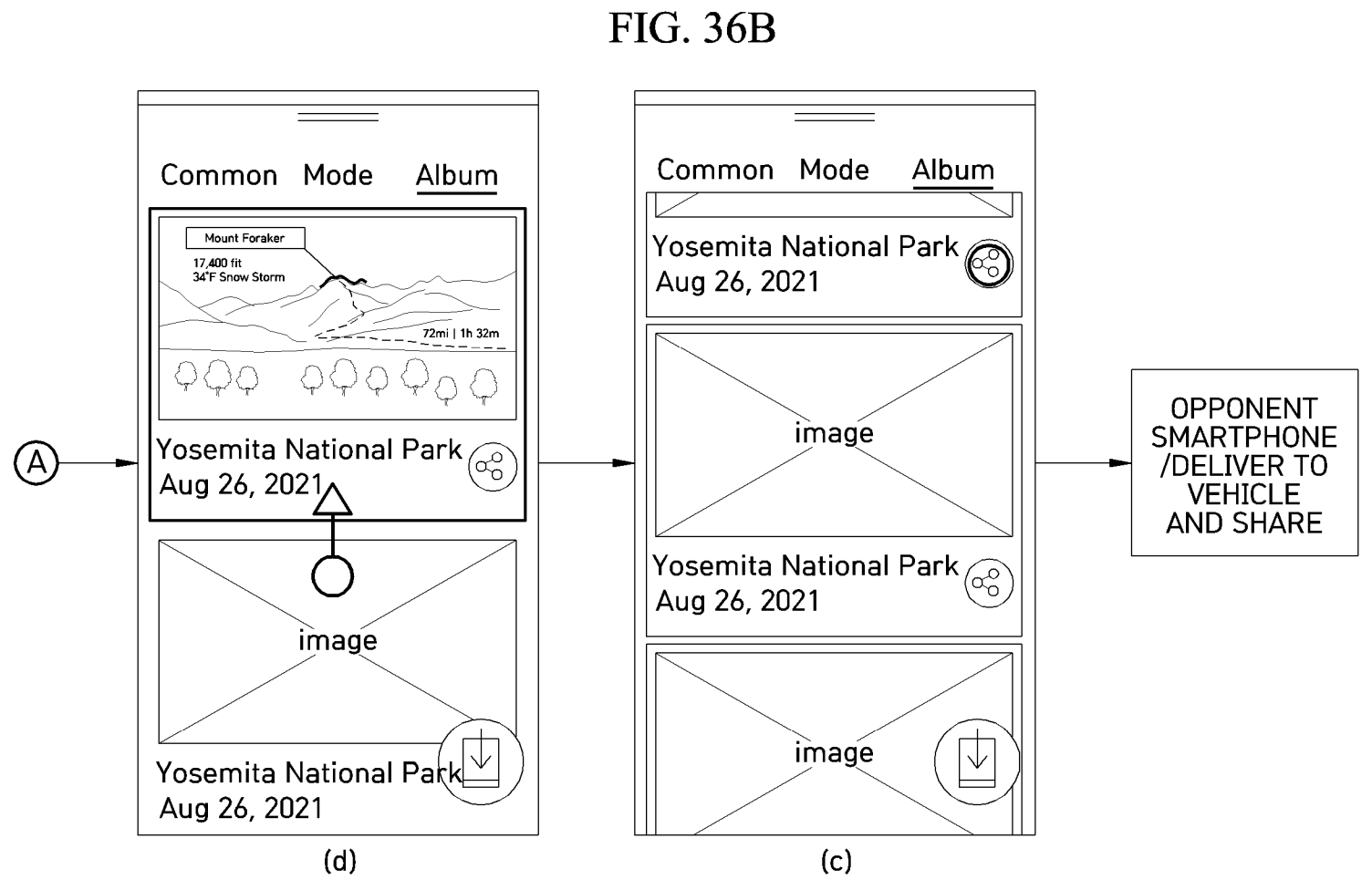

FIG. 36A and FIG. 36B are views showing a process of sharing the external interest information with a smartphone according to another embodiment of the present disclosure.

According to the gaze tracking of the occupant, in a situation where the external interest information is displayed in AR through the rear seat side window transparent display, when the occupant operation recognition unit 3401 receives information that the occupant touches a particular button using his/her mobile terminal connected to the vehicle, the display control unit 3402 captures a screen according to a preset method (e.g., captures the external foreground and AR information at the same time), and when captured, the screen is whited out for the preset time (e.g., 1 second).

The external interest information transmission unit 3403 transmits the captured screen to the mobile terminal of the occupant, and the occupant can check whether a desired capture image has been received normally, through the app of the mobile terminal (e.g., album).

Through in-album manipulation, the occupant can flip through the image displayed in the mobile terminal, and presses a specific button (share button) to transmit the image to be shared to someone else's smartphone or a vehicle.

Figure 37A:
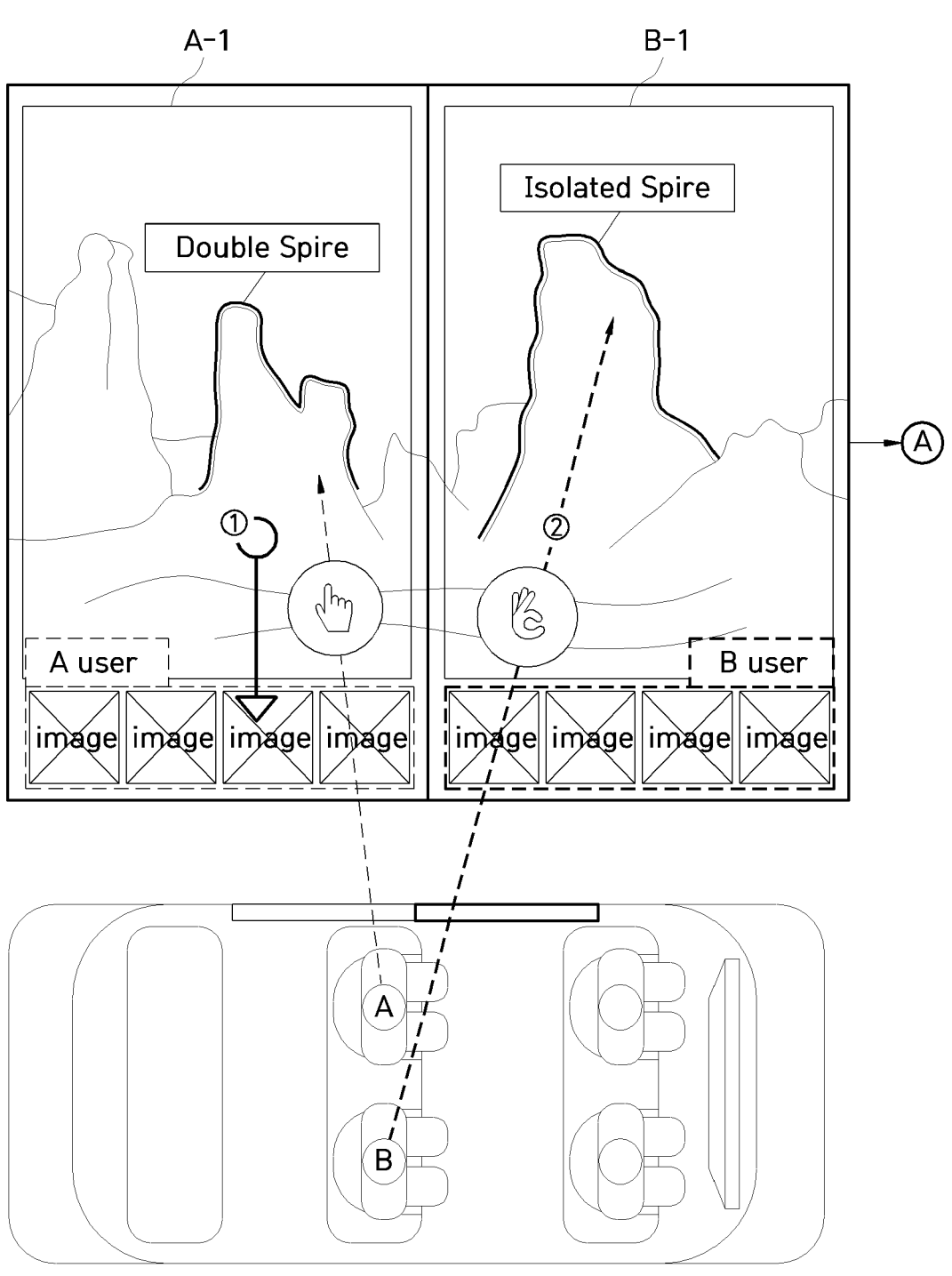
FIG. 37A, FIG. 37B, and FIG. 37C are views showing a process of storing and confirming external interest information for each occupant through a transparent display sliding according to another embodiment of the present disclosure.
Figure 37B:
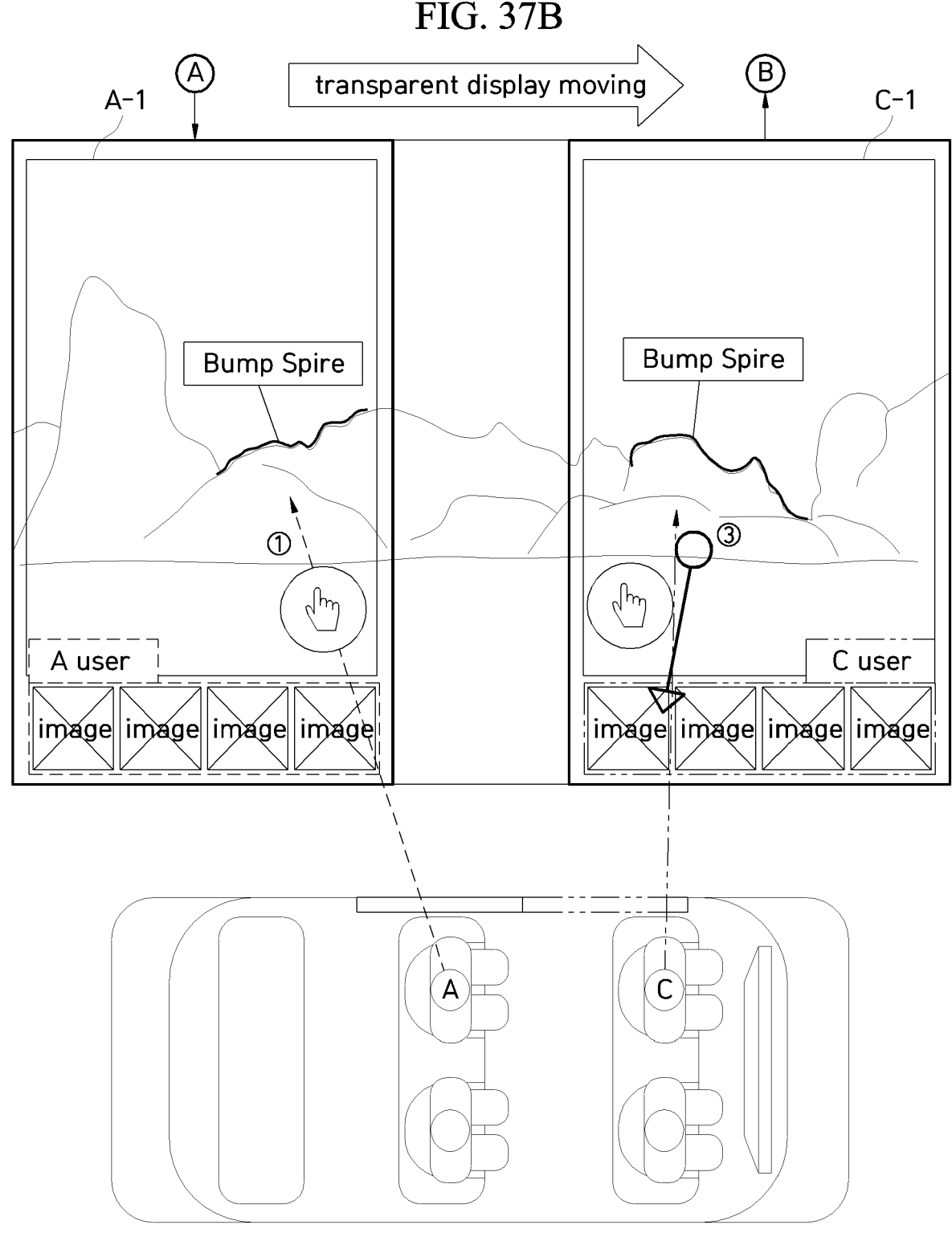
Figure 37C:
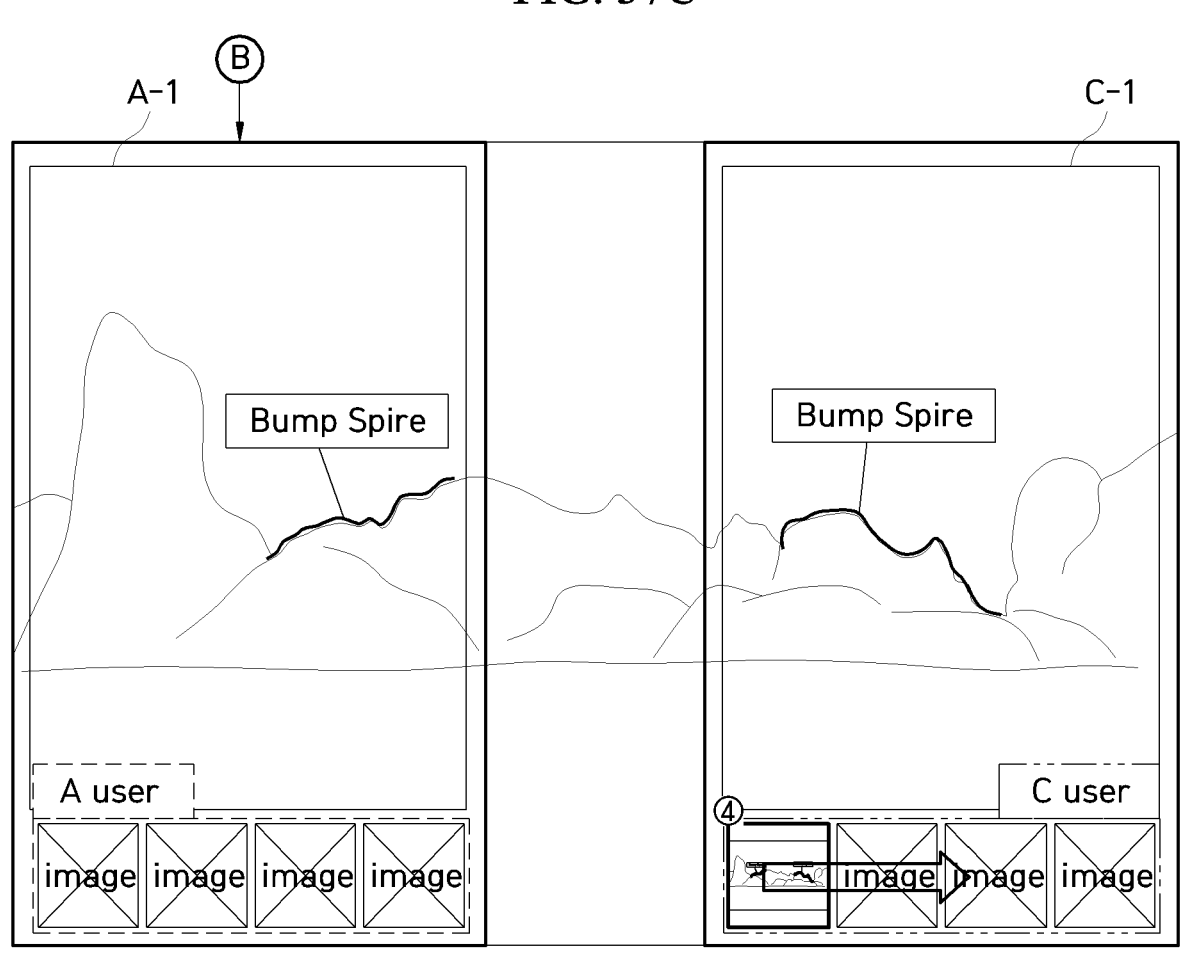
Figure 37C:
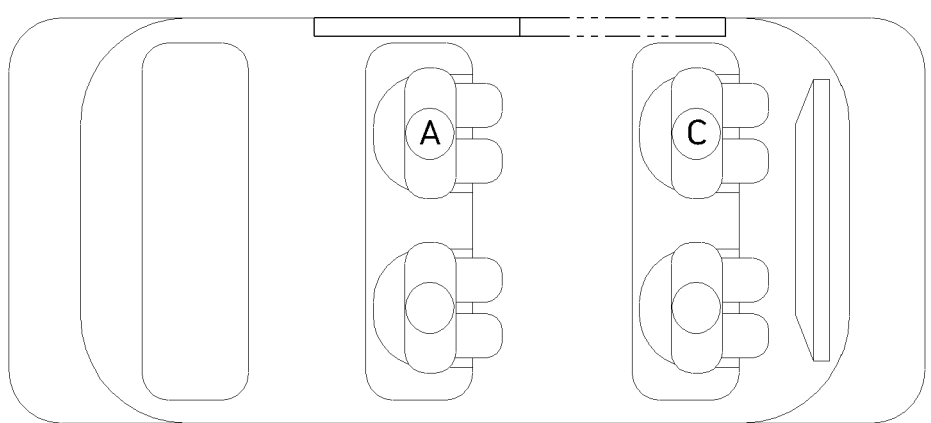

FIG. 37A to FIG. 37C are views showing a process of storing and confirming external interest information for each occupant through transparent display sliding according to another embodiment of the present disclosure.

Referring to FIG. 37A, an occupant A is seated on the rear left seat of the driving vehicle, an occupant B is seated on the rear right seat of the driving vehicle, and the occupant A and the occupant B stare at the outside through the rear seat side window.

The rear seat side window is configured as a transparent display and provides an area assigned for each occupant.

For example, in consideration of the viewing angle of the occupant, a first area A-1 is assigned to the occupant A and a second area B-1 is assigned to the occupant B.

As another example, it is possible to assign a display area based on the position of the external object at which the occupants currently stare. In other words, as an example different from that shown in FIG. 37A, when the occupant A stares at the isolated spire as the interest object, and the occupant B stares at the double spire as the interest object, it is also possible to assign the second area to the occupant A and the first area to the occupant B.

Referring to the illustrations in FIG. 37A, the occupant A stares at the double spire shown beyond the first area A-1 as the interest object, and when the occupant A performs swipe down on the display, the display control unit 3402 stores and displays the captured image in a specific personalization area at the bottom of the display area. In addition, since the occupant B is a person who is further away than the occupant A from the rear seat left side window, the occupant B transmits the capture intent through the gaze recognition and air gesture, and the display control unit 3402 stores and displays the capture image as requested by the occupant B in a specific personalization area at the bottom of the display area.

Referring FIG. 37B, it is assumed that in an autonomous driving situation, the driving control depends on the autonomous driving mode, an occupant C seated on the driver's seat is viewing the outside scenery through the left side window, and the occupant C has the left-side window display access control with a priority higher than that that of the occupant B (It is assumed that the priority for display access control is higher, the closer the display from the boarding position).

At this time, the occupant C slides forward the transparent display corresponding to the second area B-1, and thus, the second area B-1 is disposed at the left side of the occupant C, and the second area B-1 is assigned to occupant C as a third area C-1.

The occupant C requests the storage of the external interest information through a display swipe down, and the display control unit 3402 displays that the external interest information is stored as a capture image in a specific area at the bottom of the display.

Referring to FIG. 37C, in consideration of a face ID camera placed in the vehicle and the seat position information, authentication is performed for each occupant, and when authentication is completed, a personalized content history is displayed in an area at the bottom of the display area assigned to each occupant.

The content history display displays the image/video files in the order in which they are captured.

Figure 38A:
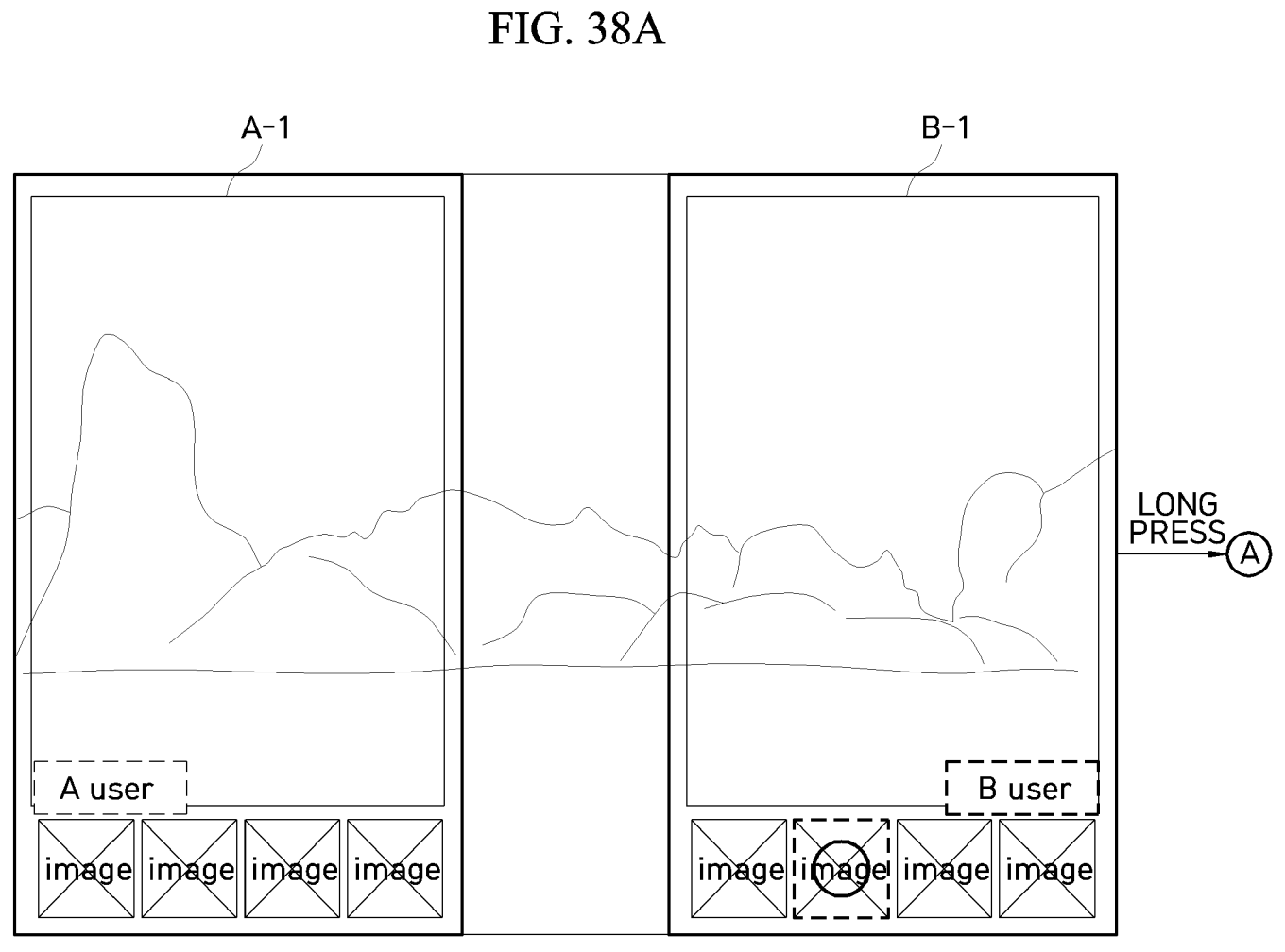
Figure 38B:
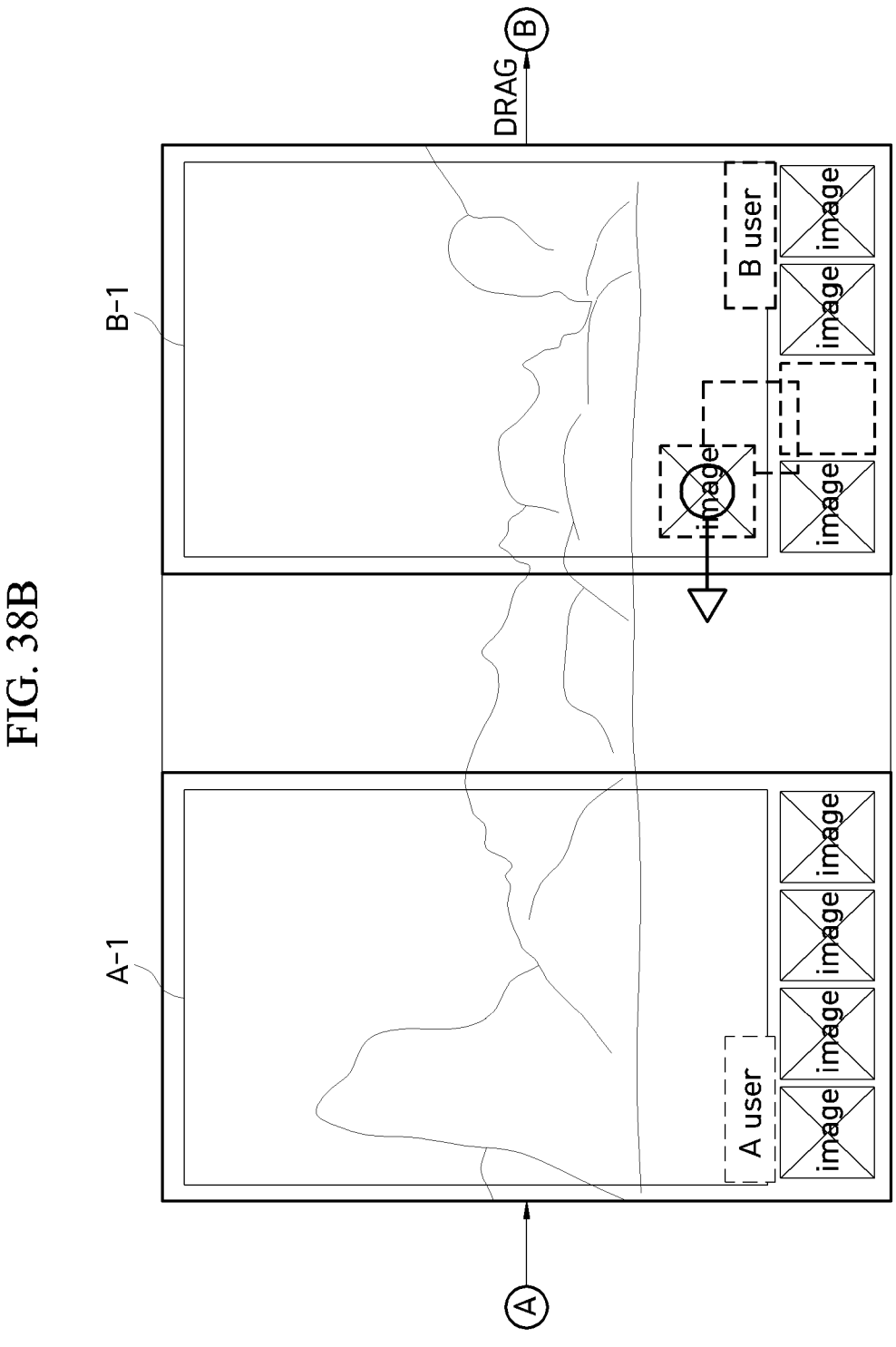
Figure 38C:
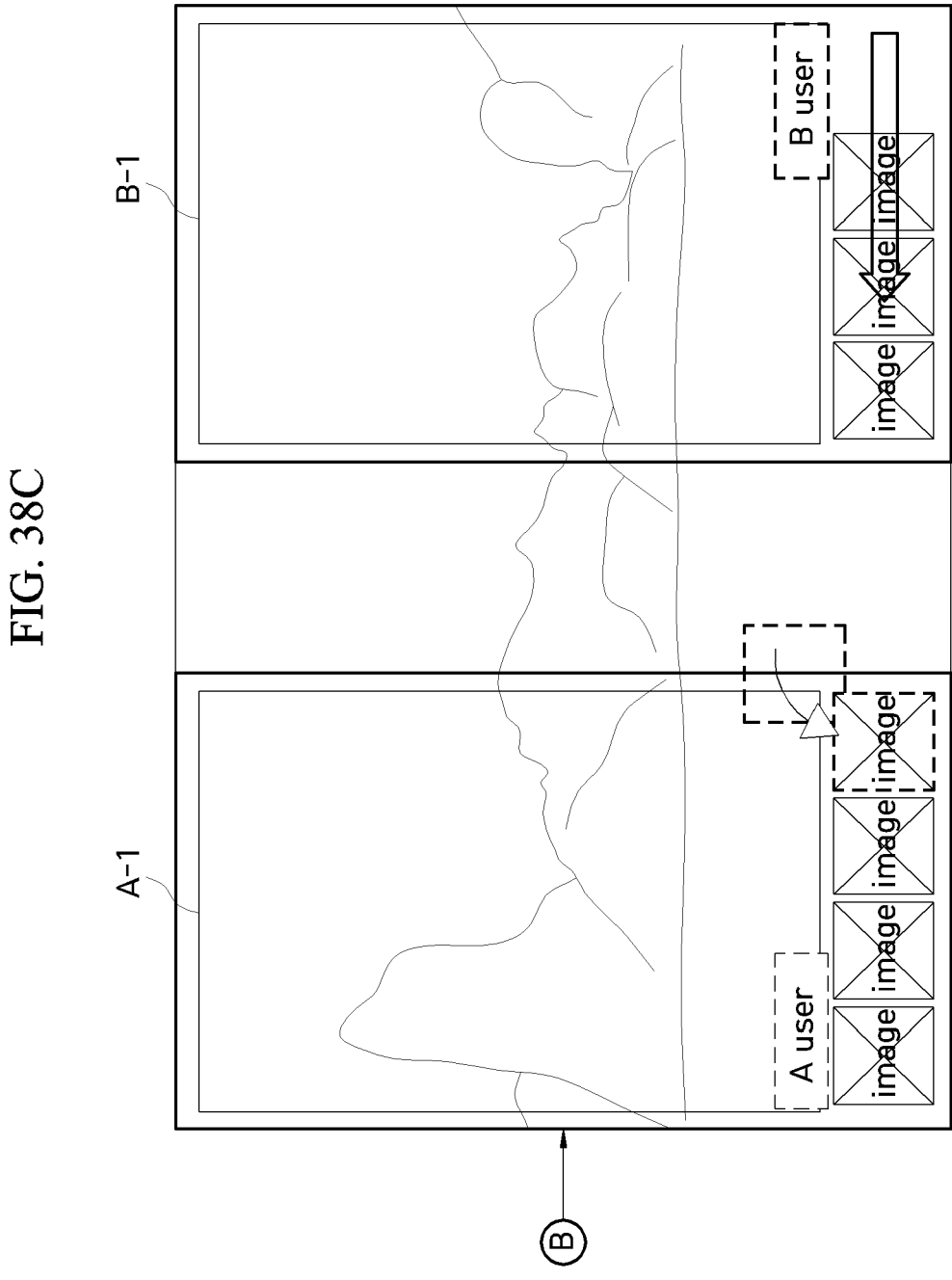

FIG. 38A to FIG. 38C are views showing the sharing of the external interest information between displays according to another embodiment of the present disclosure.

Referring to FIG. 38A to FIG. 38C, a first area A-1 is assigned to an occupant A and a second area B-1 is assigned to an occupant B, and the content history of each occupant is displayed in a specific area at the bottom of each area.

Referring to FIG. 38A, the occupant B selects a certain content in the content history (long press, which can be selected through gesture), and drags the object and requests the transfer of the object to the display of the occupant A.

Referring to FIG. 38B, in consideration of the information sharing authorization setting information of the occupant A, when the information sharing is approved, the display control unit 3402 moves the corresponding particular content to the personalized area of the occupant A and displays it.

At this time, the display control unit 3402 performs control to allow not only the same side (rear seat left side window) display but the front or opposite side (rear seat rear side window) display based on the occupant's request and information sharing setting to share the external interest information according to the directionality of the drag and drop.

Referring to FIG. 38C, a particular content shared by the operation of the occupant B is added and stored into the personalization area of the occupant A.

Figure 39:
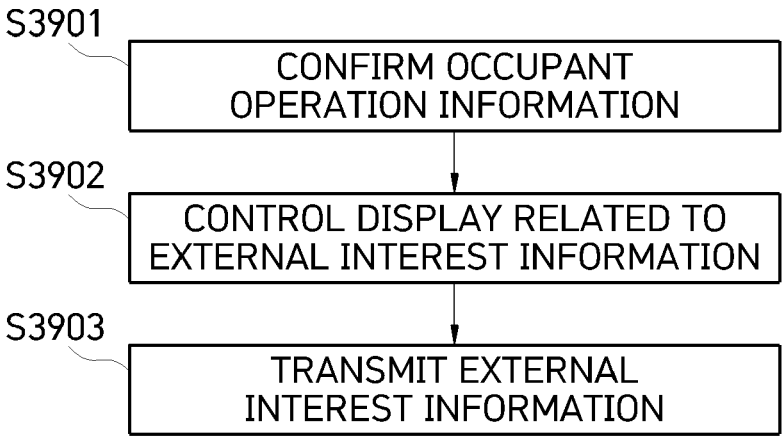
FIG. 39 is a view showing a vehicle display control method for storing and sharing external interest information according to another embodiment of the present disclosure.

FIG. 39 is a view showing a vehicle display control method for storing and sharing external interest information according to another embodiment of the present disclosure.

The vehicle display control method for storing and sharing external interest information according to the embodiment of the present disclosure includes: a step S3901 for receiving a video storage request for an external interest object of a vehicle occupant; and a step S3902 for performing a video storage for the external interest object at which the vehicle occupant stares through a vehicle windshield configured as a transparent display and performing display control.

In the step S3901, a video storage request input using at least any one of gaze information, voice information, gesture information, and touch information is received.

In the step S3902, display control is performed such that information about the external interest object is displayed as AR information.

In the step S3902, an external foreground and AR information are captured and stored at the same time.

In the step S3902, display control for screen capture is performed by white-out a screen during a preset time.

The vehicle display control method for storing and sharing external interest information according to the embodiment of the present disclosure further includes a step S3903 for sharing the external interest information by transmitting the stored video to at least any one of a divided area in a vehicle display, a mobile terminal of the vehicle occupant, and a mobile terminal of another user.

In the step S3902, control is performed such that the display area is divided and assigned to a plurality of occupants in the vehicle, and an external interest information video is stored according to the video storage request made within each area, and the stored video is displayed in a predetermined area of the assigned display area.

In the step S3902, in consideration of access control priorities of a plurality of occupants. display control is performed such that the transparent display is moved.

In the step S3902, control is performed such that video information stored in a predetermined area of a first occupant is moved to a predetermined area of a second occupant according to the occupant request and sharing 권한 setting information.

Figure 40:
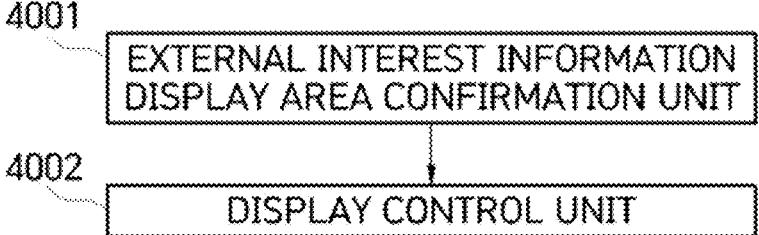
FIG. 40 is a view showing a vehicle display area control system for external interest information according to another embodiment of the present disclosure.

FIG. 40 is a view showing a vehicle display area control system for external interest information according to another embodiment of the present disclosure.

The occupant gaze-based external interest information display area determination and vehicle display control system according to the embodiment of the present disclosure includes: an external interest information display area confirmation unit 4001 configured to confirm a display area for displaying external interest information of a plurality of occupants in the vehicle; and a display control unit 4002 configured to adjust the display area of the external interest information, in consideration of at least any one of importance of the external interest information and the initiative granted to the plurality of occupants.

The display control unit 4002 moves the display area of the external interest information of a second occupant so that the display area of the external interest information of the second occupant does not overlap with the display area of the external interest information of a first occupant, when it is determined that the importance of the external interest information of the first occupant is higher than the importance of the external interest information of the second occupant.

The display control unit 4002 moves the display area of the external interest information of the second occupant when the first occupant has the initiative and it is determined that the display area of the external interest information of the first occupant and the display area of the external interest information of the second occupant overlap with each other in a certain part or more.

The display control unit 4002 performs control to display outline information about the original position of the external interest information of the second occupant.

In consideration of the gaze information of the first occupant, the display control unit 4002 restores the display area of the external interest information of the second occupant to the area before moving.

Figure 41A:
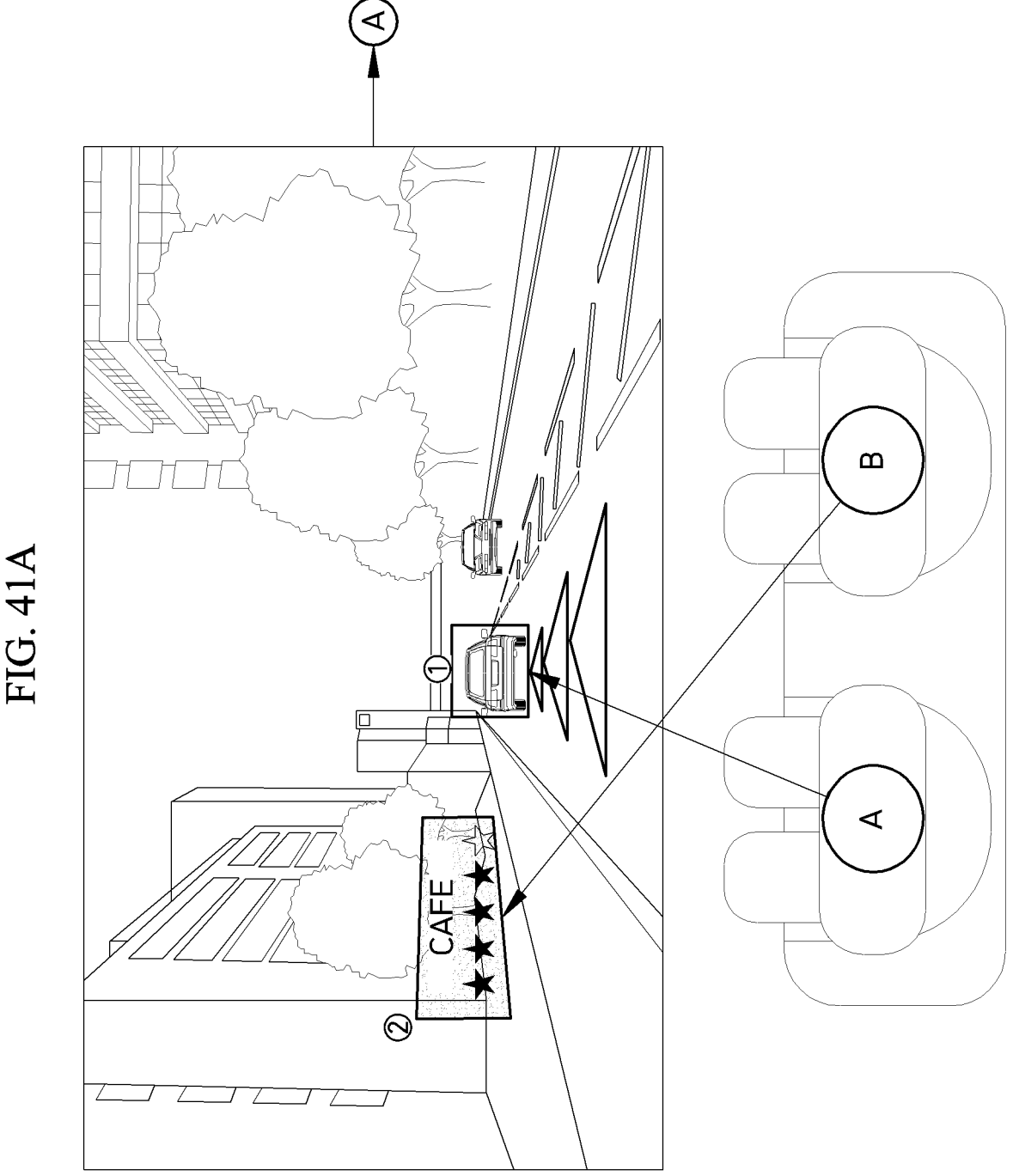
FIG. 41A, FIG. 41B, and FIG. 41C are views showing a process of controlling a vehicle display area for the external interest information according to still another embodiment of the present disclosure.
Figure 41B:
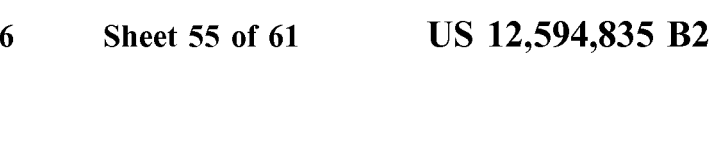
Figure 41C:
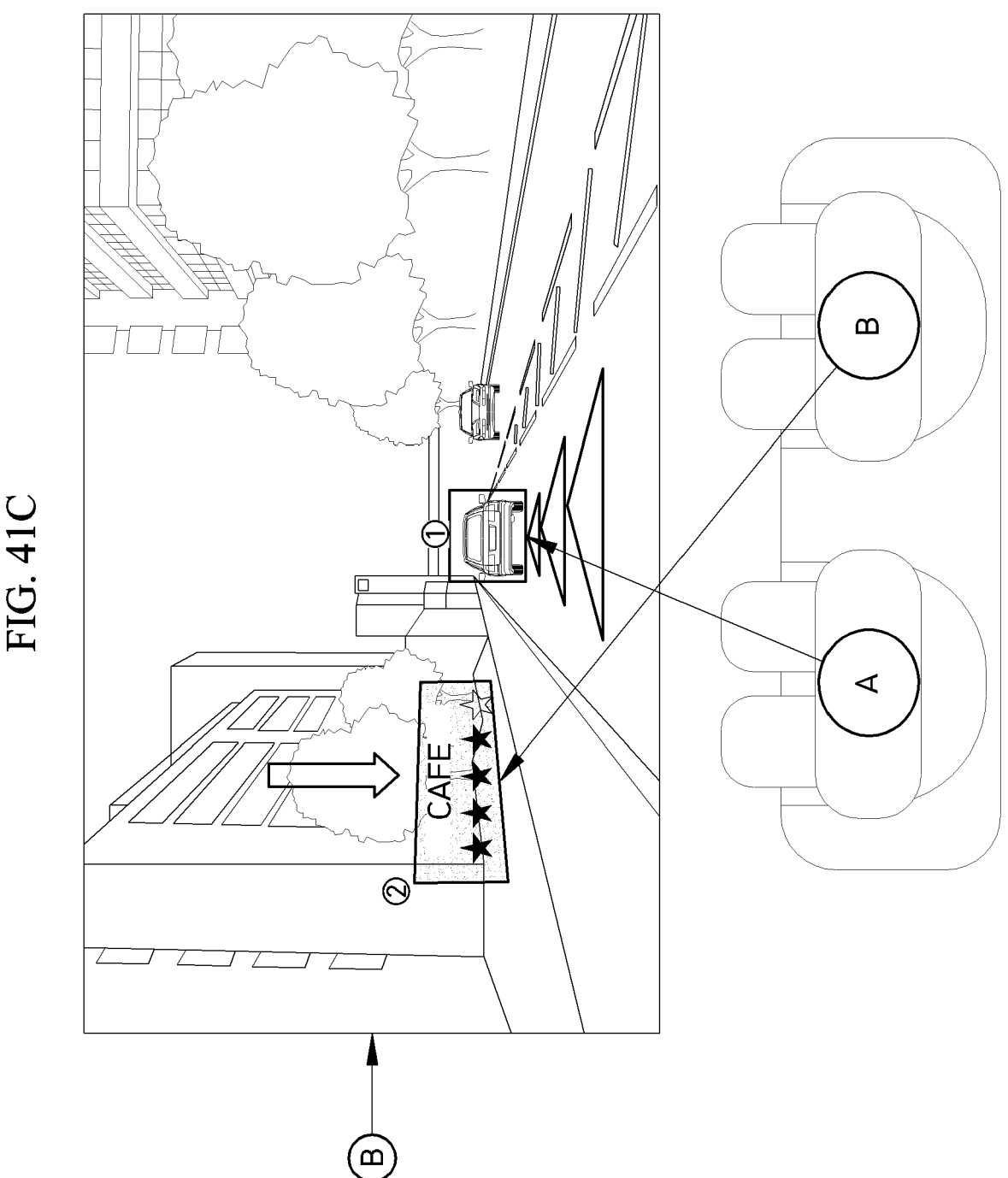

FIG. 41A to FIG. 41C are views showing a process of controlling a vehicle display area for external interest information according to another embodiment of the present disclosure.

Referring to FIG. 41A, a driver A and a passenger B look at external objects through a front windshield of a vehicle.

At this time, when the driver A stares at a forward vehicle located in the area of ① for a preset time or longer, driving-related information (e.g., distance from the forward vehicle and AR route guidance information based on navigation information) is displayed on the front windshield, which is a transparent display, according to the result of tracking the gaze of the driver A.

The passenger B stares at a store (café) located in the area of ② for a preset time or longer, and accordingly, the information about the store (e.g., phone number, the number of floors, menu) is displayed on the front windshield, which is a transparent display.

Referring to FIG. 41B, as the driver A looks at a stopped vehicle located in the area of ①, the display area for the external interest information of the passenger B overlaps with the display area for the external interest information of the driver A.

The display control unit 4002 changes the position of the display area for the external interest information of the passenger B in order to prevent the field of view of the initiative owner, the driver A, from being blocked by this overlapping phenomenon.

That is, while the passenger B is staring at the information about the café located on the first floor of the building, the driver A is provided with rear-facing warning information, and when the driver A stares at another vehicle, according to the priority of the initiative and information, the display control unit 4002 performs control to move and display the café information to the upper area of the building.

At this time, the display control unit 4002 continuously displays the position of the previous interest information in the form of a dotted line, so that the position can be recognized.

Referring to FIG. 41C, when the rear side warning information provided to the driver A is no longer transmitted, or when the driver A moves his/her gaze to another object (forward vehicle), the display control unit 4002 restores the position of the display area for the external interest information of the passenger B.

Figure 42:
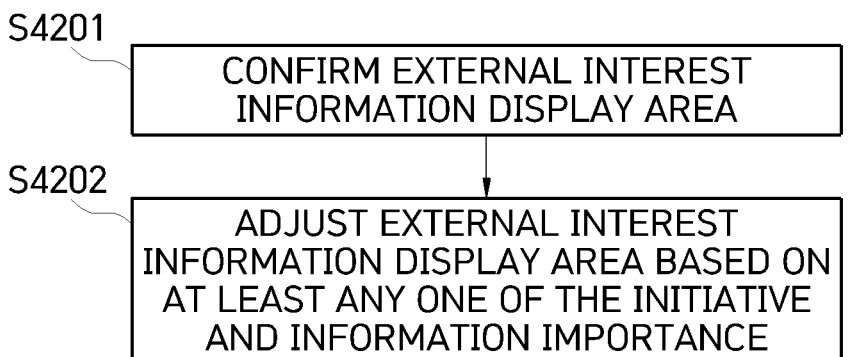
FIG. 42 is a view showing a method of controlling a vehicle display area for external interest information according to another embodiment of the present disclosure.

FIG. 42 is a view showing a method of controlling a vehicle display area for external interest information according to another embodiment of the present disclosure.

The occupant gaze-based external interest information display area determination and a vehicle display control method according to the embodiment of the present disclosure includes: a step S4201 for confirming an area for displaying external interest information of an occupant in a vehicle; and a step S4202 for adjusting the position of the area for displaying the external interest information, in consideration of at least any one of importance of the external interest information and information about the initiative granted to the occupant.

In the step S4202, when it is determined that the importance of the external interest information of a first occupant is higher than the importance of the external interest information of a second occupant, the positions of the display area of the external interest information of the second occupant is moved, so that the display area of the external interest information of the second occupant does not overlap with the display area of the external interest information of the first occupant.

In the step S4202, when the first occupant has the initiative, and it is confirmed that the display area for the external interest information of the first occupant and the display area for the external interest information of the second occupant overlap with each other in a certain part or more, the display area for the external interest information of the second occupant is moved.

In the step S4202, control is performed such that outline information about the original position of the external interest information of the second occupant is displayed.

In the step S4202, in consideration of the gaze information of the first occupant, the display area for the external interest information of the second occupant is restored to the area before moving.

Figure 43:
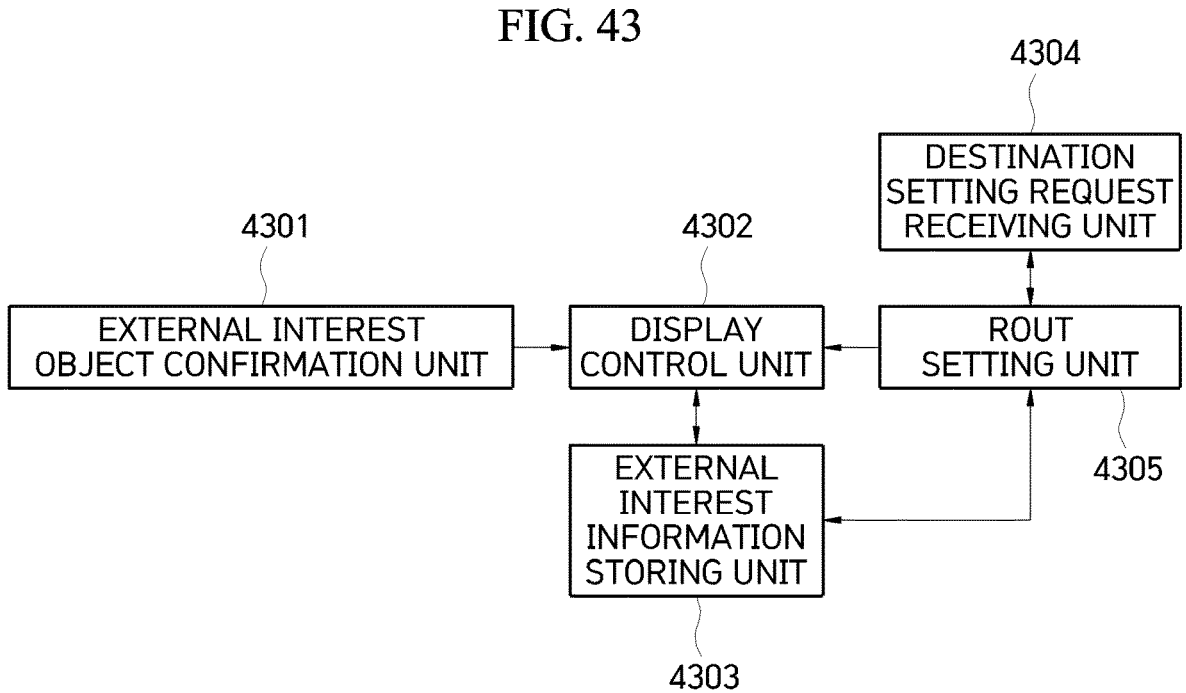
FIG. 43 is a view showing a vehicle display control system that displays and stores the external interest information according to still another embodiment of the present disclosure.

FIG. 43 is a view showing a vehicle display control system for displaying and storing external interest information according to another embodiment of the present disclosure.

The vehicle display control system for displaying and storing external interest information according to the embodiment of the present disclosure includes: an external interest object confirmation unit 4301 configured to confirm an external interest object in which an occupant in a driving vehicle is interested; and a display control unit 4302 configured to perform control to display external interest information about the external interest object in a first display area, to move and display the external interest information to a second display area according to a driving situation, and to store the external interest information in an external interest information storing unit 4303.

The external interest object confirmation unit 4301 confirms the external interest object using at least any one of gaze information, voice information, and gesture information of the occupant.

When the gaze of the occupant departs from a display area for the external interest information, the display control unit 4302 performs control to simplify the external interest information, move the simplified external interest information to the second display area, which is a side window display, and to display the simplified external interest information.

The display control unit 4302 performs control such that the simplified external interest information is accumulated in chronological order and displayed in the second display area.

The vehicle display control system for displaying and storing external interest information according to the embodiment of the present disclosure further includes a destination setting request receiving unit 4304 configured to receive a destination setting request for the simplified external interest information.

The vehicle display control system for displaying and storing external interest information according to the embodiment of the present disclosure further includes a route setting unit 4305 configured to establish a route to an external point of interest selected in accordance with the destination setting request.

Figure 44A:
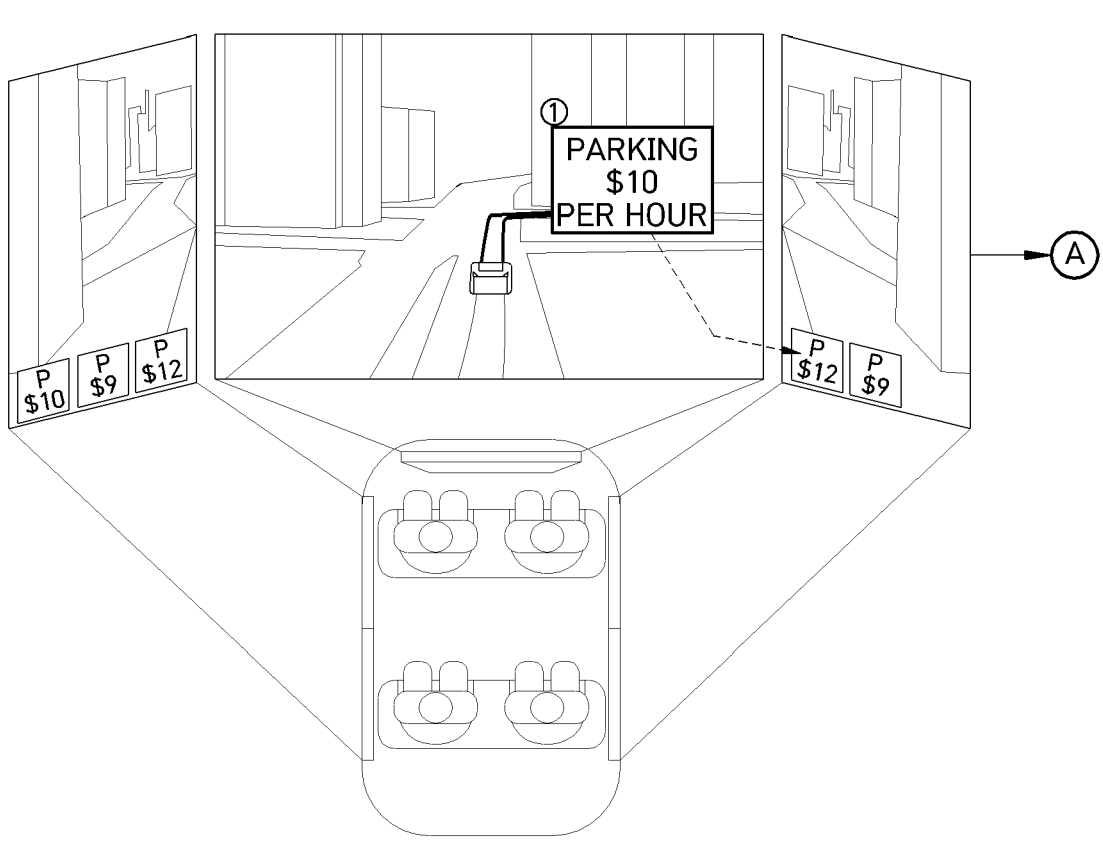
FIG. 44A and FIG. 44B are views showing an indication of the external interest information according to still another embodiment of the present disclosure.
Figure 44B:
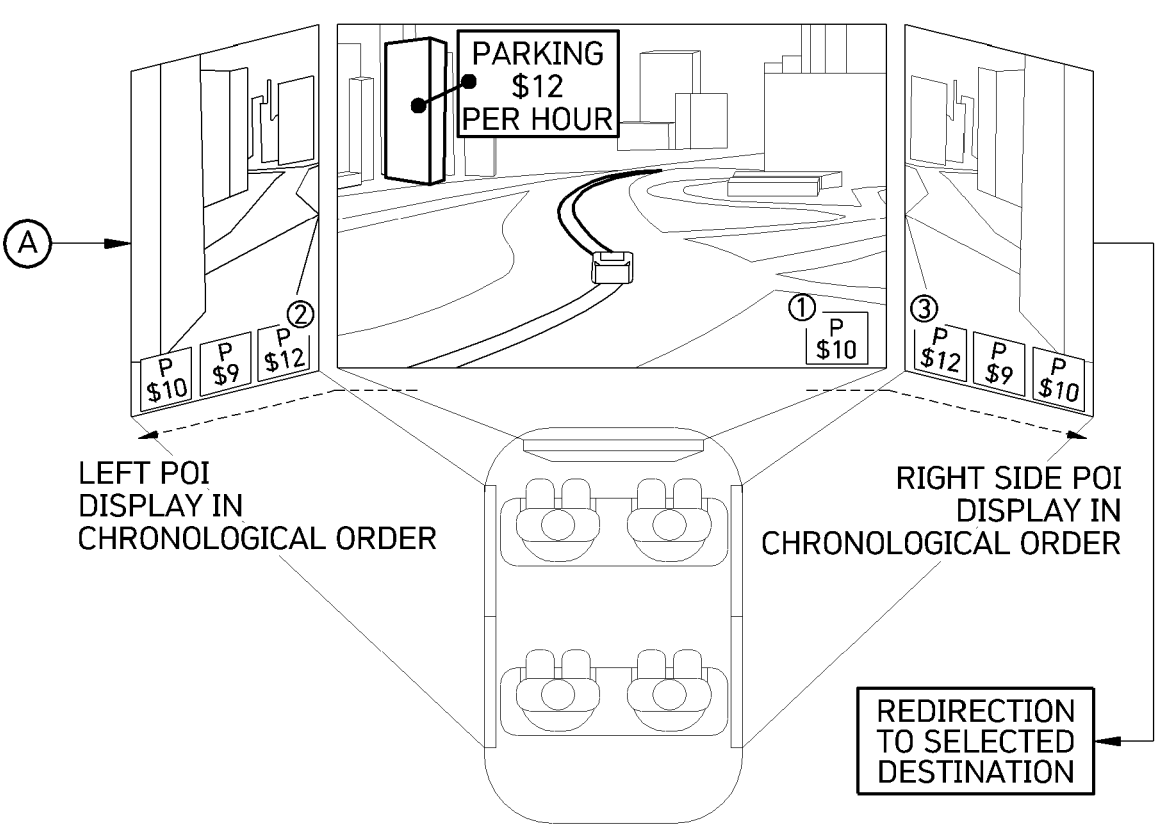

FIG. 44A and FIG. 44B are views showing external interest information display according to another embodiment of the present disclosure.

Referring to FIG. 44A, a driver in a driving vehicle stares at an interest object (parking lot) for a preset time or longer among external objects viewed through a front windshield configured as a transparent display, and accordingly, external interest information (e.g., information about the name, position and cost of the parking lot) is displayed as AR information.

At this time, the display control unit 4302 performs control to confirm the external interest object using voice information, head movement information, and gesture information in addition to occupant gaze information, and to display information about the external interest object.

Referring to FIG. 44A, the display control unit 4302 simplifies the corresponding external interest information (e.g., simplified information such as the distance from the current position, parking costs, etc.) when the driver's field of view departs from a display area for the external interest information, or when the external interest object becomes out of the field of view of the driver as the driving vehicle moves, and displays the simplified external interest information in the form of a log.

At this time, the display control unit 4302 performs control to display the simplified external interest information in a predetermined area of a front display or a side window display.

Referring to FIG. 44B, when the external point of interest moves relatively and is out of the driver's field of view as the vehicle travels, the display control unit 4302 displays the external interest information on the side window display by time. That is, the display control unit 4302 accumulates and displays the external interest information in the order of time elapsed.

At this time, the display control unit 4302 performs control to display information about the external interest object, located on the front left side of the driving vehicle, through the left side window display, and to display the information about the external interest object, located on the front right side of the driving vehicle, through the right side window display.

When receiving a destination setting request for particular external interest information among the plurality of stored external interest information, the route setting unit 4305 sets a path from the current position to the position of the corresponding external interest information.

The destination setting request receiving unit 4304 receives a destination setting request using touch, voice, air gesture, and a mobile device for external interest information stored in the side window display.

Figure 45:
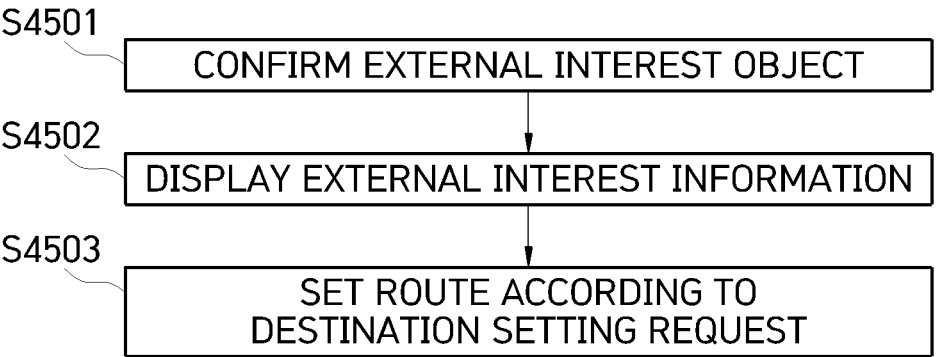
FIG. 45 is a view showing a vehicle display control method for displaying and storing the external interest information according to still another embodiment of the present disclosure.

FIG. 45 is a view showing a vehicle display control method for displaying and storing external interest information according to another embodiment of the present disclosure.

The vehicle display control method for displaying and storing external interest information according to the embodiment of the present disclosure includes: a step S4501 for confirming an external interest object of a driving vehicle occupant; and a step S4502 for perform control to display external interest information for the external interest object in a first display area, and moving the external interest information to a second display area according to a driving situation to display the moved external interest information.

In the step S4501, the external interest object is confirmed using at least any one of the gaze information, voice information, and gesture information of the occupant.

In the step S4502, when the gaze of the driving vehicle occupant departs from the display area for the external interest information, control is performed such that the external interest information is simplified, and the simplified external interest information is moved to the second display area which is the side window display and displayed.

In the step S4502, control is performed such that the simplified external interest information is accumulated in chronological order and is displayed in the second display area.

The vehicle display control method for displaying and storing external interest information according to the embodiment of the present disclosure further includes a step S4503 for receiving a destination setting request for the simplified external interest information and setting a route to an external point of interest selected according to the destination setting request.

On the other hand, the method according to an embodiment of the present disclosure may be implemented in a computer system or recorded in a recording medium. The computer system may include at least one or more processor, memory, user input device, data communication bus, user output device, and storage. Each of the aforementioned components performs data communication via a data communication bus.

The computer system may further include a network interface coupled to the network. The processor may be a central processing unit (CPU) or may be a semiconductor device that processes instructions stored in the memory and/or storage.

The memory and storage may include various types of volatile or non-volatile storage media. Examples of the memory may include ROM and RAM.

Thus, the method according to an embodiment of the present disclosure may be implemented in a manner that is executable on a computer. When the method according to an embodiment of the present disclosure is performed on a computer device, computer-readable instructions may perform the method according to the present disclosure.

On the other hand, the method according to the present disclosure described above can be implemented as a computer-readable code on a computer-readable recording medium. The computer-readable recording media includes all kinds of recording media that store data that can be decrypted by a computer system. Examples thereof may include read only memory (ROM), random access memory (RAM), magnetic tape, magnetic disk, flash memory, optical data storage, and the like. In addition, the computer-readable recording medium may be distributed to a computer system connected by a computer communication network, and stored and executed as code that can be read in a distributed manner.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

What is claimed is:

1. A system for controlling a vehicle display based on occupant's gaze, the system comprising:
a processor configured to recognize a gaze of a first occupant in a vehicle and to
recognize a gaze of a second occupant in the vehicle;
a display attached to the vehicle; and
a controller configured to:
determine interest information from the gaze of the first occupant and the gaze of the second occupant, determine whether areas for displaying the interest information on a windshield overlap with each other, and determine a priority of the display,
control the display so that the interest information display area of the second occupant does not overlap the interest information display area of the first occupant in accordance with the determined priority,
confirm external interest information of the first occupant from the gaze of the first occupant,
confirm external interest information of the second occupant from the gaze of the second occupant,
confirm a display area for the external interest information of the first occupant and a display area for the external interest information of the second occupant,
determine the priority based on an objective priority score of the external interest information for display, and
perform display control to display only the external interest information of the first occupant without displaying the external interest information of the second occupant when it is determined that objective priority score of the external interest information of the first occupant exceeds a preset value.

2. The system of claim 1, wherein the controller is configured to control the display in consideration of preset initiative information when a display area for the interest information of the first occupant and a display area for the interest information of the second occupant overlap with each other.

3. The system of claim 2, wherein the controller is configured to control the display so that the display area for the interest information of the first occupant is displayed on a top position while covering the display area for the interest information of the second occupant, when the first occupant is set to have an initiative over the second occupant.

4. The system of claim 2, wherein the controller is configured to control the display by moving the display area for the interest information of the second occupant so that the display area for the interest information of the second occupant does not overlap with the display area for the interest information of the first occupant, when the first occupant is set to have an initiative control over the second occupant.

5. The system of claim 2, wherein the controller is configured to control the display in consideration of a priority of the interest information, when the display area for the interest information of the first occupant and the display area for the interest information of the second occupant overlap with each other.

6. The system of claim 5, wherein the controller is configured to control the display to display the interest information of the first occupant, without displaying the interest information of the second occupant, when it is determined that the interest information of the first occupant has higher priority than the interest information of the second occupant.

7. The system of claim 2, wherein the controller is configured to determine whether to display the interest information of the second occupant in the display area assigned to the first occupant, in consideration of at least one of types of content displayed in the display area assigned to the first occupant and an operation situation in relation to the display area assigned to the first occupant.

8. The system of claim 1, wherein the controller is configured to perform control to display outline information with respect to an original position of an external interest object of the second occupant.

9. The system of claim 1, wherein the controller is configured to restore the display area for the external interest information of the second occupant to an area before moving in consideration of the gaze of the first occupant.

10. A method for controlling a vehicle display based on an occupant's gaze, the method comprising:
(a) recognizing gaze information of a plurality of occupants in a vehicle;
(b) confirming interest information using the gaze information;
(c) confirming whether display areas for the interest information displayed on a windshield, which is a transparent display, overlap with each other;
(d) performing display control when the display areas for the interest information overlap with each other so that the display areas for the interest information do not overlap with each other;
(e) confirm external interest information of the first occupant from the gaze of the first occupant;
(f) confirm external interest information of the second occupant from the gaze of the second occupant; and
(g) confirm a display area for the external interest information of the first occupant and a display area for the external interest information of the second occupant;
(h) determine the priority based on an objective priority score of the external interest information for display; and
(i) restore the display area for the external interest information of the second occupant to an area before moving in consideration of the gaze of the first occupant.

11. The method of claim 10, wherein in (d), the display control is performed in consideration of preset initiative control information according to a result of confirming that a display area for interest information of a first occupant and a display area for interest information of a second occupant overlap with each other.

12. The method of claim 11, wherein in (d), when the first occupant is set to have an initiative control than the second occupant, the display control is performed so that the display area for the interest information of the first occupant is displayed at a top level while covering the display area for the interest information of the second occupant.

13. The method of claim 11, wherein in (d), when the first occupant is set to have an initiative control than the second occupant, the display control is performed so that the display area for the interest information of the second occupant is moved so as to not overlap with the display area for the interest information of the first occupant.

14. The method of claim 10, wherein in (d), when the display area for the interest information of the first occupant and the display area for the interest information of the second occupant overlap with each other, the display control is performed in consideration of an objective priority score of the interest information.

15. The method of claim 14, wherein in (d), when it is determined that the objective priority score of the interest information of the first occupant is higher than the objective priority score of the interest information of the second occupant, the display control is performed so that the interest information of the second occupant is not displayed and the interest information of the first occupant is displayed.

16. The method of claim 10, wherein in (d), it is determined whether the interest information of the second occupant is displayed in a display area assigned to the first occupant, in consideration of at least any one of types of content displayed in the display area assigned to the first occupant and an operation situation associated with the display area assigned to the first occupant.

17. A system for controlling a transparent windshield display based on occupants' gaze, the system comprising:

the transparent windshield display attached to a vehicle; and a controller comprising one or more processors configured by executable instructions stored in non-transitory memory to:

receive, for each of a first occupant and a second occupant, gaze information indicative of a viewing direction relative to the vehicle environment;

determine respective interest information for the first and second occupants from the received gaze information;

compute, in windshield coordinates, a candidate display area for the interest information of each of the first and second occupants;

detect whether the candidate display areas overlap;

when an overlap is detected, resolve the overlap by executing a rule set that includes preset initiative information identifying which occupant has initiative and an objective priority score for interest information based on at least one of: information type, gaze dwell time, and an operation situation associated with a display area; and control the transparent windshield display to prevent overlap by performing at least one of:

top-level display of the first occupant's interest information over the second occupant's overlapping interest information when the first occupant has initiative or when the first occupant's objective priority score exceeds a threshold;

relocation of the second occupant's candidate display area to a nearest non-overlapping location within the windshield; or non-display of the second occupant's overlapping interest information when the first occupant's objective priority score exceeds a threshold;

and, after the overlap condition ceases, restore any relocated display area to its area before moving.

\* \* \* \* \*